(12) United States Patent
Wang et al.

(10) Patent No.: US 11,592,652 B2
(45) Date of Patent: Feb. 28, 2023

(54) ENHANCED-RESOLUTION INFRARED PHOTOACOUSTIC MICROSCOPY AND SPECTROSCOPY

(71) Applicant: California Institute of Technology, Pasadena, CA (US)

(72) Inventors: Lihong Wang, Arcadia, CA (US); Junhui Shi, Pasadena, CA (US); Konstantin Maslov, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 341 days.

(21) Appl. No.: 16/560,680

(22) Filed: Sep. 4, 2019

(65) Prior Publication Data

US 2020/0073103 A1    Mar. 5, 2020

Related U.S. Application Data

(60) Provisional application No. 62/726,860, filed on Sep. 4, 2018.

(51) Int. Cl.
*G02B 21/00* (2006.01)
*G02B 21/02* (2006.01)

(52) U.S. Cl.
CPC ....... *G02B 21/0028* (2013.01); *G02B 21/008* (2013.01); *G02B 21/0036* (2013.01); *G02B 21/0052* (2013.01); *G02B 21/02* (2013.01)

(58) Field of Classification Search
CPC ................ G02B 21/00; G02B 21/0016; G02B 21/0028; G02B 21/0036; G02B 21/0052; G02B 21/0064; G02B 21/008; G02B 21/06; G02B 21/16; G01N 29/2418; G01N 33/48; G01N 33/50

USPC .................................................. 359/368–389
See application file for complete search history.

(56) References Cited

U.S. PATENT DOCUMENTS

| | | | |
|---|---|---|---|
| 4,029,756 A | 6/1977 | Gaafar | |
| 4,127,318 A | 11/1978 | Determann et al. | |
| 4,255,971 A | 3/1981 | Rosencwaig | |
| 4,267,732 A | 5/1981 | Quate | |
| 4,284,324 A | 8/1981 | Huignard et al. | |

(Continued)

FOREIGN PATENT DOCUMENTS

| CN | 1883379 A | 12/2006 |
|---|---|---|
| CN | 106338473 A | 1/2017 |

(Continued)

OTHER PUBLICATIONS

Office Action from related U.S. Appl. No. 11/625,099, dated Nov. 1, 2010.

(Continued)

*Primary Examiner* — Thong Q Nguyen
(74) *Attorney, Agent, or Firm* — Sheila Martinez-Lemke; Weaver Austin Villeneuve & Sampson LLP

(57) ABSTRACT

Apparatus and methods for measuring infrared absorption of a sample that includes delivering a pulse of infrared radiation to a region of the sample, delivering pulses of radiation of a shorter wavelength than infrared radiation to a sub-region within the region, and using one or more properties of the induced photoacoustic signals to create a signal indicative of infrared absorption of the sub-region of the sample.

46 Claims, 19 Drawing Sheets

(56) References Cited

U.S. PATENT DOCUMENTS

| | | |
|---|---|---|
| 4,375,818 A | 3/1983 | Suwaki et al. |
| 4,385,634 A | 5/1983 | Bowen |
| 4,430,897 A | 2/1984 | Quate |
| 4,430,987 A | 2/1984 | Heller |
| 4,462,255 A | 7/1984 | Guess et al. |
| 4,468,136 A | 8/1984 | Murphy et al. |
| 4,489,727 A | 12/1984 | Matsuo et al. |
| 4,546,771 A | 10/1985 | Eggleton et al. |
| 4,596,254 A | 6/1986 | Adrian et al. |
| 4,687,304 A | 8/1987 | Piller et al. |
| 4,740,081 A | 4/1988 | Martens et al. |
| 4,802,461 A | 2/1989 | Cho |
| 4,802,487 A | 2/1989 | Martin et al. |
| 4,809,703 A | 3/1989 | Ishikawa et al. |
| 4,850,363 A | 7/1989 | Yanagawa |
| 4,860,758 A | 8/1989 | Yanagawa et al. |
| 4,869,256 A | 9/1989 | Kanno et al. |
| 4,872,758 A | 10/1989 | Miyazaki et al. |
| 4,921,333 A | 5/1990 | Brody et al. |
| 4,929,951 A | 5/1990 | Small |
| 4,995,396 A | 2/1991 | Inaba et al. |
| 5,070,455 A | 12/1991 | Singer et al. |
| 5,083,549 A | 1/1992 | Cho et al. |
| 5,107,844 A | 4/1992 | Kami et al. |
| 5,115,814 A | 5/1992 | Griffith et al. |
| 5,125,410 A | 6/1992 | Misono et al. |
| 5,140,463 A | 8/1992 | Yoo et al. |
| 5,170,793 A | 12/1992 | Takano et al. |
| 5,194,723 A | 3/1993 | Cates et al. |
| 5,207,672 A | 5/1993 | Roth et al. |
| 5,227,912 A | 7/1993 | Ho et al. |
| 5,305,759 A | 4/1994 | Kaneko et al. |
| 5,321,501 A | 6/1994 | Swanson et al. |
| 5,329,817 A | 7/1994 | Garlick et al. |
| 5,331,466 A | 7/1994 | Van Saarloos |
| 5,345,938 A | 9/1994 | Nishiki et al. |
| 5,373,845 A | 12/1994 | Gardineer et al. |
| 5,414,623 A | 5/1995 | Lu et al. |
| 5,445,155 A | 8/1995 | Sieben |
| 5,465,722 A | 11/1995 | Fort et al. |
| 5,546,187 A | 8/1996 | Pepper et al. |
| 5,546,947 A | 8/1996 | Yagami et al. |
| 5,546,948 A | 8/1996 | Hamm et al. |
| 5,606,975 A | 3/1997 | Liang et al. |
| 5,615,675 A | 4/1997 | O'Donnell et al. |
| 5,635,784 A | 6/1997 | Seale |
| 5,651,366 A | 7/1997 | Liang et al. |
| 5,713,356 A | 2/1998 | Kruger |
| 5,718,231 A | 2/1998 | Dewhurst et al. |
| 5,781,294 A | 7/1998 | Nakato et al. |
| 5,836,872 A | 11/1998 | Kenet et al. |
| 5,840,023 A | 11/1998 | Oraevsky et al. |
| 5,860,934 A | 1/1999 | Sarvazyan |
| 5,913,234 A | 6/1999 | Julliard et al. |
| 5,971,998 A | 10/1999 | Russell et al. |
| 5,977,538 A | 11/1999 | Unger et al. |
| 5,991,697 A | 11/1999 | Nelson et al. |
| 6,055,097 A | 4/2000 | Lanni et al. |
| 6,102,857 A | 8/2000 | Kruger |
| 6,104,942 A | 8/2000 | Kruger |
| 6,108,576 A | 8/2000 | Alfano et al. |
| 6,111,645 A | 8/2000 | Tearney et al. |
| 6,134,003 A | 10/2000 | Tearney et al. |
| 6,216,025 B1 | 4/2001 | Kruger |
| 6,233,055 B1 | 5/2001 | Mandella et al. |
| 6,282,011 B1 | 8/2001 | Tearney et al. |
| 6,292,682 B1 | 9/2001 | Kruger |
| 6,309,352 B1 | 10/2001 | Oraevsky et al. |
| 6,341,036 B1 | 1/2002 | Tearney et al. |
| 6,379,325 B1 | 4/2002 | William et al. |
| 6,405,069 B1 | 6/2002 | Oraevsky et al. |
| 6,413,228 B1 | 7/2002 | Hung et al. |
| 6,421,164 B2 | 7/2002 | Tearney et al. |
| 6,432,067 B1 | 8/2002 | Martin et al. |
| 6,466,806 B1 | 10/2002 | Geva et al. |
| 6,485,413 B1 | 11/2002 | Boppart et al. |
| 6,490,470 B1 | 12/2002 | Kruger |
| 6,498,942 B1 | 12/2002 | Esenaliev et al. |
| 6,498,945 B1 | 12/2002 | Alfheim et al. |
| 6,501,551 B1 | 12/2002 | Tearney et al. |
| 6,545,264 B1 | 4/2003 | Stem |
| 6,564,087 B1 | 5/2003 | Pitris et al. |
| 6,567,688 B1 | 5/2003 | Wang |
| 6,590,830 B1 | 7/2003 | Garlick et al. |
| 6,626,834 B2 | 9/2003 | Dunnie et al. |
| 6,628,404 B1 | 9/2003 | Kelley et al. |
| 6,633,774 B2 | 10/2003 | Kruger |
| 6,654,630 B2 | 11/2003 | Zuluaga et al. |
| 6,658,279 B2 | 12/2003 | Swanson et al. |
| 6,694,173 B1 | 2/2004 | Bende et al. |
| 6,701,181 B2 | 3/2004 | Tang et al. |
| 6,751,490 B2 | 6/2004 | Esenaliev et al. |
| 6,764,450 B2 | 7/2004 | Yock |
| 6,831,781 B2 | 12/2004 | Tearney et al. |
| 6,833,540 B2 | 12/2004 | MacKenzie et al. |
| 6,839,496 B1 | 1/2005 | Mills et al. |
| 6,846,288 B2 | 1/2005 | Nagar et al. |
| 6,853,446 B1 | 2/2005 | Almogy et al. |
| 6,877,894 B2 | 4/2005 | Vona et al. |
| 6,937,886 B2 | 8/2005 | Zavislan |
| 6,956,650 B2 | 10/2005 | Boas et al. |
| 7,072,045 B2 | 7/2006 | Chen et al. |
| 7,198,778 B2 | 4/2007 | Achilefu et al. |
| 7,231,243 B2 | 6/2007 | Tearney et al. |
| 7,245,789 B2 | 7/2007 | Bates et al. |
| 7,266,407 B2 | 9/2007 | Li et al. |
| 7,322,972 B2 | 1/2008 | Viator et al. |
| 7,357,029 B2 | 4/2008 | Falk |
| 7,382,949 B2 | 6/2008 | Bouma et al. |
| 7,541,602 B2 | 6/2009 | Metzger et al. |
| 7,610,080 B1 | 10/2009 | Winchester, Jr. et al. |
| 7,917,312 B2 | 3/2011 | Wang et al. |
| 8,016,419 B2 | 9/2011 | Zhang et al. |
| 8,025,406 B2 | 9/2011 | Zhang et al. |
| 8,143,605 B2 | 3/2012 | Metzger et al. |
| 8,397,573 B2 | 3/2013 | Kobayashi |
| 8,416,421 B2 | 4/2013 | Wang et al. |
| 8,454,512 B2 | 6/2013 | Wang et al. |
| 8,891,088 B2 | 11/2014 | Goldschmidt et al. |
| 8,997,572 B2 | 4/2015 | Wang et al. |
| 9,086,365 B2 * | 7/2015 | Wang .................. A61B 5/7257 |
| 9,096,365 B2 | 8/2015 | Kim |
| 9,220,415 B2 | 12/2015 | Mandelis et al. |
| 9,226,666 B2 * | 1/2016 | Wang ................ A61B 5/14542 |
| 9,234,841 B2 | 1/2016 | Wang et al. |
| 9,335,605 B2 | 5/2016 | Wang et al. |
| 9,528,966 B2 | 12/2016 | Wang et al. |
| 9,618,445 B2 | 4/2017 | Sun et al. |
| 10,285,595 B2 * | 5/2019 | Zalev .................... A61B 8/463 |
| 10,359,400 B2 | 7/2019 | Wang et al. |
| 10,433,733 B2 | 10/2019 | Wang et al. |
| 10,448,850 B2 | 10/2019 | Wang et al. |
| 11,020,006 B2 | 6/2021 | Wang et al. |
| 11,029,287 B2 | 6/2021 | Wang et al. |
| 11,135,375 B2 | 10/2021 | Brady et al. |
| 11,137,375 B2 | 10/2021 | Wang et al. |
| 11,369,280 B2 | 6/2022 | Wang et al. |
| 11,530,979 B2 | 12/2022 | Wang et al. |
| 2001/0052979 A1 | 12/2001 | Treado et al. |
| 2002/0093637 A1 | 7/2002 | Yuan et al. |
| 2002/0173780 A1 | 11/2002 | Altshuler et al. |
| 2002/0176092 A1 | 11/2002 | Deck |
| 2003/0097066 A1 | 5/2003 | Shelby et al. |
| 2003/0160957 A1 | 8/2003 | Oldham et al. |
| 2003/0160967 A1 | 8/2003 | Houston et al. |
| 2004/0030255 A1 | 2/2004 | Alfano et al. |
| 2004/0039379 A1 | 2/2004 | Viator et al. |
| 2004/0082070 A1 | 4/2004 | Jones et al. |
| 2004/0254474 A1 | 12/2004 | Seibel et al. |
| 2005/0015002 A1 | 1/2005 | Dixon et al. |
| 2005/0028482 A1 | 2/2005 | Cable et al. |
| 2005/0085725 A1 | 4/2005 | Nagar et al. |
| 2005/0143664 A1 | 6/2005 | Chen et al. |
| 2005/0154313 A1 | 7/2005 | Desilets et al. |

(56) References Cited

U.S. PATENT DOCUMENTS

| | | |
|---|---|---|
| 2005/0168749 A1 | 8/2005 | Ye et al. |
| 2005/0217381 A1 | 10/2005 | Falk |
| 2005/0234315 A1 | 10/2005 | Mayevsky et al. |
| 2005/0277824 A1 | 12/2005 | Aubry et al. |
| 2006/0055936 A1 | 3/2006 | Yun et al. |
| 2006/0058614 A1 | 3/2006 | Tsujita |
| 2006/0122516 A1 | 6/2006 | Schmidt et al. |
| 2006/0181791 A1 | 8/2006 | Van Beek et al. |
| 2006/0184042 A1 | 8/2006 | Wang et al. |
| 2006/0235299 A1 | 10/2006 | Martinelli |
| 2006/0247510 A1 | 11/2006 | Wiemker et al. |
| 2006/0264717 A1 | 11/2006 | Pesach et al. |
| 2007/0075063 A1 | 4/2007 | Wilbanks et al. |
| 2007/0088206 A1 | 4/2007 | Peyman et al. |
| 2007/0093702 A1 | 4/2007 | Yu et al. |
| 2007/0213590 A1 | 9/2007 | Squicciarini |
| 2007/0213618 A1 | 9/2007 | Li et al. |
| 2007/0213693 A1 | 9/2007 | Plunkett |
| 2007/0282200 A1 | 12/2007 | Johnson et al. |
| 2007/0299341 A1 | 12/2007 | Wang et al. |
| 2008/0029711 A1 | 2/2008 | Viellerobe et al. |
| 2008/0037367 A1 | 2/2008 | Gross et al. |
| 2008/0088838 A1 | 4/2008 | Raicu et al. |
| 2008/0123083 A1 | 5/2008 | Wang et al. |
| 2008/0173093 A1 | 7/2008 | Wang et al. |
| 2008/0230717 A1 | 9/2008 | Ashkenazi et al. |
| 2009/0051900 A1 | 2/2009 | Moon et al. |
| 2009/0054763 A1 | 2/2009 | Wang et al. |
| 2009/0088631 A1 | 4/2009 | Dietz et al. |
| 2009/0116518 A1 | 5/2009 | Patel et al. |
| 2009/0138215 A1 | 5/2009 | Wang et al. |
| 2009/0185191 A1 | 7/2009 | Boppart et al. |
| 2009/0227997 A1 | 9/2009 | Wang et al. |
| 2010/0079768 A1 | 4/2010 | Wang et al. |
| 2010/0134793 A1 | 6/2010 | Krishnamachari et al. |
| 2010/0245766 A1 | 9/2010 | Zhang et al. |
| 2010/0245769 A1 | 9/2010 | Zhang et al. |
| 2010/0245770 A1 | 9/2010 | Zhang et al. |
| 2010/0249562 A1 | 9/2010 | Zhang et al. |
| 2010/0268042 A1 | 10/2010 | Wang et al. |
| 2010/0285518 A1 | 11/2010 | Viator et al. |
| 2010/0309466 A1 | 12/2010 | Lucassen et al. |
| 2010/0322497 A1 | 12/2010 | Dempsey et al. |
| 2011/0071402 A1 | 3/2011 | Masumura |
| 2011/0122416 A1 | 5/2011 | Yang et al. |
| 2011/0201914 A1 | 8/2011 | Wang et al. |
| 2011/0251515 A1 | 10/2011 | Leuthardt et al. |
| 2011/0275890 A1 | 11/2011 | Wang et al. |
| 2011/0282181 A1 | 11/2011 | Wang et al. |
| 2011/0282192 A1 | 11/2011 | Axelrod et al. |
| 2012/0065490 A1 | 3/2012 | Zharov et al. |
| 2012/0070817 A1 | 3/2012 | Wang et al. |
| 2012/0074294 A1 | 3/2012 | Streuber et al. |
| 2012/0118052 A1 | 5/2012 | O'Donnell et al. |
| 2012/0204648 A1 | 8/2012 | Wang et al. |
| 2012/0275262 A1 | 11/2012 | Song et al. |
| 2012/0307250 A1 | 12/2012 | Wang |
| 2013/0151188 A1 | 6/2013 | Rokni et al. |
| 2013/0199299 A1 | 8/2013 | Wang et al. |
| 2013/0218002 A1 | 8/2013 | Kiraly |
| 2013/0245406 A1 | 9/2013 | Wang et al. |
| 2014/0009808 A1 | 1/2014 | Wang et al. |
| 2014/0029829 A1 | 1/2014 | Jiang et al. |
| 2014/0142404 A1 | 5/2014 | Wang et al. |
| 2014/0356897 A1 | 12/2014 | Wang et al. |
| 2015/0005613 A1 | 1/2015 | Kim et al. |
| 2015/0178959 A1 | 6/2015 | Huang et al. |
| 2015/0185187 A1 | 7/2015 | Wang et al. |
| 2015/0245771 A1 | 9/2015 | Wang et al. |
| 2015/0272444 A1 | 10/2015 | Maslov et al. |
| 2015/0272446 A1 | 10/2015 | Wang et al. |
| 2015/0316510 A1 | 11/2015 | Fukushima et al. |
| 2016/0081558 A1 | 3/2016 | Wang et al. |
| 2016/0235305 A1 | 8/2016 | Wang et al. |
| 2016/0242651 A1 | 8/2016 | Wang et al. |
| 2016/0249812 A1 | 9/2016 | Wang et al. |
| 2016/0262628 A1 | 9/2016 | Wang et al. |
| 2016/0305914 A1 | 10/2016 | Wang et al. |
| 2016/0310083 A1 | 10/2016 | Wang et al. |
| 2016/0345886 A1 | 12/2016 | Wang et al. |
| 2017/0065182 A1 | 3/2017 | Wang et al. |
| 2017/0105636 A1 | 4/2017 | Wang et al. |
| 2017/0367586 A9 | 12/2017 | Wang et al. |
| 2018/0020920 A1 | 1/2018 | Ermilov et al. |
| 2018/0088041 A1 | 3/2018 | Zhang et al. |
| 2018/0132728 A1 | 5/2018 | Wang et al. |
| 2018/0177407 A1 | 6/2018 | Hashimoto et al. |
| 2019/0008444 A1 | 1/2019 | Wang et al. |
| 2019/0125583 A1 | 5/2019 | Wang et al. |
| 2019/0227038 A1 | 7/2019 | Wang et al. |
| 2019/0307334 A1 | 10/2019 | Wang et al. |
| 2020/0056986 A1 | 2/2020 | Wang et al. |
| 2020/0073103 A1 | 3/2020 | Wang et al. |
| 2020/0268253 A1 | 8/2020 | Wang et al. |
| 2020/0275846 A1 | 9/2020 | Wang et al. |
| 2020/0397523 A1 | 12/2020 | Gao et al. |
| 2021/0010976 A1 | 1/2021 | Wang et al. |
| 2021/0132005 A1 | 5/2021 | Wang et al. |
| 2021/0321874 A1 | 10/2021 | Wang et al. |
| 2021/0333241 A1 | 10/2021 | Wang et al. |

FOREIGN PATENT DOCUMENTS

| | | |
|---|---|---|
| EP | 0012262 A1 | 6/1980 |
| EP | 0919180 A1 | 6/1999 |
| EP | 1493380 A1 | 1/2005 |
| JP | 05-126725 A | 5/1993 |
| JP | 2000/292416 A | 10/2000 |
| JP | 2009/068977 A | 4/2009 |
| JP | 2010/017426 A | 1/2010 |
| JP | 2010/040161 A | 2/2010 |
| JP | 2012/143384 A | 8/2012 |
| JP | 2013244122 A | 12/2013 |
| JP | 2014124242 A | 7/2014 |
| JP | 2014/224806 A | 12/2014 |
| JP | 2016-101260 A | 6/2016 |
| JP | 6086718 B2 | 3/2017 |
| KR | 100946550 B1 | 3/2010 |
| KR | 20160091059 A | 8/2016 |
| KR | 2017-0006470 A | 1/2017 |
| WO | WO2006/111929 A1 | 10/2006 |
| WO | WO2007/088709 A1 | 8/2007 |
| WO | WO2007/148239 A2 | 12/2007 |
| WO | WO2008/062354 A1 | 5/2008 |
| WO | WO2008/100386 A2 | 8/2008 |
| WO | WO2009/055705 A2 | 4/2009 |
| WO | WO2010/048258 A1 | 4/2010 |
| WO | WO2010/080991 A2 | 7/2010 |
| WO | WO2011/060101 A2 | 5/2011 |
| WO | WO2011/091360 A2 | 7/2011 |
| WO | WO2011/127428 A2 | 10/2011 |
| WO | WO2012/03 5472 A1 | 3/2012 |
| WO | WO2013/086293 A1 | 6/2013 |
| WO | WO2015/118881 A1 | 8/2015 |
| WO | WO2018/102446 A2 | 6/2018 |
| WO | WO-2018102467 A1 | 6/2018 |
| WO | WO2018/209046 | 11/2018 |

OTHER PUBLICATIONS

Final Office Action from related U.S. Appl. No. 11/625,099, dated Apr. 20, 2010.

Office Action from related U.S. Appl. No. 12/254,643, dated Aug. 6, 2010.

Notice of Allowance from related U.S. Appl. No. 12/254,643, dated Nov. 22, 2010.

Office Action from related U.S. Appl. No. 12/568,069, dated Dec. 21, 2012.

Office Action from related U.S. Appl. No. 12/568,069, dated Mar. 29, 2012.

Final Office Action from related U.S. Appl. No. 12/568,069, dated Sep. 18, 2012.

(56) References Cited

OTHER PUBLICATIONS

Notice of Allowance from related U.S. Appl. No. 12/568,069, dated Feb. 22, 2013.
Office Action from related U.S. Appl. No. 12/739,589, dated Jul. 19, 2012.
Notice of Allowance from related U.S. Appl. No. 12/739,589, dated Feb. 5, 2013.
Office Action from related U.S. Appl. No. 13/125,522, dated Jan. 22, 2013.
Final Office Action from related U.S. Appl. No. 13/125,522, dated May 23, 2013.
Office Action from related U.S. Appl. No. 13/125,522, dated Jul. 17, 2014.
Final Office Action from related U.S. Appl. No. 13/125,522, dated Oct. 29, 2014.
Office Action dated Aug. 26, 2015 issued in U.S. Appl. No. 13/125,522.
Final Office Action dated Mar. 3, 2016 issued in U.S. Appl. No. 13/125,522.
Notice of Allowance dated Sep. 19, 2016 issued in U.S. Appl. No. 13/125,522.
Office Action from related U.S. Appl. No. 13/143,832, dated Apr. 18, 2014.
Office Action from related U.S. Appl. No. 13/369,558, dated Jun. 20, 2014.
Notice of Allowance from related U.S. Appl. No. 13/369,558, dated Jul. 29, 2014.
Office Action from related U.S. Appl. No. 13/450,793, dated Jun. 5, 2013.
Final Office Action from related U.S. Appl. No. 13/450,793, dated Nov. 22, 2013.
Office Action from related U.S. Appl. No. 13/450,793, dated Mar. 24, 2014 (22 pages).
Office Action from related U.S. Appl. No. 13/450,793, dated Aug. 1, 2014 (21 pages).
Office Action from related U.S. Appl. No. 13/574,994, dated Mar. 17, 2014.
Final Office Action from related U.S. Appl. No. 13/574,994, dated Aug. 26, 2014.
Notice of Allowance dated Nov. 17, 2015 from U.S. Appl. No. 13/574,994.
Office Action dated Jan. 20, 2015, from U.S. Appl. No. 14/026,577.
Final Office Action dated Sep. 30, 2015, from U.S. Appl. No. 14/026,577.
Notice of Allowance dated Jan. 5, 2016, from U.S. Appl. No. 14/026,577.
Office Action dated Nov. 13, 2017, from U.S. Appl. No. 15/148,685.
Final Office Action dated Sep. 24, 2018, from U.S. Appl. No. 15/148,685.
Notice of Allowance dated May 16, 2019, from U.S. Appl. No. 15/148,685.
Office Action from related U.S. Appl. No. 13/637,897, dated Aug. 1, 2014 (7 pages).
Office Action from related U.S. Appl. No. 14/164,117, dated Dec. 11, 2015 (18 pages).
Office Action dated Dec. 13, 2019 issued in U.S. Appl. No. 15/037,468.
Notice of Allowance dated Mar. 23, 2020 issued in U.S. Appl. No. 15/037,468.
Amendment and Request for Continued Examination dated Nov. 25, 2019 in U.S. Appl. No. 14/436,581.
Final Office Action dated May 24, 2019 issued in U.S. Appl. No. 14/436,581.
Office Action dated Apr. 3, 2020 issued in U.S. Appl. No. 14/436,581.
The International Search Report and Written Opinion dated Mar. 27, 2014 issued in Application No. PCT/US2013/065594.
The International Search Report and The Written Opinion of the International Searching Authority, or the Declaration, for PCT/US2009/061435, dated Mar. 29, 2010, 6 pages.

The International Search Report and The Written Opinion of the International Searching Authority, dated Sep. 22, 2011, from related application No. PCT/US2011/022253, 6 pgs.
International Search Report of International Application No. PCT/US2014/066437, dated Feb. 26, 2015, 3 pages.
Partial European Search Report issued for European Application No. 17159220.7, dated Aug. 23, 2017 (9 pages).
International Search Report and Written Opinion dated Apr. 22, 2009, from Application No. PCT/US2008/081167 (7 pages).
International Search Report and Written Opinion from Application Serial No. PCT/US2010/020488, dated Aug. 31, 2010 (10 pages).
International Search Report and Written Opinion from Application Serial No. PCT/US2011/031823, dated Dec. 26, 2011 (8 pages).
International Search Report and Written Opinion from Application Serial No. PCT1US2012/068403, dated Mar. 19, 2013 (10 pages).
Extended European Search Report from European Application Serial No. 08842292.8, dated Dec. 17, 2013 (8 pages).
Final Office Action from related Japanese Patent Application No. JP 2010-531281, dated Mar. 11, 2014, (5 pages).
International Search Report and Written Opinion dated Dec. 2, 2019, issued in Application No. PCT/US2019/046574.
International Search Report and Written Opinion dated Dec. 23, 2019, issued in Application No. PCT/US2019/049594.
Al, et al., "Spectral-domain optical coherence tomography: Removal of autocorrelation using an optical switch," Applied Physics Letters, (Mar. 15, 2006), 88(11): pp. 111115-1-111115-3. <doi:10.1063/1.2186520>.
Allen, et al. "Pulsed Near-Infrared Laser Diode Excitation System for Biomedical Photoacoustic Imaging," Optics Letters, Optical Society of America, USA., vol. 31, No. 23, Dec. 1, 2006, pp. 3462-3464.
Aubry J.-F., et al., "Experimental demonstration of noninvasive transskull adaptive focusing based on prior computed tomography scans," J. Acoust. Soc. Am. 113(1), 84-93 (2003). (Year: 2003).
Baker, M. J. et al., "Using Fourier transform IR spectroscopy to analyze biological materials," Nat. Protoc. 9, 1771-1791 (2014).
Beaven, G. H. & Holiday, E. R., "Ultraviolet absorption spectra of proteins and amino acids," Adv. Protein Chem 7, 319-386 (1952).
Bell, A.G., "On the Production and Reproduction of Sound by Light," American Journal of Sciences, Oct. 1880, pp. 305-324, Third Series, vol. XX, USA.
Bioucas-Dias, J.M. and Figueiredo, M.A.T. "A new TwIST: two-step iterative shrinkage/thresholding algorithms for image restoration," IEEE Trans. Image Process. 16, 2992-3004 (Dec. 2007).
Calasso et al., "Photoacoustic Point Source," Physical Review Letters, vol. 86, No. 16, Apr. 16, 2001, pp. 3550-3553.
Cannata et al., "Development of a 35-MHz Piezo-Composite Ultrasound Array for Medical Imaging," IEE Transactions on Ultrasonics, Ferroelectrics, and Frequency Control, 53(1): pp. 224-236 (2006).
Chan, et al., "New opportunities in micro- and macro-attenuated total reflection infrared spectroscopic imaging: spatial resolution and sampling versatility," Appl. Spectrosc. 57, 381-389 (2003).
Cheng, J.-X. et al., "Vibrational spectroscopic imaging ofliving systems: an emerging platform for biology and medicine," Science, vol. 350 aaa8870, No. 6264, Nov. 27, 2015, pp. 1054-1063.
Cheong, et al., "A review of the optical properties of biological tissues," IEEE J. Quantum Electronics, 26(12): pp. 2166-2185 (1980).
Cox, B., Beard, P., "Photoacoustic tomography with a single detector in a reverberant cavity" J. Acoust. Soc. Am. 125, 1426 (Mar. 2009).
De Boer, et al., "Improved signal-to-noise ratio in spectral-domain compared with time-domain optical coherence tomography" Optics Letters, vol. 28, No. 21, Nov. 1, 2003, pp. 2067-2069.
D'Andrea, et al., "Time-resolved optical imaging through turbid media using a fast data acquisition system based on a gated CCD camera" Journal of Physics D: Applied Physics, vol. 36, No. 14, Jul. 1, 2003, pp. 1675-1681.
Danielli, et al., "Label-free photoacoustic nanoscopy," Journal of Biomedical Optics, vol. 19, No. 8, Aug. 2014, pp. 086006-1-086006-10.

(56) References Cited

OTHER PUBLICATIONS

Dazzi, A. et al., "AFM-IR: technology and applications in nanoscale infrared spectroscopy and chemical imaging," Chem. Rev. 117, 5146-5173 (2017).

Dazzi, A., et al., "Local infrared microspectroscopy with subwavelength spatial resolution with an atomic force microscope tip used as a photothermal sensor," Optics Letters, vol. 30, No. 18, Sep. 15, 2005, pp. 2388-2390.

Diebold, et al., "Photoacoustic Monopole Radiation in One, Two and Three Dimensions," Physical Review Letters, Figs. 1 and 2, vol. 67, No. 24, Dec. 9, 1991, pp. 3384-3387.

Diebold, et al., "Photoacoustic Signature of Particulate Matter: Optical Production of 9 Acoustic Monopole Radiation," Science New Series, Oct. 5, 1990, pp. 101-104, vol. 250, No. 4977, pp. 101-104.

Diem, M. et al., "Molecular pathology via IR and Raman spectral imaging." Journal of Biophotonics, vol. 6, No. 11-12 (2013) pp. 855-886. <doi:10.1002/jbio.201300131>.

Diem, M., et al., "A decade of vibrational micro-spectroscopy of human cells and tissue (1994-2004)†," Analyst, Oct. 2004, vol. 129, No. 10, pp. 880-885. <doi:10.1039/b408952a>.

Draeger, C., Fink, M., "One-channel time reversal of elastic waves in a chaotic 2D-silicon cavity," Phys. Rev. Lett. 79, 407-410 (Jul. 21, 1997).

Dunn, et al., "Transport-based image reconstruction in turbid media with small source-detector separations," Optics Letters, vol. 25, No. 24, Dec. 15, 2000, pp. 1777-1779.

Ermilov et al., "Laser optoacoustic imaging system for detection of breast cancer," Journal of Biomedical Optics, vol. 14 No. 2, p. 24007-024007-14 (2009).

Erpelding et al., "Sentinel Lymph Nodes in the Rat: Noninvasive Photoacoustic and US Imaging with a Clinical US System," Radiology, 256(1): 102-110 (2010).

Evans, et al., "Coherent Anti-Stokes Raman Scattering Microscopy: Chemical Imaging for Biology and Medicine," Annual Review of Analytical Chemistry 1, (2008), pp. 883-909.

Fan, et al., "Development of a Laser Photothermoacoustic Frequency-Swept System for Subsurface Imaging: Theory and Experiment," J. Acoust. Soc. Am., vol. 116 (6), Dec. 2004, pp. 3523-3533.

Fang, et al., "Photoacoustic Doppler effect from flowing small light-absorbing particles," Physical Review Letters 99(18) 184501- (1-4) (Nov. 2, 2007).

Fercher, et al., "Measurement of Intraocular Distances by Backscattering Spectral Interferometry," Optics Communications, 1995, vol. 117, pp. 43-48.

Fernandez, D. C., Bhargava, R., Hewitt, S. M. & Levin, I. W., "Infrared spectroscopic imaging for histopathologic recognition," Nat. Biotechnol. 23, 469-474 (2005).

Foster, et al., "Advances in ultrasound biomicroscopy" Ultrasound in Medicine & Biology, vol. 26, No. 1, Jan. 2000, pp. 1-27.

Fujita, K., et al., "Confocal multipoint multiphoton excitation microscope with microlens and pinhole arrays," Opt. Comm. 174, 7-12 (Jan. 15, 2000).

Furstenberg, et. al., "Chemical Imaging using Infrared Photothermal Microspectroscopy," In Proceedings of SPIE Defense, Security, and Sensing (eds Druy, M.A. & Crocombe, R. A.) 837411 (SPIE, 2012).

Gao, L.; Liang, J.]; Li, C.; Wang, L. V.; "Single-shot compressed ultrafast photography at one hundred billion frames per second," Nature 516(7529) 74-77 (Dec. 4, 2014).

Gibson, et al., "Recent advances in diffuse optical imaging" Physics in Medicine and Biology 50, 2005, pp. R1-R43, Inslilule of Physics Publishing, UK.

Gong, L. et al., "Breaking the diffraction limit by saturation in stimulated-Raman-scattering microscopy: a theoretical study," Phys. Rev. A 90, 13818 (2014).

Griffiths, P., "Fourier transform infrared spectrometry," Science 21, 297-302 (1983).

Guggenheim, et al., "Ultrasensitive planoconcave optical microresonators for ultrasound sensing", Nat. Photon. 11, 714-721 (2017).

Guittet C, et al., "In vivo high-frequency ultrasonic characterization of human dermis" IEEE Transactions on Bio-medical Engineering. Jun. 1999;46(6):740-746. <doi:10.1109/10.764950>.

Guo, et al., "Calibration-free absolute quantification of optical absorption coefficients using acoustic spectra in three-dimensional photoacoustic microscopy of biological tissue" Opt Lett. 2010 ; 35(12): 2067-2069. <doi:10.1364/OL.35.002067>.

Haas, J. et al., "Advances in Mid-Infrared Spectroscopy for Chemical Analysis," Annu. Rev. Anal. Chem. 9 (2016) pp. 45-68.

Hai, J. Yao, K.I. Maslov, Y. Zhou, and L.V. Wang, "Near-infrared optical-resolution photoacoustic microscopy", Opt. Lett. 39, 5192-5195 (Sep. 1, 2014).

Hai, P.; Imai, T.]; Xu, S.; Zhang, R.; Aft, R. L.; Zou, J.; Wang, L. V.; "High-throughput, label-free, single-cell photoacoustic microscopy of intratumoral metabolic heterogeneity," Nature Biomedical Engineering 3(5) 381-391 (May 2019).

Hebden et al., "Enhanced time-resolved imaging with a diffusion model of photon transport" Optics Letters, vol. 19, No. 5, 1994, pp. 311-313.

Hee, et al., "Femtosecond transillumination tomography in thick tissues" Optics Letters, vol. 18, No. 13, 1993, pp. 1107-1109.

Hillman, et al., "Laminar optical tomography: demonstration of millimeter-scale depth-resolved imaging in turbid media," Optics Letters, vol. 29, No. 14, Jul. 15, 2004, pp. 1650-1652.

Hoelen, et al., "Three Dimensional Photoacoustic Imaging of Blood Vessels in Tissue" Optics Letters, 1998, pp. 648-650, vol. 23, No. 8, Optical Society of America, USA.

Hu, S. et al., "Three-dimensional optical-resolution photoacoustic microscopy," Journal of Visualized Experiments 51 (2011).

Hu, S., et al., "Label-free Photoacoustic Ophthalmic Angiography" Optics Letters, 35(1), Jan. 1, 2010, pp. 1-3.

Huang, et al., "Aberration correction for transcranial photoacoustic tomography of primates employing adjunct image data," Journal of Biomedical Optics, vol. 17, No. 6, Jun. 2012, pp. 066016-1 to 066016-8.

Huang, et al., "Optical Coherence Tomography," Science, New Series, vol. 254, No. 5035, Nov. 22, 1991, pp. 1178-1181.

Huber, et al., "Three-Dimensional and C-Mode 6 OCT Imaging with a Compact, Frequency Swept Laser Source at 1300 nn" Optics Express, vol. 13, No. 26, Dec. 26, 2005, pp. 10523-10526.

Imai, T. et al., "High-throughput ultraviolet photoacoustic microscopy with multifocal excitation," Journal of Biomedical Optics, 23(3), (2018) pp. 036007-1-036007-6. <doi: 10.1117/1.JB0.23.3.036007>.

Ing, R. K., Quieffin, N., Catheline, S., Fink, M., "In solid localization of finger impacts using acoustic time-reversal process," Appl. Phys. Lett. 87, 204104 (Nov. 14, 2005).

Ji, M. et al., "Detection of human brain tumor infiltration with quantitative stimulated Raman scattering microscopy," Sci. Transl. Med 7, 309ra163 (2015).

Karamata, et al., "Multiple Scattering in Optical Coherence Tomography I Investigation and Modeling" Journal of Optical Society of America, vol. 22, No. 7 (2005) pp. 1369-1379.

Karamata, et al., "Multiple scattering in optical coherence tomography. II. Experimental and theoretical investigation of cross talk in wide-field optical coherence tomography" J. Opt. Soc. Am. A/vol. 22, No. 7/Jul. 2005, pp. 1380-1388.

Kim, C. et al., "In vivo molecular photoacoustic tomography of melanomas targeted by bio-conjugated gold nanocages" ACS Nano, 2010; 4(8), pp. 4559-4564. <doi:10.1021/nn100736c>.

Knoll, B. & Keilmann, F., "Near-field probing of vibrational absorption for chemical microscopy," Nature 399, 134-137 (1999).

Kole, M. R., et al., "Discrete frequency infrared microspectroscopy and imaging with a tunable quantum cascade laser," Anal. Chem. 84, 10366-10372 (2012).

Kolkman, et al., "In Vivo Photoacoustic Imaging of Blood Vessels Using an Extreme-Narrow Aperture Sensor" IEEE Journal of Selected Topics in Quantum Electronics, vol. 9, No. 2, Mar.-Apr. 2003, pp. 343-346.

Kruger et al., "Photoacoustic Ultrasound (PAUS)-Reconstruction Tomography" Med. Phys., Oct. 1995, vol. 22 (10) Am. Assoc. Phys. Med., USA, pp. 1605-1609.

(56) References Cited

OTHER PUBLICATIONS

Kruger, et al., "Thermoacoustic computed tomography—technical considerations" Medical Physics, 26(9): 1832-1837 (1999).
Kruger et al., "Thermoacoustic computed tomography using a conventional linear transducer array," Medical Physics, 30(5): 856-860 (2003).
Kruger, et al., "Thermoacoustic Molecular Imaging of Small Animals," Molecular Imaging, 2(2): 113-123 (2003).
Kruger, et al., "Breast Cancer in Vivo: Contrast Enhancement with Thermoacoustic CT at 434 MHz—Feasibility Study," Radiology, 216(1): 279-283 (2000).
Ku and Wang, "Scanning thermoacoustic tomography in biological tissue." Medical physics 27.5 (2000): 1195-1202.
Ku and Wang, "Scanning microwave-induced thermoacoustic tomography: Signal, resolution, and contrast," Medical Physics, 28(1): 4-10 (2001).
Ku, G. et al., "Multiple-bandwidth photoacoustic tomography," Physics in Medicine & Biology, 49(7): 1329-1338 (2004).
Ku and Wang, "Deeply penetrating photoacoustic tomography in biological tissues enhanced with an optical contrast agent," Optics Letters, 30(5): 507-509 (2005).
Ku, et al., "Imaging of tumor angiogenesis in rat brains in vivo by photoacoustic tomography," Applied Optics, 44(5): 770-775 (2005).
Ku, et al., "Thermoacoustic and Photoacoustic Tomography of Thick Biological Tissues Toward Breast Imaging," Technology in Cancer Research & Treatment, 4(5): 559-566 (2005).
Kunitz, M., "Crystalline desoxyribonuclease; isolation and general properties; spectrophotometric method for the measurement of desoxyribonuclease activity," The Journal General Physiology, vol. 33, Mar. 20, 1950, pp. 349-362. <URL:http://doi.org./10.1085/jgp.33.4.349>.
Lai, P. et al., "Photoacoustically guided wavefront shaping for enhanced optical focusing in scattering media," Nature Photonics 9 126-132 (Jan. 19, 2015).
Larina, et al., Real-time optoacoustic monitoring of temperature in tissues: Journal of Physics D: Applied Physics, vol. 38, (2005) pp. 2633-2639.
Lasch, et al., "FT-IR spectroscopic investigations of single cells on the subcellular level," Vibr. Spectrosc. 28, 147-157 (2002).
Laser Institute of America, "American National Standard for the safe use of lasers," American National Standard Institute (ANSI Z136.1-2007 Revision of ANSI Z136.1-2000).
Lewis, E. N. et al., "Fourier transform spectroscopic imaging using an infrared focal-Plane array detector," Anal. Chem. 67, 3377-3381 (1995).
Leitgeb, et al., "Performance of fourier domain vs. time domain optical coherence tomography," Optical Express, vol. 11, No. 8, Apr. 21, 2003, pp. 889-894.
Li, G., et al., "Reflection-mode multifocal optical-resolution photoacoustic microscopy," J. Biomed. Opt. 18, 030501 (Feb. 12, 2013).
Li, L., et al., "Small near-infrared photochromic protein for photoacoustic multi-contrast imaging and detection of protein interactions in vivo," Nature Communications 9(1) 2734 (Jul. 16, 2018).
Li, L . . . , et al., "Single-impulse panoramic photoacoustic computed tomography of small-animal whole-body dynamics at high spatiotemporal resolution," Nature Biomedical Engineering 1 0071 (May 10, 2017).
Li, L . . . , et al., "Simultaneous Molecular and Hypoxia Imaging of Brain Tumors in Vivo Using Spectroscopic Photoacoustic Tomography," Proceedings of the IEEE, 96(3): 481-489 (2008).
Li, Y. et al., "Multifocal photoacoustic microscopy through an ergodic relay (Conference Presentation)", Proc. SPIE 10878, Photons Plus Ultrasound: Imaging and Sensing 2019, 108781C, presented Feb. 4, 2019, published Mar. 4, 2019, https://doi.org/10.1117/12.2513502.
Li, et al., "Optical Coherence Computed Tomography," Applied Physics Letters, vol. 91, American Institute of Physics, 2007, pp. 141107-1-141107-3.
Li, Y., et al., "Snapshot photoacoustic topography through an ergodic relay for high-throughput imaging of optical absorption," Nature Photonics, Jan. 20, 2020. <URL:https://doi.org/10.1038/s41566-019-0576-2>.
Li, Z., et al., "Super-resolution far-field infrared imaging by photothermal heterodyne imaging," The Journal of Physical Chemistry B, vol. 121 (2017) pp. 8838-8846.
Li, Z., et al., "Super-resolution imaging with mid-IR photothermal microscopy on the single particle level," In Proceedings of SPIE Physical Chemistry of Interfaces and Nano-materials XIV, vol. 9549, Aug. 20, 2015, pp. 954912-1-954912-8.
Liang, et al., "Single-shot real-time femtosecond imaging of temporal focusing," Light-Science & Applications 7(1) 42 (Aug. 8, 2018).
Liang, et al., "Single-shot real-time video recording of a photonic Mach cone induced by a scattered light pulse," Science Advances 3(1) e1601814 (Jan. 20, 2017).
Liang, et al., "Single-shot ultrafast optical imaging," Optica 5(9) 1113-1127 (Sep. 2018).
Lin, et al., "Single-breath-hold photoacoustic computed tomography of the breast," Nature Communications 9(1) 2352 (Jun. 15, 2018).
Liu, et al., "Optical focusing deep inside dynamic scattering media with near-infrared time-reversed ultrasonically encoded (TRUE) light," Nature Communications 6 5409 (Jan. 5, 2015).
Lovell, et al., "Porphysome nanovesicles generated by porphyrin bilayers for use as multimodal biophotonic contrast agents," Nature Materials 10(4) 324-32 (Mar. 20, 2011).
Lu, F., et al., "Tip-enhanced infrared nanospectroscopy via molecular expansion force detection," Nat. Photon. 8, 307-312 (2014).
Lu, F.-K. et al., "Label-free DNA imaging in vivo with stimulated Raman scattering microscopy," Proc. Natl Acad Sci. USA 112, 11624-11629 (2015).
Ma, et al., "Time-reversed adapted-perturbation (TRAP) optical focusing onto dynamic objects inside scattering media," Nature Photonics 8(12) 931-936 (Nov. 2, 2014).
Manohar, et al., "Initial results of in vivo non-invasive cancer imaging in the human breast using near-infrared photoacoustics," Optics Express, 15(19): 12277-12285 (2007).
Maslov, et al., "In vivo dark-field reflection-mode photoacoustic microscopy," Optics Letters 30(6), Mar. 15, 2005, pp. 625-627.
Maslov, et al., "Optical-resolution photoacoustic microscopy for in vivo imaging of single capillaries," Optical Letters, 33(9): 929-931 (2008).
Maslov, et al., "Photoacoustic Imaging of biological tissue with Intensity-Modulated Continuous-Wave Laser" Journal of Biomedical Optics, 2008, pp. 024006 1-5, vol. 13(2), SPIE, USA.
Michaelian, Kirk H. Photoacoustic IR spectroscopy: instrumentation, applications and data analysis. Pub: John Wiley & Sons; Dec. 1, 2010. <Preface Only>.
Miller, et al., "Synchrotron-based biological microspectroscopy: From the mid-infrared through the far-infrared regimes," Journal of Biological Physics 29, 219-230 (2003).
Mishra et al., "Development and comparison of the DTM, the DOM and the FVM formulations for the short-pulse laser transport through a participating medium" International Journal of Heat and Mass Transfer, vol. 49 (2006) pp. 1820-1832.
Montaldo, et al., "Building three-dimensional images using time-reversal chaotic cavity", IEEE Trans. Ultrason. Ferroelectr. Freq. Control 52, pp. 1489-1497 (2005).
Morgner et al., "Spectroscopic optical coherence tomography," Optics Letters, vol. 25, No. 2, Jan. 15, 2000, pp. 111-113.
Murray et al., "High-Sensitivity Laser-Based Acoustic Microscopy Using a Modulated Excitation Source," Applied Physics Letters, vol. 85, No. 14, American Institute of Physics, USA., Oct. 4, 2004, pp. 2974-2976.
Nakajima, et al., "Three-dimensional analysis and classification of arteries in the skin and subcutaneous adipofascial tissue by computer graphics imaging," Plastic and Reconstructive Surgery, 102(3): 748-760 (1998).

(56) References Cited

OTHER PUBLICATIONS

Nasiriavanaki, et al., "High-resolution photoacoustic tomography of resting-state functional connectivity in the mouse brain," Proceedings of the National Academy of Sciences 111(1) 21-26 (Jan. 7, 2014).

Nasse, M. J. et al., "High-resolution Fourier-transform infrared chemical imaging with multiple synchrotron beams," Nat. Methods 8, 413-416 (2011).

Nelson et al., "Imaging Glioblastoma Multiforme," The Cancer Journal vol. 9, No. 2, Mar.-Apr. 2003, pp. 134-145.

Niederhauser et al., "Combined Ultrasound and Optoacoustic System for Real-Time High-Contrast Vascular imaging in Vivo," IEEE Transactions on MedicalImaging, 24(4): 436-440 (2005).

Nowak, D. et al., "Nanoscale chemical imaging by photoinduced force microscopy," Sci. Adv. 2, Mar. 25, 2016, e1501571, pp. 1-9.

Oraevsky et al., "Optoacoustic Tomography," Biomedical Photonics Handbook, 2003, chapter 34: pp. 931-964, CRC Press LLC, USA.

Oraevsky et al., "Ultimate Sensitivity of Time-Resolved Opto-Acoustic Detection," Biomedical Optoacoustics, 2000, pp. 228-239, vol. 3916, SPIE, USA.

Oraevsky et al., "Laser Optoacoustic Tomography of Layered Tissues: Signal Processing" Proceedings of SPIE, 2979: 59-70 (1997).

Oraevsky et al.,, "Laser opto-acoustic imaging of the breast: Detection of cancer angiogenesis" Proceedings of SPIE, 3597: 352-363 (1999).

Patel, et al., "Pulsed optoacoustic spectroscopy of condensed matter," Rev. Mod. Phys., vol. 53 (1981) pp. 517-550.

Petrov, et al., "Optoacoustic, Noninvasive, Real-Time, Continuous Monitoring of Cerebral Blood Oxygenation: An In Vivo Study in Sheep" Anesthesiology, vol. 102, No. 1, Jan. 2005, pp. 69-75.

Potter, et al., "Capillary diameter and geometry in cardiac and skeletal muscle studied by means of corrosion casts" Microvascular Research, 25(1): 68-84 (1983).

Prati, et al., "New advances in the application of FTIR microscopy and spectroscopy for the characterization of artistic materials," Accounts of Chemical Research, vol. 43, (2010) pp. 792-801.

Prevedel, et al., "Simultaneous whole-animal 3D imaging of neuronal activity using light-field microscopy," Nat. Methods 11, 727-730 (Jul. 2014).

Quickenden, et al., "The ultraviolet absorption spectrum ofliquid water," J Chem. Phys. 72, 4416-4428 (1980).

Robert et al., "Fabrication of Focused Poly (Vinylidene Fluoride-Trifluoroethylene) P19 (VDF-TrFE) Copolymer 40-50 MHz Ultrasound Transducers on Curved Surfaces," Journal of Applied Physics, vol. 96, No. 1. Jul. 1, 2004, pp. 252-256.

Rockley, M.G., "Fourier-transformed infrared photoacoustic spectroscopy of polystyrene film," Chem. Phys. Lett. 68, 455-456 (1979).

Saager et al., "Direct characterization and removal of interfering absorption trends in two-layer turbid media" J. Opt. Soc. Am. A, vol. 22, No. 9, Sep. 2005, pp. 1874-1882.

Sakadzic, et al., "Correlation transfer and diffusion of ultrasound-modulated multiply scattered light," Physical Review Letters 96(16) 163902-(1-4) (Apr. 28, 2006).

Savateeva, et al., "Noninvasive detection and staging or oral cancer in vivo with confocal opto-acoustic tomography" Biomedical Optoacoustics, vol. 3916, International Society for Optics and Photonics 2000, pp. 55-66.

Schmidt, et al., "A 32-Channel Time Resolved Instrument for Medical Optical Tomography" Review of Scientific Instruments, vol. 71, No. 1, Jan. 2000, pp. 256-265.

Schroeter, et al., "Spontaneous slow hemodynamic oscillations are impaired in cerebral microangiopathy," Journal of Cerebral Blood Flow & Metabolism (2005) 25, pp. 1675-1684.

Sethuraman et al., "Development of a combined intravascular ultrasound and photoacoustic imaging system" Proceedings of SPIE, 6086: 60860F.1-60860F.10 (2006).

Sethuraman et al., "Intravascular photoacoustic imaging of atherosclerotic plaques: Ex vivo study using a rabbit model of atherosclerosis" Proceedings of SPIE, 6437: 643729.1-643729.9 (2007).

Shah, J. et al., "Photoacoustic imaging and temperature measurement for photothermal cancer therapy," Journal of Biomedical Optics, vol. 13, No. 3, (May-Jun. 2008) pp. 034024-1-034024-9.

Sheth, et al., "Columnar Specificity of Microvascular Oxygenation and Volume Responses: Implications for Functional Brain Mapping," The Journal of Neuroscience, vol. 24, No. 3, Jan. 21, 2004, pp. 634-641.

Shi, J., et al., "High-resolution, high-contrast mid-infrared imaging of fresh biological samples with ultraviolet-localized photoacoustic microscopy," Nature Photonics 13 609-615 (May 2019).

Shmueli, et al., "Low Frequency Fluctuations in the Cardiac Rate as a Source of Variance in the Resting-State fMRI BOLD Signal," Neuroimage, vol. 38, No. 2, Nov. 1, 2007, pp. 306-320.

Silva, et al., "Toward Label-Free Super-Resolution Microscopy," ACS Photon. 3, 79-86 (2016).

Sim, et al., "In vivo Microscopic Photoacoustic Spectroscopy for Non-Invasive Glucose Monitoring Invulnerable to Skin Secretion Products," Sci. Rep. 8, 1059 (2018).

Siphanto et al., "Imaging of Small Vessels Using Photoacoustics: an in Vivo Study," Lasers in Surgery and Medicince, vol. 35, Wiley-Liss, Inc., Netherlands, Dec. 20, 2004, pp. 354-362.

Sommer, A. J., et al., "Attenuated total internal reflection infrared mapping microspectroscopy using an imaging microscope," Appl. Spectrosc. 55, 252-256 (2001).

Song, et al., "Fast 3-D dark-field reflection-mode photoacoustic microscopy in vivo with a 30-MHz ultrasound linear array" Journal of Biomedical Optics, 13(5): 054028.1-054028.5 (2008).

Song et al., "Multi-focal optical-resolution photoacoustic microscopy in vivo." NIH Public Access Author Manuscript, May 13, 2011. pp. 1-7.

Song, et al., "Section-illumination photoacoustic microscopy for dynamic 3D imaging of microcirculation in vivo" Optics Letters, 35(9): 1482-1484 (2010).

Steinbrink, et al., "Illuminating the BOLD signal: combined fMRI-fNIRS studies" Magnetic Resonance Imaging, vol. 24, No. 4, May 2006, pp. 495-505.

Stern, MD., "In vivo evaluation of microcirculation by coherent light scattering," Nature, 254(5495): 56-58 (1975).

Tam, A. C., "Applications of photoacoustic sensing techniques," Reviews of Modern Physics, vol. 58, No. 2, Apr. 1986, pp. 381-431.

Tearney, et al., "Scanning single-mode fiber optic catheter-endoscope for optical coherence tomography" Optics Letters, 21(7): 543-545 (1996).

Tran, et al., "In vivo endoscopic optical coherence tomography by use of a rotational microelectromechanical system probe" Optics Letters, 29(11): 1236-1238 (2004).

Treeby B. E. , Zhang E. Z. , Cox B. T. , "Photoacoustic tomography in absorbing acoustic media using time reversal ," Inverse Probl. 26(11) , (2010)(Year: 2010).

Van Essen, et al., "An Integrated Software Suite for Surface-based Analyses of Cerebral Cortex" Journal of the American Medical Informatics Association, vol. 8, No. 5, Sep.-Oct. 2001, pp. 443-459.

Viator et al., "Design testing of an endoscopic photoacoustic probe for determination of treatment depth after photodynamic therapy" Proceedings of SPIE in Biomedical Optoacoustics II, 4256: 16-27 (2001).

Wang, et al., "Ballistic 2-D Imaging Through Scattering Walls Using an Ultrafast Optical Kerr Gale," Science, vol. 253, Aug. 16, 1991, pp. 769-771.

Wang, et al., "Biomedical Optics, Principles and Imaging," Wiley-Interscience, A John Wiley & Sons, Inc., (2007) p. 7.

Wang, L. et al., "Grueneisen relaxation photoacoustic microscopy," Physical Review Letters 113 174301 (Oct. 24, 2014).

Wang, L. V & Yao, J., "A practical guide to photoacoustic tomography in the life sciences," Nat. Methods 13, 627-638 ( Jul. 28, 2016).

Wang, L. V., "Multiscale photoacoustic microscopy and computed tomography," Nat. Photon. 3, 503-509 (Aug. 29, 2009).

(56) References Cited

OTHER PUBLICATIONS

Wang, L. V.; "Mechanisms of ultrasonic modulation of multiply scattered coherent light: an analytic model," Physical Review Letters 87(4) 043903-(1-4) (Jul. 23, 2001).
Wang, L. V.; "Prospects of photoacoustic tomography," Medical Physics 35(12), Nov. 19, 2008, pp. 5758-5767.
Wang, L., et al., "Single-cell label-free photoacoustic flowoxigraphy in vivo," Proceedings of the National Academy of Sciences 110(15) 5759-5764 (Apr. 9, 2013).
Wang, L., et al., "Ultrasonically encoded photoacoustic flowgraphy in biological tissue," Physical Review Letters 111 204301 (Nov. 15, 2013).
Wang, L.V., Hu, S. "Photoacoustic Tomography: in vivo imaging from organelles to organs," Science 335, 1458-1462 (Mar. 23, 2012).
Wang, X. D., et al., "Noninvasive laser-induced photoacoustic tomography for structural and functional in vivo imaging of the brain," Nature Biotechnology 21(7) 803-806 (Jul. 2003).
Wang, et al., "MCMT—Monte Carlo modeling of light transport in multi-layered tissues" Computer Methods and Programs in Biomedicine, vol. 47, No. 2, Jul. 1995, pp. 131-146.
Wang et al., "Three-dimensional laser-induced photoacoustic tomography of mouse brain with the skin and skull intact," Optics Letters, 28(19): 1739-1741 (2003).
Wang et al., "Noninvasive photoacoustic angiography of animal brains in vivo with near-infrared light and an optical contrast agent" Optics Letters, 29(7): 730-732 (2004).
Wang, et al., "Intravascular Photoacoustic Imaging" IEEE J Quantum Electronics, 16(3): 588-599 (2010).
Wetzel, et al., "Imaging molecular chemistry with infrared microscopy," Science, New Series, vol. 285, No. 5431, Aug. 20, 1999, pp. 1224-1225.
Wong, T. et al., "Fast label-free multilayered histology-like imaging of human breast cancer by photoacoustic microscopy," Sci. Adv. 3, 1602168 (May 17, 2017).
Wong, T. et al., "Label-free automated three-dimensional imaging of whole organ by microtomy-assisted photoacoustic microscopy," Nat. Comm. 8, (Nov. 9, 2017).
Wu, Z., et al., "A microrobotic system guided by photoacoustic computed tomography for targeted navigation in intestines in vivo," Science Robotics 4(32) eaax0613 (Jul. 24, 2019).
Xia, J., et al., "Photoacoustic tomography: principles and advances," Electromagn. Waves 147, 1 (2014; available in PMC Jan. 30, 2015).
Xia, J., et al., "Wide-field two-dimensional multifocal optical-resolution photoacoustic-computed microscopy," Opt. Lett. 38(24), 5236-5239 (Dec. 15, 2013).
Xu, et al., "Photoacoustic Imaging in Biomedicine," Review of Scientific Instruments, American Institute of Physics, vol. 77 (2006) pp. 041101 1-22.
Xu, M. H.; Wang, L. V.; "Time-domain reconstruction for thermoacoustic tomography in a spherical geometry," IEEE Transactions on Medical Imaging 21(7) 814-822 (Jul. 2002).
Xu, M. H.; Wang, L. V.; "Universal back-projection algorithm for photoacoustic computed tomography," Physical Review E 71(1) 016706-(1-7) (Jan. 19, 2005).
Xu, S., et al., "Thermal expansion of confined water," Langmuir 25, 5076-5083 (2009).
Xu, X. et al., "Time-reversed ultrasonically encoded optical focusing into scattering media," Nature Photonics 5(3) 154-157 (Jan. 16, 2011).
Xu, Y.; Wang, L. V.; "Time reversal and its application to tomography with diffracting sources," Physical Review Letters 92(3) 033902-(1-4) (Jan. 23, 2004).
Xu et al . . . "Time Reversal Ultrasound Modulated Optical Tomography Using a BSO Phase Conjugate Mirror," poster presented at SIPE Conference 7177 on Jan. 26, 2009 (1 page).
Yadlowsky, et al., "Multiple scattering in optical coherence microscopy" Applied Optics, vol. 34, No. 25 (1995) pp. 5699-5707. <doi.org/10.1364/AO.34.005699>.
Yang, "Optical coherence and Doppler tomography for monitoring tissue changes induced by laser thermal therapy—An in vivo feasibility study" Review of Scientific Instruments , vol. 74, No. 1, Jan. 2003, p. 437-440.
Yang, J. M. et al., "Simultaneous functional photoacoustic and ultrasonic endoscopy of internal organs in vivo," Nature Medicine 18(8) 1297-1303 (Aug. 2012).
Yang, J., et al., "Motionless volumetric photoacoustic microscopy with spatially invariant resolution," Nature Communications 8(1) 780 (Oct. 3, 2017).
Yang, et al., "Novel biomedical imaging that combines intravascular ultrasound (IVUS) and optical coherence tomography (OCT)" IEEE International Ultrasonics Symposium, Beijing, China, Nov. 2-5, 2008, pp. 1769-1772.
Yang, et al., "Time-reversed ultrasonically encoded optical focusing using two ultrasonic transducers for improved ultrasonic axial resolution" Journal of Biomedical Optics 18(11), 110502 (Nov. 2013) pp. 110502-1-110502-4.
Yao, et al., "Monte Carlo simulation of an optical coherence tomography signal in homogeneous turbid media" Phys. Med. Biol. 44(9), Jul. 8, 1999, pp. 2307-2320.
Yao, et al., "Absolute photoacoustic thermometry in deep tissue," Opt. Lett. 38, 5228-5231 (2013).
Yao, et al., "In vivo label-free photoacoustic microscopy of cell nuclei by excitation of DNA and RNA," Opt. Lett. 35, 4139-4141 (2010).
Yao, et al., "Optimal ultraviolet wavelength for in vivo photoacoustic imaging of cell nuclei," J Biomed. Opt. 17, 056004 (2012).
Yao, et al., "Photoimprint photoacoustic microscopy for three-dimensional label-free sub-diffraction imaging," Physical Review Letters 112(1) 014302 (Jan. 10, 2014).
Yao, L. et al., "Multiscale photoacoustic tomography using reversibly switchable bacterial phytochrome as near-infrared photochromic probe," Nature Methods 13(1) 67-73 (Jan. 2016).
Yao, L. et al., "High-speed label-free functional photoacoustic microscopy of mouse brain in action," Nat. Methods 12(5), 407-410 (May 12, 2015).
Yao, L. et al., "Photoacoustic microscopy: superdepth, superresolution, and superb contrast", IEEE Pulse 6, 34-7 (May 13, 2015).
Yaqoob, et al., "Methods and application areas of endoscopic optical coherence tomography" Journal of Biomedical Optics, 11(6): 063001. 1-063001.19 (2006).
Yavuz, M. S., et al., "Gold nanocages covered by smart polymers for controlled release with near-infrared light," Nature Materials 8(12) 935-939 (Nov. 1, 2009).
Yodh et al., "Functional Imaging with Diffusing Light" Biomedical Photonics Handbook, 2003, Ch. 21 , pp. 45, CRC Press, Boca Raton.
Yodh, et al. "Spectroscopy and Imaging with Diffusing Light" Physics Today 48(3), Mar. 1995, pp. 34-40.
Zeff, et al., "Retinotopic mapping of adult human visual cortex with high-density diffuse optical tomography" PNAS, vol. 104, No. 29, Jul. 17, 2007, pp. 12169-12174.
Zemp, et al., "Realtime photoacoustic microscopy in vivo with a 30MHZ ultrasonic array transducer" Optics Express, 16(11): 7915-7928 (2008).
Zhang, C., et al., "Coherent Raman scattering microscopy in biology and medicine," Annu. Rev. Biomed. Eng. 17, 415-445 (2015).
Zhang, D. et al., "Depth-resolved mid-infrared photothermal imaging of living cells and organisms with submicrometer spatial resolution," Sci. Adv. 2, el600521 (2016).
Zhang, H. F. et al., "Functional photoacoustic microscopy for high-resolution and noninvasive in vivo imaging," Nature Biotechnology 24(7) 848-851 (Jul. 2006).
Zhang, H. F. et al., "In vivo imaging of subcutaneous structures using functional photoacoustic microscopy," Nature Protocols 2(4) 797-804 (Apr. 5, 2007).
Zhang, et al., "Intrinsic Functional Relations Between Human Cerebral Cortex and Thalamus" Journal of Neurophysiology, vol. 100, No. 4, Oct. 2008, pp. 1740-1748.
Zharov, et al., "In vivo photoacoustic flow cytometry for monitor of circulating single cancer cells and contrast agents," Optics Letters, 31(24): 3623-3625 (2006).

(56) References Cited

OTHER PUBLICATIONS

Zou, et al., "BOLD responses to visual stimulation in survivors of childhood cancer" NeuroImage, vol. 24, No. 1, Jan. 1, 2005, pp. 61-69.

Imai, et al., "High-throughput ultraviolet photoacoustic microscopy with multifocal excitation," J. Biomed. Opt. 23(3), (2018) pp. 036007-1-036007-6. <doi: 10.1117/1.JBO.23.3.036007>.

Liu, et al., "Label-free cell nuclear imaging by Grüneisen relaxation photoacoustic microscopy" Opt Lett. Feb. 15, 2018; 43(4), (2018) pp. 947-950.

Velasco, E., "Ultrafast Camera Takes 1 Trillion Frames Per Second of Transparent Objects and Phenomena" [Webpage] Caltech, California Institute of Technology, Jan. 17, 2020, pp. 1-2. <URL:https://www.eurekalert.org/pub_releases/2020-01/ciot-uct012120.php>.

Gao, et al., "A review of snapshot multidimensional optical imaging: measuring photon tags in parallel" Phys Rep. 616, Feb. 29, 2016, pp. 1-37. <doi:10.1016/j.physrep.2015.12.004>.

U.S. Appl. No. 16/798,204, filed Feb. 21, 2020, Wang et al.
U.S. Appl. No. 16/806,796, filed Mar. 2, 2020, Wang et al.
U.S. Appl. No. 16/946,496, filed Jun. 24, 2020, Gao et al.
Notice of Allowance dated Oct. 28, 2020 issued in U.S. Appl. No. 15/037,468.
Notice of Allowance dated Jun. 23, 2021 issued in U.S. Appl. No. 15/037,468.
Office Action dated Oct. 3, 2018 issued in U.S. Appl. No. 14/436,581.
Notice of Allowance dated Jan. 26, 2021 issued in U.S. Appl. No. 14/436,581.
Notice of Allowance dated Dec. 5, 2014 issued in U.S. Appl. No. 13/369,558.
Office Action dated Apr. 21, 2017 issued in U.S. Appl. No. 14/639,676.
Final Office Action dated Nov. 15, 2017 issued in U.S. Appl. No. 14/639,676.
Office Action dated May 31, 2018 issued in U.S. Appl. No. 14/639,676.
Notice of Allowance dated Dec. 12, 2018 issued in U.S. Appl. No. 14/639,676.
Office Action dated Feb. 28, 2020 issued in U.S. Appl. No. 16/372,597.
Office Action dated Aug. 19, 2019 issued in U.S. Appl. No. 16/372,597.
Office Action dated Oct. 8, 2020 issued in U.S. Appl. No. 16/372,597.
Notice of Allowance dated Feb. 2, 2021 issued in U.S. Appl. No. 16/372,597.
International Preliminary Report on Patentability dated Feb. 25, 2021, issued in Application No. PCT/US2019/046574.
International Preliminary Report on Patentability dated Mar. 18, 2021, issued in Application No. PCT/US2019/049594.
International Search Report and Written Opinion dated Aug. 31, 2020, issued in Application No. PCT/US2020/019368.
International Preliminary Report on Patentability dated Sep. 2, 2021, issued in Application No. PCT/US2020/019368.
International Search Report and Written Opinion dated Oct. 14, 2020, issued in Application No. PCT/US2020/07174.
International Search Report and Written Opinion dated Aug. 9, 2018 issued in Application No. PCT/US2018/032007.
International Preliminary Report on Patentability dated Nov. 12, 2019 issued in PCT/US2018/032007.
International Search Report and Written Opinion dated Mar. 2, 2021 issued in PCT/US2020/059214.

Abdelmohsen, et al., "Micro- and nano-motors for biomedical applications," J. Mater. Chem. B 2, (2014) pp. 2395-2408.

Alomair, et al., "In vivo high angular resolution diffusion-weighted imaging of mouse brain at 16.4 Tesla," PLoS One 10, Jun. 25, 2015, e0130133, pp. 1-17.

Arridge, et al., "Accelerated high-resolution photoacoustic tomography via compressed sensing," ArXiv Prepr. ArXiv160500133, 2016, pp. 8908-8940.

Baheiraei, et al., "Investigation of magnesium incorporation within gelatin/calcium phosphate nanocomposite scaffold for bone tissue engineering," Int. J. Appl. Ceram. Technol. 12, (2015) pp. 245-253.

Bansil, et al., "The biology of mucus: Composition, synthesis and organization" Adv. Drug Deliv. Rev. 124, (2018) pp. 3-15.

Bellinger, et al., "Oral, ultra-long-lasting drug delivery: Application toward malaria elimination goals" Sci Transl. Med. 8(365), Nov. 16, 2016, 365ra157, pp. 1-25. <doi:10.1126/scitranslmed.aag2374>.

Brenner, et al., "Computed Tomography—An Increasing Source of Radiation Exposure" N. Engl. J. Med 357;22, Nov. 29, 2007, pp. 2277-2284.

Celli, J. P., et al., "Helicobacter pylori moves through mucus by reducing mucin viscoelasticity," Proc. Natl. Acad. Sci. U. S. A. 106, (2009) pp. 14321-14326.

Chourasia, et al., "Design and Development of Multiparticulate System for Targeted Drug Delivery to Colon," Drug Delivery, 11:3, (2004) pp. 201-207.

Cox, et al., "Artifact trapping during time reversal photoacoustic imaging for acoustically heterogeneous media," IEEE Trans. Med. Imaging, vol. 29, No. 2, (2010) pp. 387-396.

Cui, Y., et al. "Transferring-conjugated magnetic silica PLGA nanoparticles loaded with doxorubicin and paclitaxel for brain glioma treatment," Biomaterials 34, (2013) pp. 8511-8520.

De Avila, et al., "Micromotor-enabled active drug delivery for in vivo treatment of stomach infection" Nat. Commun. 8: 272, (2017) pp. 1-9.

De Zerda, et al., "Family of enhanced photoacoustic imaging agents for high-sensitivity and multiplexing studies in living mice," ACS Nano 6(6), Jun. 26, 2012, pp. 4694-4701.

Deán-Ben, et al., "Functional optoacoustic neuro-tomography for scalable whole-brain monitoring of calcium indicators," Light Sci. Appl., vol. 5, No. 12, p. e16201, 2016, pp. 1-7.

Deáan-Ben, et al., "Portable spherical array probe for volumetric real-time optoacoustic imaging at centimeter-scale depths," Opt. Express, vol. 21, No. 23, 2013, pp. 28062-28071.

Deserno, M., "How to generate equidistributed points on the surface of a sphere," Polym. Ed, p. 99, 2004, p. 1.

Eghtedari, et al., "High Sensitivity of In Vivo Detection of Gold Nanorods Using a Laser Optoacoustic Imaging System," Nano Letters, vol. 7, No. 7, 2007, pp. 1914-1918.

Fan, et al., "Sub-Cellular Resolution Delivery of a Cytokine via Precisely Manipulated Nanowires" Nat. Nanotechnol. 5(7), Jul. 2010, 545-551. <doi:10.1038/nnano.2010.104>.

Gaihre, et al., "Gelatin-coated magnetic iron oxide nanoparticles as carrier system: Drug loading and in vitro drug release study," Int. J. Pharm. 365, (2009) pp. 180-189.

Gao, et al., "Artificial micromotors in the mouse's stomach: A step toward in vivo use of synthetic motors,"ACS Nano 9, (2015) pp. 117-123.

Guo, et al., "CsxWO3 nanorods coated with polyelectrolyte multilayers as a multifunctional nanomaterial for bimodal imaging-guided photothermal/photodynamic cancer treatment," Adv. Mater. 29, 1604157 (2017).

Han, Y. et al., "Three-dimensional optoacoustic reconstruction using fast sparse representation," Opt. Lett., vol. 42, No. 5, (2017) pp. 979-982.

Han, et al., "Optoacoustic image reconstruction and system analysis for finite-aperture detectors under the wavelet-packet framework," J. Biomed. Opt., vol. 21, No. 1, Jan. 2016, pp. 016002-1-016002-9.

Hong, et al., "Simple Method to Produce Janus Colloidal Particles in Large Quantity" Langmuir 22, (2006) pp. 9495-9499.

Hu, C., et al., "Soft Micro- and Nanorobotics," Annu. Rev. Control. Robot. Auton. Syst. 1, (2018) pp. 53-75.

Hu, W., et al., "Small-scale soft-bodied robot with multimodal locomotion," Nature 554, 81-85, (2018).

Huang, et al., "Full-wave iterative image reconstruction in photoacoustic tomography with acoustically inhomogeneous media," IEEE Trans. Med. Imaging, vol. 32, No. 6, Jun. 2013, pp. 1097-1110.

Ji, T. et al. "Preparation, Characterization, and Application of Au-Shell/Polystyrene Beads and Au-hell/Magnetic Beads" Adv. Mater. 13(16), Aug. 2001, pp. 1253-1256.

Karshalev, E. et al., "Micromotor Pills as a Dynamic Oral Delivery Platform" American Chemical Society Nano, 2018, vol. 12, No. 8, pp. 8397-8405 <DOI: 10.1021/acsnano.8b03760>.

(56) References Cited

OTHER PUBLICATIONS

Kirch, J., et al., "Optical tweezers reveal relationship between microstructure and nanoparticle penetration of pulmonary mucus," Proc. Natl. Acad. Sci. 109, (2012) pp. 18355-18360.

Koziolek, et al., "Navigating the human gastrointestinal tract for oral drug delivery: Uncharted waters and new frontiers," Adv. Drug Delivery Rev. 101, (2016) pp. 75-88.

R. A. Kruger, et al., "Dedicated 3D photoacoustic breast imaging," Med. Phys., vol. 40, No. 11, 2013, pp. 113301-1-113301-8.

Kruger, et al., "Thermoacoustic CT: imaging principles," Proc. SPIE 3916, (2000) pp. 150-160.

Kuppusami, S. et al., "Parylene Coatings in Medical Devices and Implants: A Review" Universal Journal of Biomedical Engineering, 2015, vol. 3, No. 2, pp. 9-14 <DOI: 10.13189/ujbe.2015.030201>.

Lai, S. et al., "Mucus-penetrating nanoparticles for drug and gene delivery to mucosal tissues," Adv. Drug Deliv. Rev. 61(2), Feb. 27, 2009, pp. 158-171. <doi:10.1016/j.addr.2008.11.002>.

Lai, P. et al., "Dependence of optical scattering from Intralipid in gelatin-gel based tissue-mimicking phantoms on mixing temperature and time" Journal of Biomedical Optics, vol. 19, No. 3, Mar. 2014, pp. 035002-1-035002-6.

Leal, et al., "Physicochemical properties of mucus and their impact on transmucosal drug delivery," Int. J. Pharm. 532, (2017) pp. 555-572.

Li, et al., "An Enteric Micromotor Can Selectively Position and Spontaneously Propel in the Gastrointestinal Tract," ACS Nano. 10(10), Oct. 25, 2016, pp. 9536-9542. <doi:10.1021/acsnano.6b04795>.

Li, et al., "Autonomous Collision-Free Navigation of Microvehicles in Complex and Dynamically Changing Environments" ACS Nano, 11, (2017) pp. 9268-9275.

Li, J. et al., "Micromotors Spontaneously Neutralize Gastric Acid for pH-Responsive Payload Release" Angewandte Chemie International Edition, vol. 5 6, No. 8, 2017, pp. 2156-2161. <DOI: 10.1002/anie.201611774>.

Li, J. et al., "Micro/Nanorobots for Biomedicine: Delivery, Surgery, Sensing, and Detoxification" Sci Robot, 2(4), Mar. 15, 2017, pp. 1-20. <doi:10.1126/scirobotics.aam6431>.

Matthews, et al., "Parameterized Joint Reconstruction of the Initial Pressure and Sound Speed Distributions for Photoacoustic Computed Tomography," SIAM J. Imaging Sci., vol. 11, No. 2, (2018) pp. 1560-1588.

Matsumoto, et al., "Label-free photoacoustic imaging of human palmar vessels: a structural morphological analysis," Sci. Rep., vol. 8, No. 1, (2018) p. 786.

Medina-Sanchez, et al., "Medical microbots need better imaging and control," Nature 545, (2017) pp. 406-408.

Mitsuhashi, et al., "A forward-adjoint operator pair based on the elastic wave equation for use in transcranial photoacoustic computed tomography," SIAM J. Imaging Sci., vol. 10, No. 4, 2017, pp. 2022-2048.

Mitsuhashi, et al., "Investigation of the far-field approximation for modeling a transducer's spatial impulse response in photoacoustic computed tomography," Photoacoustics, vol. 2, No. 1, 2014, pp. 21-32.

Ntziachristos, V., "Going deeper than microscopy: the optical imaging frontier in biology" Nature Methods vol. 7, No. 8, Aug. 2010, pp. 603-614.

Ogunlade, et al., "In vivo three-dimensional photoacoustic imaging of the renal vasculature in preclinical rodent models," Am. J. Physiol.-Ren. Physiol., vol. 314, No. 6, (2018) pp. F1145-F1153.

Paxton, et al., "Catalytic nanomotors: Autonomous movement of striped nanorods," J. Am. Chem. Soc. 126, 13424-13431 (2004).

Pramanik, M., "Improving tangential resolution with a modified delayand-sum reconstruction algorithm in photoacoustic and thermoacoustic tomography," JOSA A, vol. 31, No. 3, (2014) pp. 621-627.

Razansky, et al., "Multispectral opto-acoustic tomography of deep-seated fluorescent proteins in vivo," Nature Photonics 3, (2009) pp. 412-417.

Rosenblum, et al., "Progress and challenges towards targeted delivery of cancer therapeutics" Nat. Commun. 9, (2018) 1410, pp. 1-12.

Sanchez, et al., "Chemically powered micro- and nanomotors," Angew. Chem. Int. Ed. 54, (2015) pp. 1414-1444.

Schambach, et al., "Application of micro-CT in small animal imaging" Methods, vol. 50, No. 1, Jan. 2010, pp. 2-13.

Scholte, et al., "On spatial sampling and aliasing in acoustic imaging" 12th Intern. congress on sound and vibration, Lisbon, Portugal (2005) pp. 1-8.

Schoeder, et al., "Optoacoustic image reconstruction: the full inverse problem with variable bases," Proc. R. Soc. A, vol. 474, No. 2219, (2018) pp. 1-20.

Servant, et al., "Controlled In Vivo Swimming of a Swarm of Bacteria-Like Microrobotic Flagella" Advanced Materials 27, (2015) pp. 2981-2988.

Sezer, et al., "Review of magnesium-based biomaterials and their applications," J. Magnesium Alloys 6, (2018) pp. 23-43.

Sitti, M., "Miniature soft robots—road to the clinic," Nat. Rev. Mater, 3, (2018) pp. 74-75.

Smith, et al., "Beyond C, H, O, and Ni analysis of the elemental composition of U.S. FDA approved drug architectures," J. Med. Chem. 57, pp. 9764-9773 (2014).

Soppimath, et al., "Microspheres as floating drug-delivery systems to increase gastric retention of drugs" Drug Metab. Rev. 33, (2001) pp. 149-160.

Tay, et al., "Magnetic Particle Imaging Guided Heating In Vivo using Gradient Fields For Arbitrary Localization of Magnetic Hyperthermia Therapy" ACS Nano. 12(4), Apr. 24, 2018, pp. 3699-3713. <doi:10.1021/acsnano.8b00893>.

Treeby, et al., "k-Wave: MATLAB toolbox for the simulation and reconstruction of photoacoustic wave fields," J. Biomed. Opt., vol. 15, No. 2, Mar.-Apr. 2010, pp. 021314.

Treeby, et al., "Advanced photoacoustic image reconstruction using the k-Wave toolbox," in Photons Plus Ultrasound: Imaging and Sensing 2016, 2016, vol. 9708, p. 97082P.

Tu, et al., "Self-propelled supramolecular nanomotors with temperature-responsive speed regulation," Nat. Chem. 9, 480 (2016).

Tzoumas, et al., "Eigenspectra optoacoustic tomography achieves quantitative blood oxygenation imaging deep in tissues," Nat. Commun., vol. 7, 2016, pp. 1-10.

Vilela, et al., "Medical imaging for the tracking of micromotors," ACS Nano 12, (2018) pp. 1220-1227.

Wang et al., "Biomedical optics: principles and imaging," Section 12.5; Photoacoustic Tomography, John Wiley & Sons (2012) pp. 288-290.

Wang, et al., "Fabrication of micro/nanoscale motors" Chem. Rev. 115, (2015) pp. 8704-8735.

Wang, B. et al., "Recent progress on micro- and nano-robots: towards in vivo tracking and localization" Quantitative Imaging in Medicine and Surgery, 2018, vol. 8, No. 5, pp. 461-479. <DOI: 10.21037/qims.2018.06.07>.

Wang, et al., "Nano/microscale motors: biomedical opportunities and challenges," ACS Nano 6, (2012) pp. 5745-5751.

Wang, K. et al., "Investigation of iterative image reconstruction in three-dimensional optoacoustic tomography," Phys. Med. Biol., vol. 57, No. 17, 2012, p. 5399-5423.

Wu, D., et al., "In vivo Mapping of Macroscopic Neuronal Projections in the Mouse Hippocampus using High-resolution Diffusion MRI," Neuroimage 125, Jan. 15, 2016, pp. 84-93.

Xu, et al., "Exact frequency-domain reconstruction for thermoacoustic tomography—II: Cylindrical geometry," IEEE Trans. Med. Imaging, vol. 21, No. 7, (2002) pp. 829-833.

Xu, et al., "Rhesus monkey brain imaging through intact skull with thermoacoustic tomography," IEEE Trans. Ultrason. Ferroelectr. Freq. Control, vol. 53, No. 3, Mar. 2006, pp. 542-548.

Yan, et al., "Multifunctional biohybrid magnetite microrobots for imaging-guided therapy" Yan et al., Sci. Robot. 2, eaaq1155, Nov. 22, 2017, pp. 1-14.

Yang, et al., "The grand challenges of science robotics," Science Robotics 3, Jan. 31, 2018, eaar7650, pp. 1-14.

Yang, J.M., et al., "Focusing light inside live tissue using reversibly switchable bacterial phytochrome as a genetically encoded photochromic guide star" Science Advances 5(12) (2019) pp. 1-9.

(56) References Cited

OTHER PUBLICATIONS

Yin, et al., "Agarose particle-templated porous bacterial cellulose and its application in cartilage growth in vitro" Acta Biomater. 12, Jan. 2015, pp. 129-138. <doi:10.1016/j.actbio.2014.10.019>.

Zhou, et al., "Tutorial on photoacoustic tomography," J. Biomed. Opt., vol. 21, No. 6, Jun. 2016, pp. 061007-1-061007-14.

Duan, T. et al., "Hybrid Multi-wavelength Photoacoustic Imaging", 40th Annual International Conference of the IEEE Engineering in Medicine and Biology Society (EMBC), Jul. 18, 2018, pp. 4804-4807.

EP Office Action dated May 11, 2022, in Application No. EP19849860.2.

Extended European Search Report dated Apr. 22, 2022, in Application No. 19849860.2.

Extended European search report dated May 23, 2022, in Application No. EP19857631.6.

International Preliminary Report on Patentability dated Jan. 6, 2022 in PCT Application No. PCT/US2020/070174.

International Preliminary Report on Patentability dated May 19, 2022, in PCT Application No. PCT/US2020/059214.

Li, Y. et al., "Multifocal Photoacoustic Microscopy Using a Single-element Ultrasonic Transducer Through an Ergodic Relay", Light: Science & Applications, Jul. 31, 2020, vol. 9, No. 135, pp. 1-7.

Notice of Allowance dated Jan. 5, 2022 issued in U.S. Appl. No. 16/540,936.

U.S. Corrected Notice of Allowance dated Apr. 27, 2022 in U.S. Appl. No. 16/540,936.

U.S. Corrected Notice of Allowance dated Jun. 2, 2022 In U.S. Appl. No. 16/806,796.

U.S. Ex Parte Quayle Action dated Dec. 13, 2021 in U.S. Appl. No. 16/611,939.

U.S. Non-Final Office Action dated May 2, 2022 in U.S. Appl. No. 16/798,204.

U.S Notice of Allowance dated Apr. 19, 2022 in U.S. Appl. No. 16/540,936.

U.S. Notice of Allowance dated Aug. 5, 2022 in U.S. Appl. No. 16/540,936.

U.S. Notice of Allowance dated Feb. 23, 2022 in U.S. Appl. No. 16/806,796.

Yao, J. et al., "Double-illumination Photoacoustic Microscopy", Optics Letters, Feb. 15, 2012, vol. 37, No. 4, pp. 659-661.

U.S. Notice of Allowance dated Sep. 7, 2022 in U.S. Appl. No. 16/611,939.

U.S. Non Final Office Action dated Aug. 26, 2022 in U.S. Appl. No. 17/302,313.

U.S. Corrected Notice of Allowance dated Nov. 14, 2022 in U.S. Appl. No. 16/540,936.

U.S. Non-Final office Action dated Dec. 21, 2022 in U.S. Appl. No. 17/090,752.

U.S. Notice of Allowance dated Dec. 22, 2022 in U.S. Appl. No. 16/611,939.

U.S. Restriction Requirement dated Dec. 15, 2022 in U.S. Appl. No. 17/302,041.

\* cited by examiner

ENHANCED-RESOLUTION INFRARED PHOTOACOUSTIC MICROSCOPY AND SPECTROSCOPY

CROSS-REFERENCES TO RELATED APPLICATIONS

This application claims priority to and benefit of U.S. Provisional Patent Application No. 62/726,860, titled "High-Resolution, High-Contrast Mid-Infrared Imaging Of Fresh Biological Samples With Ultraviolet-Localized Photoacoustic Microscopy" and filed on Sep. 4, 2018, which is hereby incorporated by reference in its entirety and for all purposes.

FEDERALLY SPONSORED RESEARCH OR DEVELOPMENT

This invention was made with government support under Grant No(s) CA186567, EB016986, NS090579 and NS099717 awarded by the National Institutes of Health. The government has certain rights in the invention.

FIELD

Certain implementations pertain generally to photoacoustic imaging, and more specifically, to photoacoustic spectroscopic and imaging systems and methods with enhanced-resolution.

BACKGROUND

Photoacoustic imaging is based on the photoacoustic effect where pulsed or modulated radiation is delivered to a sample and some of the delivered energy is absorbed and converted into heat, leading to transient thermoelastic expansion generating ultrasonic emissions. The ultrasonic emissions can be detected by an ultrasonic transducer device and analyzed to produce photoacoustic images. A photoacoustic image depends on the optical absorption properties of the sample being imaged. As a consequence, it offers greater molecular specificity than conventional ultrasound imaging with the ability to detect hemoglobin, lipids, water and other light-absorbing chromophores, but with greater penetration depth than pure optical imaging modalities that rely on ballistic photons. These attributes lend photoacoustic imaging to a wide variety of applications in clinical medicine, preclinical research and basic biology for studying cancer, cardiovascular disease, abnormalities of the microcirculation and other conditions.

SUMMARY

Certain aspects pertain to an apparatus for measuring infrared absorption of a sample during operation. In some aspects, the apparatus includes a first radiation source configured to emit pulses of infrared radiation and a second radiation source configured to emit pulses with shorter wavelength than the pulses of infrared radiation emitted from the first radiation source. The apparatus also includes one or more optical elements configured to deliver of pulses of infrared radiation (e.g., mid-infrared radiation) to a region of the sample and to the deliver pulses from the second radiation source to a sub-region within the region. In addition, the apparatus also includes an ultrasonic transducer acoustically coupled to the sample to detect photoacoustic signals induced by at least one of the radiation sources and one or more processors and memory configured to analyze one or more properties of the detected photoacoustic signals to create a signal indicative of infrared absorption of the sub-region of the sample. In one aspect, the one or more processors and memory are further configured to create an infrared image of the sample using the one or more analyzed properties of the detected photoacoustic signals. In one aspect, the second radiation source is configured to emit ultraviolet radiation pulses. In one aspect, the second radiation source is configured to emit pulses with a wavelength between about 100 nm and about 2000 nm. In one aspect, the one or more processors and memory are configured to analyze the infrared absorption of the sub-region of the sample by calculating a difference in amplitude between a first photoacoustic signal induced by a radiation pulse from the second radiation source and a second photoacoustic signal induced by another radiation pulse from the second radiation source.

In some aspects, an apparatus for measuring infrared absorption of a sample during operation includes a first radiation source configured to emit mid-infrared radiation pulses. In one aspect, the apparatus is further configured to deliver: (i) a first ultraviolet radiation pulse to the sub-region, the first ultraviolet radiation pulse inducing a first photoacoustic signal; (ii) a mid-infrared radiation pulse to the region of the sample; and (iii) a second ultraviolet radiation pulse to the sub-region of the sample the second ultraviolet radiation pulse inducing a second photoacoustic signal. In this aspect, the one or more processors and memory may be optionally further configured to calculate a difference between the first and second photoacoustic signals, the difference being indicative of an infrared absorption property of the sub-region of the sample.

In one aspect, an apparatus also includes a pulser configured to generate trigger pulses, at least one of which is configured to trigger the second radiation source to emit a first ultraviolet radiation pulse at a first time before or after the first radiation source is triggered to emit a first infrared radiation pulse, and wherein at least one of the trigger pulses is configured to trigger the second radiation source to emit a second ultraviolet radiation pulse at a second time after the first radiation source is triggered to emit the first infrared radiation pulse. Optionally, the one or more processors and memory are configured to analyze the infrared absorption of the sub-region of the sample by calculating a difference in amplitudes of a first photoacoustic signal induced by the first ultraviolet radiation pulse and a second photoacoustic signal induced by the second ultraviolet radiation pulse.

In one aspect of an apparatus for measuring infrared absorption of a sample during operation, the apparatus also includes a tunable infrared radiation source that may optionally include at least one of an optical parametric oscillator and a quantum cascade laser.

In one aspect of an apparatus for measuring infrared absorption of a sample during operation, the apparatus also includes a broadband infrared radiation source or a fixed wavelength radiation source optically coupled to the one or more optical elements and configured to emit the infrared radiation pulses.

In one aspect of an apparatus for measuring infrared absorption of a sample during operation, the one or more processors and memory are configured to measure the signal indicative of infrared absorption of the sub-region with a spatial resolution of less than 1,000 nm. In another aspect, the one or more processors and memory are configured to measure the signal indicative of infrared absorption of the sub-region with a spatial resolution of less than 500 nm.

In one aspect of the apparatus for measuring infrared absorption of a sample during operation, the apparatus further includes a photodiode configured to measure an intensity of pulses emitted from the second radiation source. In this aspect, the one or more processors and memory may be optionally configured to normalize the photoacoustic signals by compensating for variations in pulse energy from pulses emitted from the second radiation source using measurements from the photodiode.

In one aspect of an apparatus for measuring infrared absorption of a sample during operation, the apparatus further includes a scanning mechanism configured to move at least one of the sample or one or more of the optical elements such that the infrared radiation pulse is scanned to a plurality of regions in a field-of-view of the sample and the first and second ultraviolet radiation pulses are scanned to one or more sub-regions within each region of the plurality of regions. Optionally, the one or more processors and the memory are further configured to use the signal indicative of infrared absorption of the sub-region in each of the plurality of regions to determine an infrared image of the sample.

In one aspect of the apparatus for measuring infrared absorption of a sample during operation, the signal indicative of infrared radiation is measured at a plurality of wavelengths of the first radiation source to construct a spectrum of infrared absorption of the sub-region.

In one aspect of an apparatus for measuring infrared absorption of a sample during operation, the apparatus further comprises a microlens array to generate an array of infrared radiation pulses and an array of additional radiation pulses, wherein the one or more optical elements further are configured to deliver the array of infrared radiation pulses and the array of additional pulses to a plurality of regions of the sample.

In one aspect of an apparatus for measuring infrared absorption of a sample during operation, the first radiation source is configured to emit pulses with wavelengths between about 3,000 and about 8,000 nanometers, between about 5,800 and about 6,200 nanometers, and the second radiation source is configured to emit pulses with wavelengths between about 200 and about 300 nanometers.

Certain aspects pertain to a method for measuring infrared absorption of a sample. In some aspect, the method includes: (i) initiating delivery of a first radiation pulse of shorter wavelength than infrared radiation to a sub-region of a region of a sample; (ii) initiating delivery of an infrared radiation pulse to the region of the sample; (iii) initiating delivery of a second radiation pulse of shorter wavelength than infrared radiation to the sub-region of the sample, wherein the second radiation pulse is initiated at a first delay time after (ii); (iv) receiving, from an ultrasonic transducer acoustically coupled to the sample, photoacoustic signals induced by the first radiation pulse and the second radiation pulse; and (v) analyzing one or more properties of the detected photoacoustic signals to determine a signal indicative of infrared absorption of the sub-region of the sample.

In one aspect, the first radiation pulse is initiated before (ii) or at a second delay time after (iii). In one aspect, operation (v) comprises determining the signal indicative of infrared absorption of the sub-region of the sample by calculating a difference in amplitudes of photoacoustic signals induced by the first and second radiation pulses.

In one aspect of a method for measuring infrared absorption of a sample, the method further comprises scanning relative positions the infrared radiation pulse, the first radiation pulse, and the second radiation pulse to a plurality of regions of the sample.

In one aspect of a method for measuring infrared absorption of a sample, the first radiation pulse and the second radiation pulse have wavelength between about 100 nm and about 2000 nm.

In one aspect of a method for measuring infrared absorption of a sample, the first radiation pulse and the second radiation pulse are ultraviolet radiation pulses and the infrared radiation pulse is a mid-infrared radiation pulse.

In one aspect of a method for measuring infrared absorption of a sample, the first delay time is less than about 1,000 nanoseconds or less than about 500 nanoseconds. In another aspect, the first delay time is between about 100 nanoseconds and about 500 nanoseconds.

In one aspect of a method for measuring infrared absorption of a sample, the method further comprises initiating delivery of one or more additional radiation pulses of shorter wavelength than infrared radiation to additional sub-regions of the illuminated region, wherein the additional radiation pulses are initiated within a the first delay time after (ii). Optionally, the first delay time is less than or equal to a thermal confinement period of the sample and/or between about 100 nanoseconds and about 500 nanoseconds after (ii).

In one aspect of a method for measuring infrared absorption of a sample, (ii) further comprises tuning a tunable infrared radiation source to generate infrared radiation pulses at a plurality of infrared wavelengths.

In one aspect of a method for measuring infrared absorption of a sample, (i) comprises initiating delivery of a first ultraviolet radiation pulse to the sub-region, the first ultraviolet radiation pulse inducing a first photoacoustic signal; and (iii) comprises initiating delivery of a second ultraviolet radiation pulse to the sub-region during the first delay time after (ii), the second ultraviolet radiation pulse inducing a second photoacoustic signal. Optionally the method further includes measuring, using a photosensor, an amplitude of the first ultraviolet radiation pulse; measuring, using the photosensor, an amplitude of the second ultraviolet radiation pulse; and normalizing the amplitudes of the first and second photoacoustic signals based on the measured amplitudes of the first and second ultraviolet radiation pulses.

In some aspects, a method for measuring infrared absorption of a sample further comprises creating an infrared image of the sample using the one or more analyzed properties of the detected photoacoustic signals. In one aspect, the infrared image has a spatial resolution of less than 1,000 nm. In another aspect, the infrared image has a spatial resolution of less than 500 nm. In another aspect, the infrared image has a spatial resolution finer than one-tenth of a wavelength of the infrared radiation pulse.

In one aspect, a method for measuring infrared absorption of a sample further comprises, before (v), normalizing the photoacoustic signals by compensating for variations in the first and second radiation pulses using measured amplitudes of the first and second radiation pulses.

In one aspect, a method for measuring infrared absorption of a sample further comprises scanning the infrared radiation pulse, the first radiation pulse, and the second radiation pulse to a plurality of regions of the sample.

In one aspect of a method for measuring infrared absorption of a sample, the signal indicative of infrared radiation is measured at a plurality of wavelengths of the first radiation source to construct a spectrum of infrared absorption of the sub-region.

These and other features are described in more detail below with reference to the associated drawings.

Figure 1A:
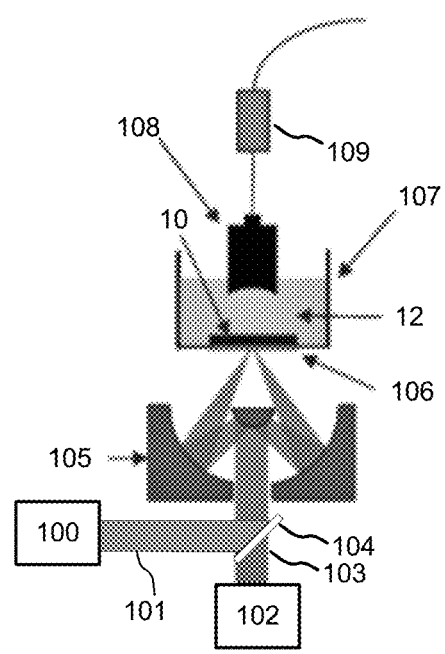
FIG. 1A is a simplified schematic of a side view of an ULM-PAM system, according to one implementation

These and other features are described in more detail below with reference to the associated drawings.

DETAILED DESCRIPTION

Different aspects are described below with reference to the accompanying drawings. The features illustrated in the drawings may not be to scale. In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments. While the disclosed embodiments will be described in conjunction with the specific embodiments, it will be understood that it is not intended to limit the disclosed embodiments.

I. Introduction

Mid-infrared (MIR) microscopy has been exploited for applications ranging from material characterization to label-free histologic analysis. Examples of material characterization with MIR microscopy are described by Wetzel, D. L. & LeVine, S. M., "Imaging molecular chemistry with infrared microscopy," *Science* 285, 1224-1225 (1999); Koenig, J. L., "Microspectroscopic Imaging of Polymers," American Chemical Society, (1998); and Prati, S., Joseph, E., Sciutto, G. & Mazzeo, R., "New advances in the application of FTIR microscopy and spectroscopy for the characterization of artistic materials," *Acc. Chem. Res.* 43, 792-801 (2010), which are hereby incorporated by reference in their entireties. Examples of label-free histologic analysis with MIR microscopy are described by Diem, M., Romeo, M., Boydston-White, S., Miljkovic, M. & Matthaus, C., "A decade of vibrational micro-spectroscopy of human cells and tissue," (1994-2004). *Analyst* 129, 880-885 (2004); Fernandez, D. C., Bhargava, R., Hewitt, S. M. & Levin, I. W., "Infrared spectroscopic imaging for histopathologic recognition," *Nat. Biotechnol.* 23, 469-474 (2005); Baker, M. J. et al., "Using Fourier transform IR spectroscopy to analyze biological materials," *Nat. Protoc.* 9, 1771-1791 (2014); and Diem, M. et al., "Molecular pathology via IR and Raman spectral imaging." *J. Biophoton.* 6, 855-886 (2013), which are hereby incorporated by reference in their entireties.

In the last two decades, the sensitivity and speed of MIR microscopy have been significantly improved. Examples of improvements in the sensitivity and speed of MIR microscopy are described by Griffiths, P., "Fourier transform infrared spectrometry," *Science* 21, 297-302 (1983); Lewis, E. N. et al., "Fourier transform spectroscopic imaging using an infrared focal-Plane array detector," *Anal. Chem.* 67, 3377-3381 (1995); Miller, L. M., Smith, G. D. & Carr, G. L., "Synchrotron-based biological microspectroscopy: From the mid-infrared through the far-infrared regimes," *Journal of Biological Physics* 29, 219-230 (2003); Nasse, M. J. et al., "High-resolution Fourier-transform infrared chemical imaging with multiple synchrotron beams," *Nat. Methods* 8, 413-416 (2011); Kole, M. R., Reddy, R. K., Schulmerich, M. V., Gelber, M. K. & Bhargava, R., "Discrete frequency infrared microspectroscopy and imaging with a tunable quantum cascade laser," *Anal. Chem.* 84, 10366-10372 (2012); and Haas, J. & Mizaikoff, B., "Advances in mid-infrared spectroscopy for chemical analysis," *Annu. Rev. Anal. Chem.* 9, 45-68 (2016), which are hereby incorporated by reference in their entireties.

Despite the aforementioned improvements in MIR microscopy, there are still various limitations to MIR microscopy in biomedical and other applications. As a first example, conventional transmission MIR microscopy can image only dried or thin samples (See Wetzel, D. L. & LeVine, S. M., "Imaging molecular chemistry with infrared microscopy," *Science* 285, 1224-1225 (1999)), which requires complicated and time-consuming sample preparation (See Baker, M. J. et al., "Using Fourier transform IR spectroscopy to analyze biological materials," *Nat. Protoc.* 9, 1771-1791 (2014)). In addition, the lateral resolution of MIR microscopy is diffraction limited to approximately the long MIR wavelength at a typically used numerical aperture (~0.5). Furthermore, for fresh biological samples, the broadband and strong MIR absorption of water creates a huge background, compromising imaging contrast and interfering with molecular analysis.

As described below, many techniques have improved MIR microscopy by addressing one or two of the above limitations, yet there are still various limitations to MIR microscopy in biomedical and other applications.

Attenuated total reflection-Fourier transform infrared (ATR-FTIR) microspectroscopic imaging can measure fresh samples in reflection mode with improved spatial resolution, but its penetration depth—due to the use of evanescent waves—is limited to only 1-2 µm. Examples of ATF-FTIR imaging are described by Sommer, A. J., Marcott, C., Story, G. M. & Tisinger, L. G., "Attenuated total internal reflection infrared mapping microspectroscopy using an imaging microscope," *Appl. Spectrosc.* 55, 252-256 (2001) and Chan, K. L. A. & Kazarian, S. G., "New opportunities in micro- and macro-attenuated total reflection infrared spectroscopic imaging: spatial resolution and sampling versatility," *Appl. Spectrosc.* 57, 381-389 (2003), which are hereby incorporated by reference in their entireties.

Atomic force microscopy (AFM) has achieved nanoscale resolution by detecting thermal expansion, light scattering, or force induced by MIR laser absorption; however, the surface contact or near-field detection poses challenges in scanning fresh biological samples. Examples of AFM involving detection of thermal expansion are described by Dazzi, A., Prazeres, R., Glotin, F. & Ortega, J. M., "Local infrared microspectroscopy with subwavelength spatial resolution with an atomic force microscope tip used as a photothermal sensor," *Opt. Lett.* 30, 2388-2390 (2005); Lu, F., Jin, M. & Belkin, M. A., "Tip-enhanced infrared nano-spectroscopy via molecular expansion force detection," *Nat. Photon.* 8, 307-312 (2014); and Dazzi, A. & Prater, C. B., "AFM-IR: technology and applications in nanoscale infrared spectroscopy and chemical imaging," *Chem. Rev.* 117, 5146-5173 (2017), which are hereby incorporated by reference in their entireties. Examples of AFM involving detection of light scattering are described by Knoll, B. & Keilmann, F., "Near-field probing of vibrational absorption for chemical microscopy," *Nature* 399, 134-137 (1999), which is hereby incorporated by reference in its entirety. Examples of AFM involving detection of force are described by Nowak, D. et al., "Nanoscale chemical imaging by photoinduced force microscopy," *Sci. Adv.* 2, e1501571 (2016), which is hereby incorporated by reference in its entirety.

Photothermal MIR imaging, which employs a continuous-wave visible or near-IR laser beam to detect the MIR thermal lensing effect, greatly improves the resolution and somewhat reduces the water background, but the scattering-based detection method restricts its applications to only translucent samples. Examples of photothermal MIR imaging are described by Furstenberg, R., Kendziora, C. A., Papantonakis, M. R., Nguyen, V. & McGill, R. A., "Chemical imaging using infrared photothermal microspectroscopy." In *Proceedings of SPIE Defense, Security, and Sensing* (eds Druy, M. A. & Crocombe, R. A.) 837411 (SPIE, 2012); Li, Z., Kuno, M. & Hartland, G., "Super-resolution imaging with mid-IR photothermal microscopy on the single particle level," In *Proceedings of SPIE Physical Chemistry of Interfaces and Nano-materials XIV* (eds Hayes, S. C. & Bittner, E. R.) 954912 (International Society for Optics and Photonics, 2015); Zhang, D. et al., "Depth-resolved mid-infrared photothermal imaging of living cells and organisms with submicrometer spatial resolution," *Sci. Adv.* 2, e1600521 (2016); and Li, Z., Aleshire, K., Kuno, M. & Hartland, G. V., "Super-resolution far-field infrared imaging by photothermal heterodyne imaging," *J. Phys. Chem. B* 121, 8838-8846 (2017), which are hereby incorporated by reference in their entireties.

Stimulated Raman scattering (SRS) imaging has demonstrated label-free chemical mapping of biological cells and tissues at high spatial resolution and contrast. Examples of SRS imaging are described by Lu, F.-K. et al., "Label-free DNA imaging in vivo with stimulated Raman scattering microscopy," *Proc. Natl Acad. Sci. USA* 112, 11624-11629 (2015); Cheng, J.-X. & Xie, X. S., "Vibrational spectroscopic imaging of living systems: an emerging platform for biology and medicine," *Science* 350, aaa8870 (2015); and Ji, M. et al., "Detection of human brain tumor infiltration with quantitative stimulated Raman scattering microscopy," *Sci. Transl. Med.* 7, 309ra163 (2015), which are hereby incorporated by reference in their entireties.

Far-field super resolution has been achieved using stimulated emission depletion. Examples of which are described by Gong, L. & Wang, H., "Breaking the diffraction limit by saturation in stimulated-Raman-scattering microscopy: a theoretical study," *Phys. Rev. A* 90, 13818 (2014) and Ruchira Silva, W., Graefa, C. T. & Frontiera, R. R., "Toward label-free super-resolution microscopy," *ACS Photon.* 3, 79-86 (2016), which are hereby incorporated by reference in their entireties.

Photoacoustic infrared (PAIR) detection is capable of spectroscopy and sensing of totally opaque or highly light-scattering materials. Examples of PAIR detection are described by Rockley, M. G., "Fourier-transformed infrared photoacoustic spectroscopy of polystyrene film," *Chem. Phys. Lett.* 68, 455-456 (1979); Patel, C. K. N. & Tam, A. C., "Pulsed optoacoustic spectroscopy of condensed matter," *Rev. Mod. Phys.* 53, 517-550 (1981); Tam, A. C., "Applications of photoacoustic sensing techniques," *Rev. Mod. Phys.* 58, 381-431 (1986); and Michaelian, K. H., *Photoacoustic Infrared Spectroscopy* (Wiley, 2003), which are hereby incorporated by reference in their entireties. PAIR detection has also been demonstrated for imaging thick and scattering fresh biological samples without thin slicing, examples of which are described by Sim, J. Y., Ahn, C.-G., Jeong, E.-J. & Kim, B. K., "In vivo microscopic photoacoustic spectroscopy for non-invasive glucose monitoring invulnerable to skin secretion products," *Sci. Rep.* 8, 1059 (2018), which is hereby incorporated by reference in its entirety. However, PAIR detection does not address the drawbacks on spatial resolution and water background.

II. Ultraviolet-Localized Mid-Infrared Photoacoustic Spectroscopy and Microscopy Various aspects disclosed herein relate to systems and methods of ultraviolet-localized mid-infrared photoacoustic microscopy and/or spectroscopy (ULM-PAM). In some aspects, these ULM-PAM techniques can be used to achieve high-resolution and water-background—free mid-infrared (MIR) imaging of fresh biological samples. In at least some of the disclosed aspects, a pulsed mid-infrared laser thermally excites a sample at a focal spot, and a pulsed ultraviolet (UV) laser photoacoustically detects the resulting transient temperature rise, thereby enabling measurement of the intensity of the MIR absorption by the sample (e.g., enabling measurement of an absorption coefficient of the sample at the wavelength of the MIR laser). This detection and measurement scheme is based on the fact that a temperature rise in a sample enhances photoacoustic signals, a phenomenon called the Grüneisen relaxation effect. Examples of the Grüneisen relaxation effect are described by Wang, L., Zhang, C. & Wang, L. V., "Grueneisen relaxation photoacoustic microscopy," *Phys. Rev. Lett.* 113, 174301 (2014), Lai, P., Wang, L., Tay, J. W. & Wang, L. V., "Photoacoustically guided wavefront shaping for enhanced optical focusing in scattering media," *Nat. Photon.* 9, 126-132 (2015), and U.S. published patent application US2016/0305914, published on Oct. 20, 2016, which are hereby incorporated by reference in their entireties.

While the ULM-PAM imaging methods disclosed herein reveal MIR absorption contrast, the lateral resolution is not determined by the MIR wavelength but is determined by the UV wavelength, which is one order of magnitude or more shorter than the MIR wavelength. In addition, UV laser pulses in the range of 200-300 nm and especially 200- 230 nm are highly absorbed by most biomolecules, such as lipids, proteins, and nucleic acids. Examples of UV absorption in biomolecules and water are described by Kunitz, M., "Crystalline desoxyribonuclease; isolation and general properties; spectrophotometric method for the measurement of desoxyribonuclease activity," *J. Gen. Physiol.* 33, 349-362 (1950); Beaven, G. H. & Holiday, E. R., "Ultraviolet absorption spectra of proteins and amino acids," *Adv. Protein Chem* 7, 319-386 (1952); Yao, D.-K., Maslov, K. I., Wang, L. V., Chen, R. & Zhou, Q., "Optimal ultraviolet wavelength for in vivo photoacoustic imaging of cell nuclei," *J. Biomed. Opt.* 17, 056004 (2012); and Quickenden, T. I. & Irvin, J. A., "The ultraviolet absorption spectrum of liquid water," *J. Chem. Phys.* 72, 4416-4428 (1980), which are hereby incorporated by reference in their entireties. Water, however, is highly transmissive in the UV wavelength range, thus by using UV light to detect IR absorption, the strong water background of MIR absorption is suppressed in the disclosed ULM-PAM aspects. Therefore, ULM-PAM enables high-resolution and photoacoustic MIR imaging of fresh thick and scattering biological samples with little or no water background. By combining the UV and MIR spectral regimes, the ULM-PAM imaging methods described herein provide high-resolution and water-background—free photoacoustic MIR imaging of fresh biological samples.

Furthermore, ultraviolet light can penetrate up to 100 μm or more, which is generally greater than MIR penetration in fresh specimens, and the photoacoustic signal can propagate in biological tissues with negligible scattering. Examples of the penetration depth of ultraviolet light and mid-infrared light are described in Wong, T. T. W. et al., "Fast label-free multilayered histology-like imaging of human breast cancer by photoacoustic microscopy," *Sci. Adv.* 3, e1602168 (2017) and Zhang, D. et al., "Depth-resolved mid-infrared photothermal imaging of living cells and organisms with submicrometer spatial resolution," *Sci. Adv.* 2, e1600521 (2016), which are hereby incorporated by reference in their entireties.

The generation of photoacoustic signals by a sample depends on both the optical absorption coefficient (of the sample at the wavelength being observed) as well as the temperature of the sample prior to photo-stimulation (e.g., the pre-laser-pulse temperature). When an object absorbs a short laser pulse, thermal expansion causes it to emit a photoacoustic signal. The amplitude of the photoacoustic signal is proportional to the absorbed optical energy, with a coefficient called the Grüneisen parameter (Γ), which depends on the expansion coefficient and the speed of sound, both of which are temperature-dependent and quasi-linearly proportional to the pre-pulse temperature. As a result, in the physiological temperature range (e.g., between approximately 10° C. and 50° C.), the Grüneisen parameter depends substantially linearly on the pre-pulse temperature (T). Near 20° C. and for water-rich soft biological tissues, the change in the Grüneisen parameter (e.g., $\Delta\Gamma$) can be determined using the equation $\Delta\Gamma/\Gamma \approx 0.04 \Delta T$ (wherein Δ denotes a small change). Examples of temperature variations of the Grüneisen parameter are described in Danielli, A. et al., "Label-free photoacoustic nanoscopy," *J. Biomed. Opt.* 19, 086006 (2014) and Xu, S., Scherer, G. W., Mahadevan, T. S. & Garofalini, S. H., "Thermal expansion of confined water," *Langmuir* 25, 5076-5083 (2009), which are hereby incorporated by reference in their entireties. Therefore, a pre-pulse temperature rise of 1° C. can enhance the photoacoustic signal by ~4%. This Grüneisen-based change in photoacoustic signal effect is relatively large effect and is highly advantageous as it permits infrared analysis of biological and other materials with minimal increases in the temperature in the specimen. This is a significant advantage compared photothermal techniques in which the relative signal change is of order $10^{-4}$/° C. To achieve a 4% change in a conventional photothermal measurement would require sufficient absorption of infrared radiation to raise the temperature of the specimen by 400° C. which would cause damage to most specimens under study. By comparison, the 1° C. change need to achieve a 4% change photoacoustic signal is readily tolerated by most samples.

This relationship has been used to photo-acoustically measure temperature in tissues as described by Larina, I. V. Latin, K. V. & Esenaliev, R. O., "Real-time optoacoustic monitoring of temperature in tissues," *J. Phys. D* 38, 2633-2639 (2005); Shah, J. et al., "Photoacoustic imaging and temperature measurement for photothermal cancer therapy," *J. Biomed. Opt.* 13, 034024 (2008); and Yao, J., Ke, H., Tai, S., Zhou, Y. & Wang, L. V., "Absolute photoacoustic thermometry in deep tissue," *Opt. Lett.* 38, 5228-5231 (2013), which are hereby incorporated by reference in their entireties. When a pulsed laser induces a local transient temperature rise in a sample, the local Grüneisen parameter of the sample increases within the thermal confinement time (that is, the time before the local heat diffuses away), which is termed the Grüneisen relaxation effect. Examples of the Grüneisen relaxation effect are described in Wang, L., Zhang, C. & Wang, L. V., "Grueneisen relaxation photoacoustic microscopy," *Phys. Rev. Lett.* 113, 174301 (2014) and Lai, P., Wang, L., Tay, J. W. & Wang, L. V., "Photoacoustically guided wavefront shaping for enhanced optical focusing in scattering media," *Nat. Photon.* 9, 126-132 (2015).

Figure 2:
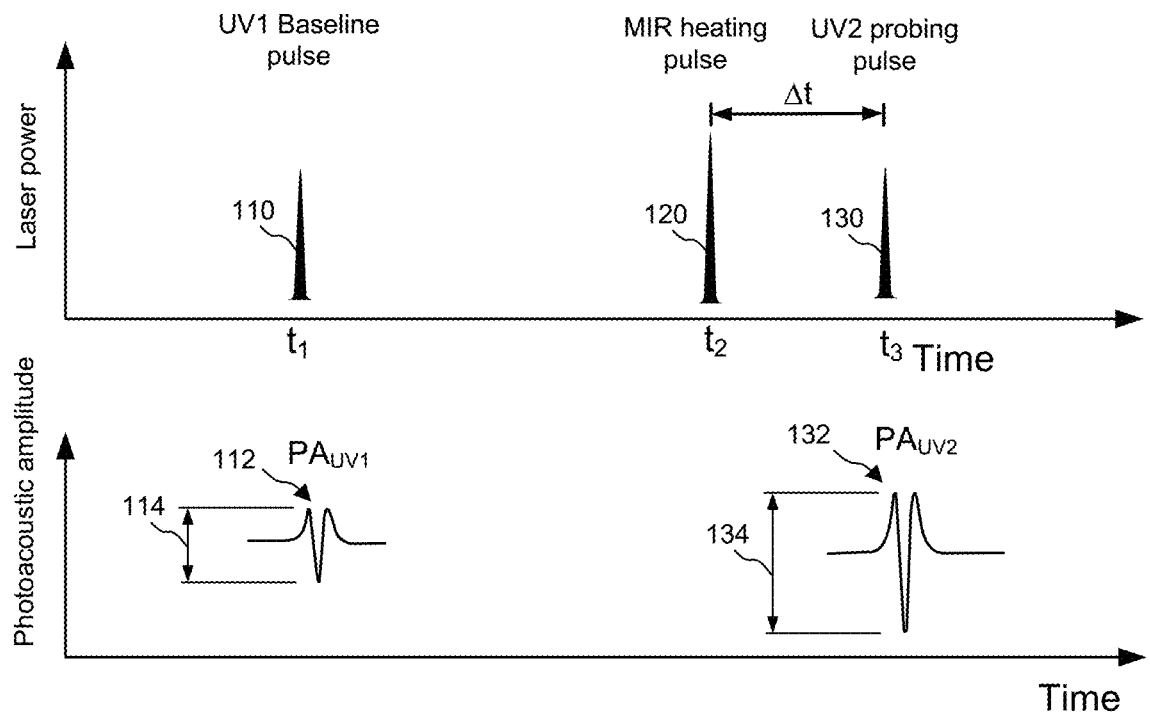
FIG. 2 is a graph of ultraviolet and infrared pulses and photoacoustic signals from a sample being analyzed, according to various implementations.

ULM-PAM imaging and spectroscopic analysis may be realized as a two-step measuring scheme, as illustrated in FIG. 2. FIG. 1A shows a simplified schematic of an illustrative embodiment of components of an ULM-PAM imaging system. In particular, a first pulsed radiation source 100, for example a pulsed ultraviolet laser can be used to photoacoustically measure the temperature rise in a sample 10 induced in a sample by absorption of infrared radiation from a second radiation source 102, for example a pulsed MIR laser. The UV and IR radiation sources 100 and 102 emit beams of UV (101) and IR (103) radiation respectively that can be combined using a beam combiner 104. The combined beams may be focused onto the surface using any suitable arrangement of optical components, for example a Schwarzschild (or Cassegrain) style reflective objective 105. Photoacoustic responses of generated by the UV and/or IR beams can be detected with ultrasound transducer 108 and amplifier 109. To provide efficient photoacoustic coupling and to provide appropriate physiological environments, the sample 10 may be immersed in liquid 12, for example water or suitable buffer solution. In this example it is assumed that the wavelength of the first radiation source is in the ultraviolet, but more broadly it need only be shorter than the wavelength of the infrared light used to probe the IR absorption properties of the sample. For example, the first radiation source can be selected to emit at one or more wavelengths within the range of 100 nm to 1000 nm. The first radiation source can be a fixed wavelength source or a tunable source.

Figure 1B:
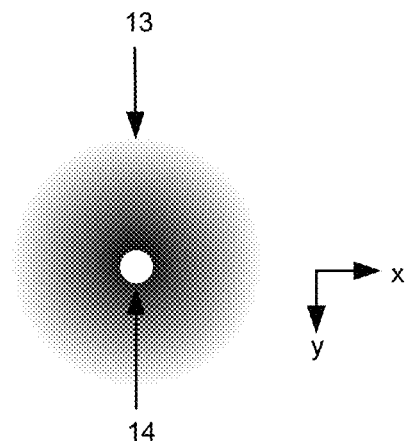
FIG. 1B is a schematic illustration of a top-down view of ultraviolet and infrared focal spots, according to various aspects.

As shown in the top-down view of FIG. 1B, MIR pulses 120 (shown in FIG. 2) may be focused onto a MIR focal spot 13 and the UV pulses 110 and 130 (shown in FIG. 2) may be focused onto a relatively small focal spot 14 (e.g., on the order of a $\lambda_{UV}$ diameter) within the MIR focal spot 13. The MIR focal spot 13 and the UV focal spot 14 may be at or near the diffraction limits of their respective wavelengths.

In FIG. 2, first a baseline ultraviolet laser pulse 110 from the first radiation source is generated at time $t_1$. The baseline ultraviolet laser pulse 110 illuminates a portion of a sample, which in turn emits a baseline photoacoustic signal 112 ($PA_{UV1}$). A similar baseline photoacoustic signal is used in an ultraviolet photoacoustic microscopy (UV-PAM) such as the UV-PAM systems described in Wong, T. T. W. et al., "Fast label-free multilayered histology-like imaging of human breast cancer by photoacoustic microscopy," *Sci. Adv.* 3, e1602168 (2017) and Yao, D.-K., Maslov, K., Shung, K. K., Zhou, Q. & Wang, L. V., "In vivo label-free photoacoustic microscopy of cell nuclei by excitation of DNA and RNA," *Opt. Lett.* 35, 4139-4141 (2010), which are hereby incorporated by reference in their entireties.

At another point in time, such as time $t_2$, a MIR heating pulse 120 is generated by a second radiation source and focused on the sample. Shortly thereafter at time $t_3$, a UV probing pulse 130 is generated by the first radiation source and focused on the sample, which in turn emits a second photoacoustic signal 132 ($PA_{UV2}$). The MIR heating pulse 120 induces a local temperature rise in the sample and the UV probing pulse 130 illuminates the sample before the local temperature rise has had a chance to dissipate. In one embodiment, the time interval ($\Delta t$) between the MIR heating pulse 120 and the UV probing pulse 130 is chosen to be a very short delay time after the MIR heating pulse, for example a sub-microsecond time delay that may be on the scale of picoseconds to hundreds of nanoseconds. The advantage of this approach are twofold: (1) the second UV pulse can be timed to be close in time to the maximum temperature rise of the sample; and (2) the delay can be chosen to be shorter than the thermal confinement time (or thermal diffusion time) of the sample. The latter ensures that the technique can achieve high spatial resolution as it ensures that the IR absorption profile of the sample is measured before the heat has substantially spread and diffused.

The local temperature rise ($\Delta T$) induced by the MIR laser pulse is approximately proportional to the MIR absorption coefficient. Because the local temperature rise increases the local Grüneisen parameter, the second photoacoustic signal 132 ($PA_{UV2}$) is stronger than the first photoacoustic signal 112 ($PA_{UV1}$). In particular, the second photoacoustic signal 132 ($PA_{UV2}$) has a larger amplitude 134 than the amplitude 114 of the first photoacoustic signal 112 ($PA_{UV1}$). Note that amplitudes 114 and 134 can be measured in any number of ways, for example the peak to peak amplitude (as illustrated), the half amplitude, the curve may be rectified and the total integrated area measured, or an appropriate transform may be applied (e.g. Fourier transform or wavelet transform) and the amplitude of one of more of the transform components could be used. It is also possible to employ a lock-in amplifier and use a lock-in amplitude at the pulse repetition rate or any harmonic thereof. Any similar analysis that produces a signal indicative of the strength of the photoacoustic response may be suitable.

Figure 13:
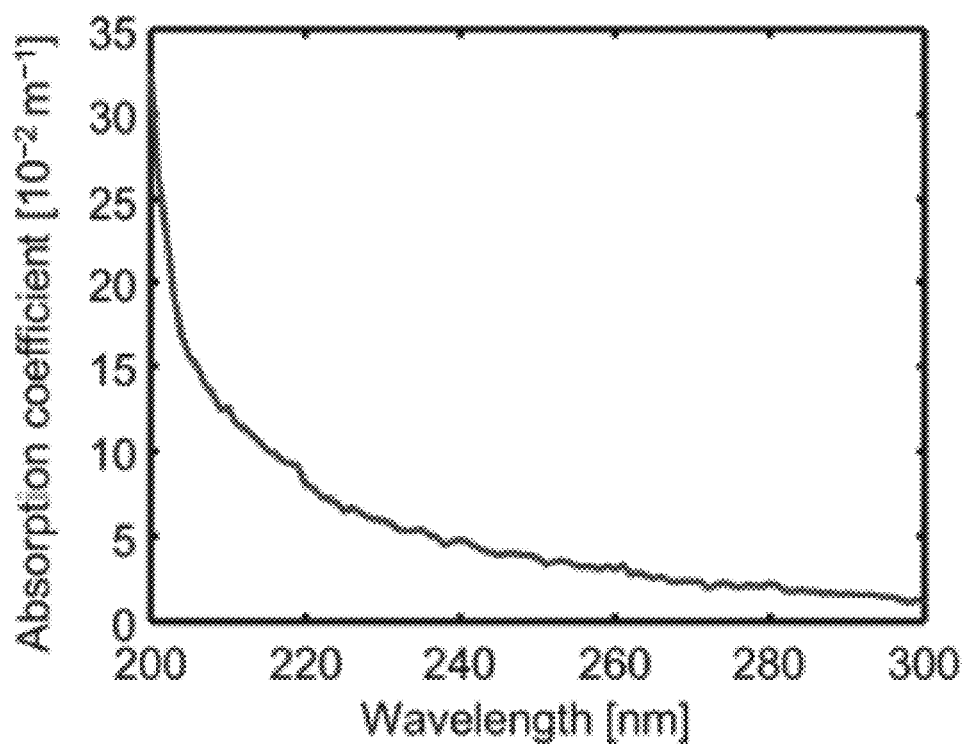
FIG. 13 is a graph of the absorption coefficient of water for various ultra-violet wavelengths, according to an aspect.

The fractional change in photoacoustic amplitude, % $\Delta PA$ (defined as $\Delta PA/PA_{UV1}$, where $\Delta PA = PA_{UV2} - PA_{UV1}$), is proportional to $\Delta T$, which is proportional to the absorption coefficient at the MIR wavelength (of the MIR heating pulse 120). However, the ultraviolet wavelength may be a magnitude shorter than the MIR wavelength and the spatial resolution is mainly determined by the focal diameter of the ultraviolet laser beam (See e.g., the UV focal spot 14 of FIG. 1B and related discussion). Consequently, the lateral resolution may be diffraction limited to approximately $\lambda_{UV}/2NA$, where $\lambda_{UV}$ is the ultraviolet wavelength, and NA is the numerical aperture of the objective lens. This approach improves the MIR imaging resolution by at least one order of magnitude from approximately the MIR wavelength to approximately the ultraviolet wavelength. In addition, as water has an extremely low absorption coefficient (<0.3 m$^{-1}$) in the ultraviolet region of 200-300 nm (as shown in the graph of FIG. 13), the water background from MIR absorption in fresh biological samples is suppressed.

While FIG. 2 and many of the aspects disclosed herein may describe the baseline ultraviolet laser pulse being emitted and the baseline photoacoustic signal measured before the heating pulse and the ultraviolet probing pulse, this is merely one option. If desired, the baseline photoacoustic signal may be measured after the probing photoacoustic signal is collected. In such aspects, the baseline photoacoustic signal may be collected a sufficiently long time (e.g., a predetermined time) after the probing photoacoustic signal is collected such that the sample, at least locally, has had a chance to return to a baseline temperature.

Figure 3:
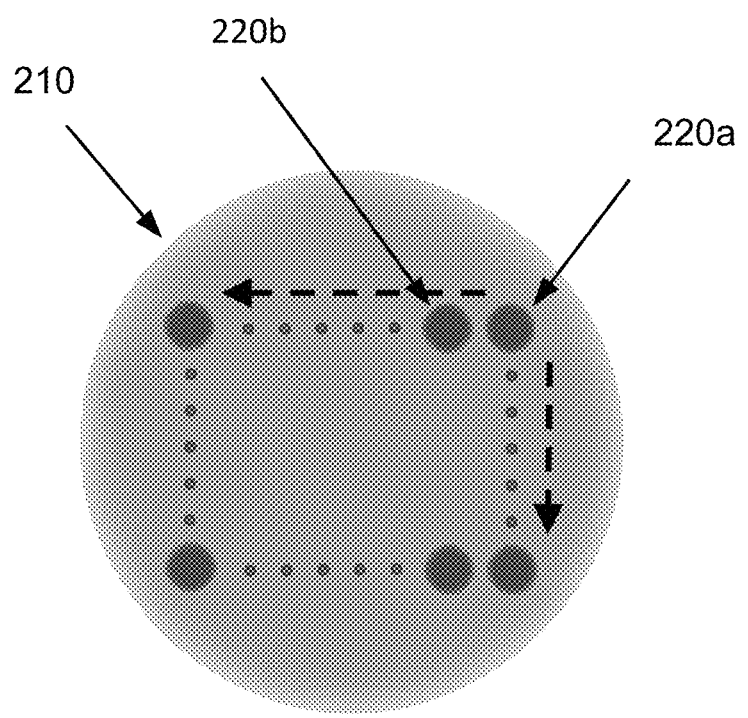
FIG. 3 is a schematic illustration of a top-down view of ultraviolet pulses scanning within the infrared illumination area within the thermal relaxation time, according to various aspects.

In some aspects, a single MIR heating pulse may be followed, within the thermal relaxation time, by multiple UV probing pulses. The multiple UV probing pulses may, in some aspects, be focused on the same UV focal spot (to obtain multiple measurements for averaging purposes, as an example). In other aspects, such as in the example shown in FIG. 3, the multiple UV probing pulses may be scanned across the sample to obtain measurements at multiple x,y coordinates (e.g., at multiple positions within the sample). FIG. 3, in particular, illustrates a single MIR focal spot 210 and multiple UV focal spots 220a, 220b, etc. at different sub-regions within a region of the sample illuminated by the MIR focal spot 210. If desired, the multiple UV probing pulses may be scanned across the region heated by the MIR pulse (e.g., spot 210) in a raster scanning pattern. Non-raster scanning patterns may also be used, if desired.

III. Examples of ULM-PAM Systems

Figure 4:
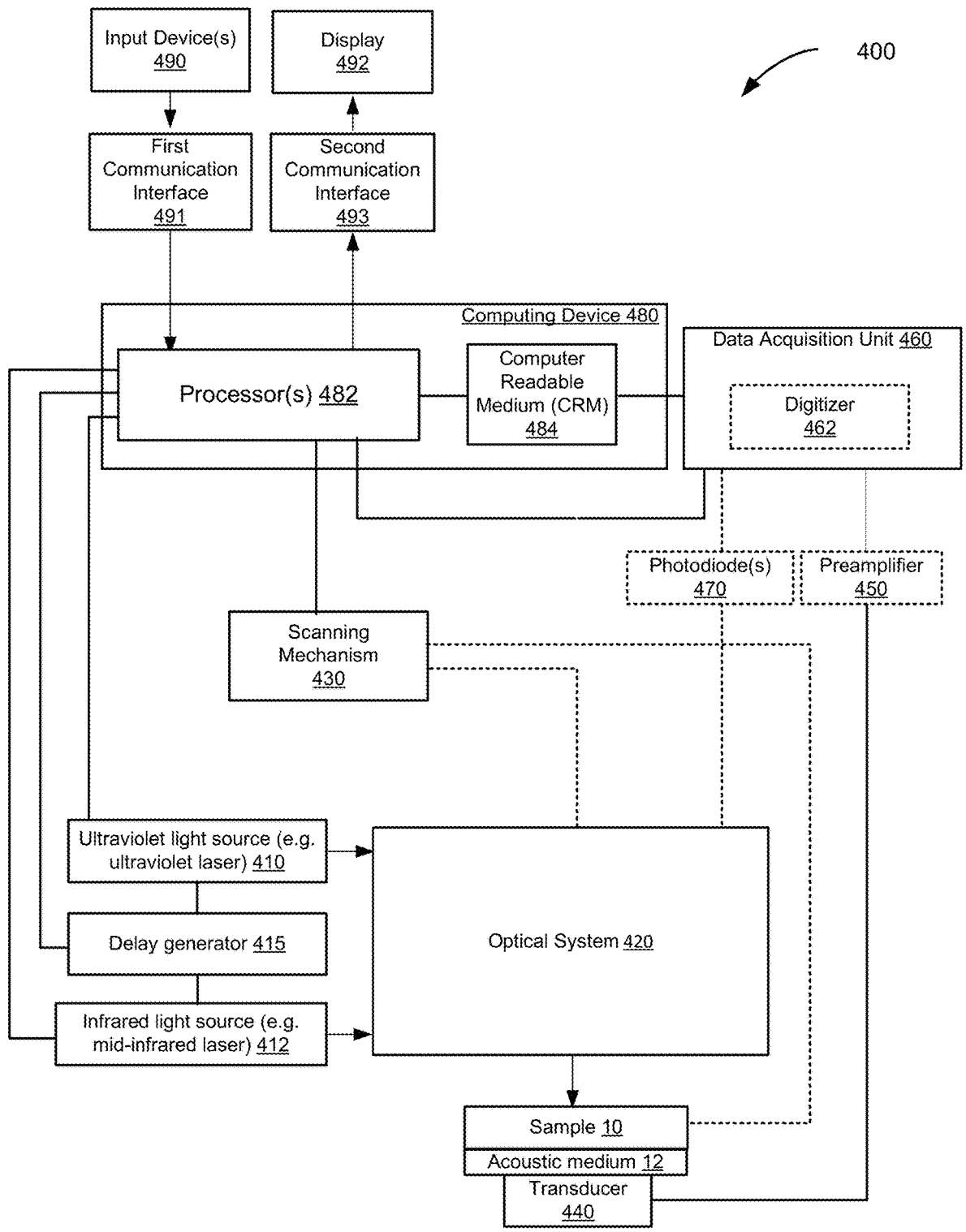
FIG. 4 is a block diagram of components of a ULM-PAM system, according to various aspects.

FIG. 4 is a block diagram of a ULM-PAM system 400 configured to perform spectroscopy, microscopy, or other imaging or chemical analysis operations on a sample 10, according to various implementations. The ULM-PAM system 400 includes a first light source 410 for example an ultraviolet light source (e.g., a pulsed laser or other suitable UV source). In one aspect, the UV light source 410 has a tunable wavelength. For example, the UV light source 410 may generate UV pulses within a tunable range between 210 nm and about 280 nm and with a pulse duration of approximately 10.0 nanoseconds (ns). The light source may also be a 266 nm laser, for example a quadrupled Nd-YAG. If desired, the UV light source 410 may be replaced with a light source operating in (or a tunable source may be tuned to operate in) shorter wavelengths (such as x-rays with wavelengths less than 1.0 nm or less than 10.0 nm) or in longer wavelengths (such as visible wavelengths between roughly 380 nm and 760 nm or such as near infrared wavelengths of longer than 760 nm wavelength, but less than the MIR wavelength of the MIR source 412). Keeping the wavelength of the UV light source 410 shorter than the MIR source 412 will ensure that the resolution remains higher than the diffraction limit of the MIR source 412. In some embodiments such as the imaging of live tissue in which UV light might cause damage, tuning light source 410 to wavelengths that do not damage DNA or other vital structures may be particularly desirable.

In certain implementations, the UV source 410 can be a diode laser, a diode pumped solid state laser, an optical parametric oscillator, a nanosecond, picosecond, and/or femtosecond laser. The UV source 410 can be a fixed wavelength source, a tunable wavelength source, and/or a radiation source that emits a range of wavelengths simultaneously. The UV source 410 will have a shorter wavelength than the mid-infrared light source 412, such that the UV source 410 can be focused to a smaller spot size, thus illuminating a smaller sub-region of the region that the infrared radiation illuminates. The smaller focused spot size of the UV source 410 of radiation can result in an improvement in spatial resolution in the measurement of infrared absorption of the sample.

The ULM-PAM system 400 also includes a second radiation source 412, for example mid-infrared light source (e.g., a pulsed laser or other suitable mid-infrared source). In one aspect, the mid-infrared light source 412 is a pulsed optical parametric oscillator (OPO) tunable between 2,500 and 12,000 nanometers with a pulse duration of approximately 10.0 ns. Alternately, the mid IR light source can be a quantum cascade laser for example tunable in the range of 750-1900 cm$^{-1}$ (or narrower or wider depending on the application need) with pulse durations in the range of 50 nsec to 1000 nsec or more. The first radiation source can also be a combination of multiple mid-IR sources, for example an OPO in combination with a QCL.

By tuning the wavelength mid-infrared light source 412, the ULM-PAM system 400 can measure a signal indicative of the absorption coefficient of a sample at multiple mid-infrared wavelengths. Thus, the ULM-PAM system 400 can obtain spectroscopic measurements (e.g. an infrared absorption spectrum) and images indicative of variations in the absorption coefficient of the sample as a function of wavelength/wavenumber and/or as a function of position within the sample.

In certain implementations, the mid-infrared light source 412 can be a tunable narrow band laser source, such as a quantum cascade laser, interband cascade laser, an optical parametric oscillator, or any other source of infrared radiation that can tuned over a plurality of wavelengths. MIR source 412 could also be a broadband laser source that simultaneously emits a range of wavelengths, for example a super-continuum source, a femtosecond laser, a frequency comb, or a thermal source (e.g. a "globar"). In these implementations, the first radiation source 412 may be a pulsed laser source that emits pulses, for example, with pulse durations in the microsecond, nanosecond or picosecond range. It may also be a continuous wave (CW) laser source that is chopped, modulated and/or gated.

In FIG. 4, the ULM-PAM system 400 also includes a delay generator 415 in electrical communication with the ultraviolet light source 410, the mid-infrared light source 412, and/or the processor(s) 482 of computing device 480. The delay generator 415 may control time delays between the mid-infrared pulses from mid-infrared light source 412 and the probing ultraviolet pulses from ultraviolet light source 410, in order to coordinate the pulses. For example, the delay generator 415 may delay triggering the ultraviolet light source 410 to generate the second ultraviolet pulse to a predetermined time period (time delay) after triggering the mid-infrared light source 412 to generate the mid-infrared laser pulse. As another example, the delay generator 415 may delay triggering the mid-infrared light source 412 to generate the mid-infrared pulse to a selected time period (time delay) after triggering the ultraviolet light source 410 to generate the first (baseline) ultraviolet pulse. In the ideal case, the time delays are generally short, i.e. the IR pulse is generated almost instantaneously after the baseline UV pulse and the probe pulse would follow immediately after the IR pulse. The time delays in practice may be determined by the available repetition rates/duty cycles of the mid-IR and UV radiation sources. Mid-IR OPOs and QCLs have repetition rates in the range of 1 kHz to 1 MHz or more and have pulse durations in the range of a 10-1000 nsec or more.

So the delay between the end of baseline UV pulse and the IR heating pulse can be as short as zero or as long as necessary to accommodate the limits of the radiation sources. The delay between the IR heating pulse and the UV probe pulse is also preferable extremely short so as to capture the maximum temperature rise of the sample. Because pulsed light sources can have low duty cycle limits (e.g. often <10%), after the UV probe pulse it may be necessary to wait a delay on the order of microseconds or more for the UV and/or IR radiation sources to be ready to emit subsequent pulses.

In particular, the delay generator 415 may ensure that each probing ultraviolet pulse follows a mid-infrared pulse by less than the thermal confinement time (thermal diffusion time) of the sample 10. In the case of hydrated biological samples, typical thermal confinement times may be between approximately 100 nanoseconds and 500 nanoseconds, but can be longer for thick samples and/or those with low thermal conductivity. As a result, the delay generator 415 may be configured to delay probing ultrasonic pulses to impinge upon sample 10 between 0-500 ns after a corresponding mid-infrared pulse. In some embodiments, the delay generator 415 may begin a delay period upon generation of a mid-infrared pulse by mid-infrared light source 412 and, at the end of the delay period, the delay generator 415 may trigger ultraviolet light source 410 to emit an ultraviolet probing pulse. In various aspects, the delay added by delay generator 415 can be adjusted (e.g., by a user, by processor(s) 482, etc.), which may assist in adjusting for different types of samples 10 (having different thermal relaxation times) or lasers with different performance characteristics.

In FIG. 4, the ULM-PAM system 400 also includes an optical system 420, which may include any desired number of optical components (also sometimes referred to herein as "optical elements") such as optical fibers, relays, mirrors, beam-splitters, beam combiners, pinhole devices, lenses, beam steering devices, and filters. The optical system 420 may propagate and focus light from the ultraviolet light source 410 and the mid-infrared light source 412 onto sample 10. It would be understood that in FIG. 4 and other illustrated examples, an ULM-PAM system is shown at an instant in time during operation where a sample is being analyzed by the ULM-PAM system.

The ULM-PAM system 400 also includes an ultrasonic transducer 440 (e.g., an ultrasonic receiver) coupled to or otherwise in acoustic communication with sample 10 to detect photoacoustic signals from the illuminated regions of the sample 10. The ultrasonic transducer 440 may be acoustically coupled to sample 10 by an acoustic medium 12. The acoustic medium may be an acoustic gel, water, or other suitable medium capable of conveying ultrasound pulses from sample 10 to transducer 440. If desired, the acoustic medium 12 may be omitted. In some embodiments, the ultrasonic transducer 440 is a single element transducer. In other embodiments, the ultrasonic transducer 440 may be an array of transducers and, if desired, may be a steerable phased array with receive focusing capabilities. In some aspects, the ultrasonic transducer 440 may be an array of transducers that enable the collection of multiple photoacoustic signals in parallel, to enable faster imaging and spectroscopic analysis across an area of the sample 10.

The ULM-PAM system 400 may also include a scanning mechanism 430 coupled to one or more elements of the optical system 420. Optionally (denoted by a dotted line) the scanning mechanism 430 is coupled to the sample 10, in addition to or in the alternative to, the one or more elements of the optical system 420. The scanning mechanism 430 is coupled to one or more components of the ULM-PAM system 400 to be able to move the focal spots of the illumination beams (e.g., the MIR focal spot 13 and the UV focal spot 14 of FIG. 1B) to different regions within the sample 10. Each of the illumination beams is scanned to locate its focal spot at a plurality of locations in a corresponding optical foci region in the field-of-view being imaged. For example, in FIG. 1B, the MIR focal spot 13 is at a region of the sample and the UV focal spot 14 is at a sub-region of the region. In one example, the scanning mechanism 430 moves the focal spots 13 and/or 14 in a first direction along the x-axis and/or in a second direction along the y-axis at the sample plane (See FIG. 1B for a depiction of the x-axis and y-axis). In one implementation, the scanning mechanism 430 includes one or more mechanical motors to move the one or more system components. In one implementation, the scanning mechanism 430 includes a first motor or other mechanism to move one or more components in a first direction and a second motor or other mechanism to move one or more components in a second direction. Some examples of suitable scanning mechanisms include an x-y stage, a galvanometric mirror (non-resonant/resonant), an acousto-optic device, one or more motorized scanning stages, a spinning polygon mirror, etc. In another implementation, the scanning mechanism 430 provides for a three-axis movement of the focal spots within the sample 10, thus enabling three-dimensional imagery, spectroscopy, and photoacoustic measurement. In some such implementations, the scanning mechanism 430 includes a third motor or other mechanism to move one or more components in a third direction such as a z-axis normal to the x-y plane.

In FIG. 4, the ULM-PAM system 400 also includes a data acquisition unit 460 an optional digitizer 462 therein, and an optional pre-amplifier 450 in electrical communication with the ultrasonic transducer device 440 to receive and record photoacoustic signals. The pre-amplifier 450 may boost ultrasound signals prior to digitization by digitizer 462. The ULM-PAM system 400 also includes one or more processors 482 and a computer readable medium (CRM) 484 in electronic communication with the processor(s) 482. The processor(s) 482 and the CRM 484 may be a part of computing device 480. The computing device 480 may for example be a personal computer, an embedded computer, a single board computer (e.g. Raspberry Pi or similar), a portable computation device (e.g. tablet) or any other computation device or system of devices capable of performing the functions described herein. The processor(s) 482 is also in electronic communication with the scanning mechanism 430, the ultraviolet light source 410, the delay generator 415, and the mid-infrared light source 412, and the data acquisition unit to be able to send control signals and receive acquired ultrasound data. (The delay generator may alternately be a function of the data acquisition unit 462 or one or more of the processors 482.) The digitizer 462 and data acquisition unit are in electronic communication with the CRM 484 to store the recorded photoacoustic signal data. The processor(s) 482 executes instructions stored on the CRM 484 to perform one or more operations of the ULM-PAM system 400. In some cases, the processor(s) 482 and/or one or more external processors execute instructions that construct a photoacoustic image, and/or spectroscopic data, e.g. an IR absorption spectrum) of the field-of-view of the sample 10 from the data in the photoacoustic signals received from the ultrasonic transducer device 440 and/or execute instructions that communicate control signals to system components. For example, the processor(s) 482 and/or one or more external processors may execute instructions that communicate control signals to the scanning mechanism 430 to scan the UV and MIR focal spots and to different locations in the regions of the field-of-view and communicate control signals to the digitizer 462 to simultaneously record photoacoustic signals received by transducer 440 from the illuminated regions of the sample 10 for each of the locations in the regions. The scanning mechanism 430 generates relative motion between the sample and the UV/MIR focal spots by moving the sample, or moving the focal spots or any combination thereof. In addition or alternatively, the processor(s) 482 and/or one or more external processors may execute instructions that communicate control signals to the lasers 410 and 412 and the delay generator 415 to control the UV and MIR pulses, and the delay between each MIR heating pulse and UV probing pulses in the subsequent thermal relaxation window, or other modulated light delivered by the lasers 410 and 412. The described electrical communications between components of the ULM-PAM system 400 are able to provide power and/or communicate signals with data.

Returning to FIG. 4, the ULM-PAM system 400 also includes an optional first communication interface 491, one or more optional input devices 490 in communication with the processor(s) 482 through the first communication interface 491, a second communication interface 493, and a display 492 in communication with the processor(s) 482 through the second communication interface 493. The optional input device(s) 490 are in communication with the processor(s) 482 through the first communication interface 491 to be able to send a signal with imaging operational parameters or display parameters based on input received at the input device(s) 490. The processor(s) 482 is configured or configurable to communicate data over the second communication interface 493 for display on the display 492 including, e.g., raw data from the photoacoustic signals, a constructed photoacoustic image, a constructed spectroscopic graph/absorption spectrum, a constructed spectroscopic image, a three-dimensional photoacoustic image, etc. The first communication interface 491 is in communication with the input device(s) 490 to receive input, e.g., from an operator. The input device 490 and display 492 may in fact be the same device, for example a touch screen for a computer or a tablet device.

In some implementations, the ULM-PAM system includes one or more communication interfaces (e.g., a universal serial bus (USB) interface). Communication interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that the various system components can be electrically coupled to communicate with various components over one or more of a variety of suitable interfaces and cables such as, for example, USB interfaces and cables, ribbon cables, Ethernet cables, among other suitable interfaces and cables.

In FIG. 4, the ULM-PAM system 400 also includes photodiode(s) 470. In some aspects, one or more photodiodes 470 are optically coupled to the ultraviolet light source 410 and are configured to measure an amplitude (e.g., power, pulse energy or other indicator of the pulse strength) of ultraviolet pulses from the laser. In addition or alternatively, one or more photodiodes 470 are optically coupled to the MIR laser 412 and are configured to measure a similar amplitude of MIR pulses from the laser. Processor(s) 482 may receive such feedback from the photodiode(s) 470 on the strengths of the laser pulses and may perform calibration and compensation functions based on the feedback. As an example, the processor(s) 482 may normalize photoacoustic signals based on the feedback from the photodiode(s) 470. As a specific example, when the photodiode 470 detects a particularly strong UV pulse from laser 410, the processor may make apply a correction/scaling factor to the photoacoustic signal recorded by the data acquisition unit 460. In one aspect, the correction factor is continuously and automatically applied so as to effectively compensate for fluctuations in the strength of the UV pulses.

It would be understood that electrical communication between components of the various ULM-PAM systems described herein can be in wired or wireless form or a combination thereof. For simplicity, the sample 10 is illustrated as a block, it would be understood that the sample 10 can be in a variety of shapes and may have one or more objects of interest. Various blocks can also be combined within a single functional unit, for example the data acquisition unit 460 may be integrated with the computing device 480, for example as a data acquisition card in an expansion slot in a personal computer. The computing device 480 may also comprise a distributed system, for example including separate processors (CPU, digital signal processors, field programmable gate arrays, embedded controllers, single board computers, etc. that may be housed together and/or in separate enclosures.

During a data acquisition phase of an imaging process of the ULM-PAM system 400 according to one implementation, the processor(s) 482 executes instructions that send control signals to the ultraviolet laser 410 to deliver pulses of UV radiation to the sample 10, control signals to the mid-infrared light source 412 to deliver pulses of MIR radiation to the sample 10, control signals to the scanning mechanism 430 to scan the UV and MIR focal spots across (and/or through) the sample 10, control signals to the digitizer 462 to record photoacoustic signals received from the ultrasonic transducer device 440. The digitizer 462 records photoacoustic signals induced by the UV radiation pulses for each of the locations of the UV focal spots in sub-regions of the field-of-view of the sample 10 being imaged. During an image construction phase, the processor(s) 482 executes instructions to perform operations to construct a photoacoustic image, a spectroscopic image, or other information from the data in the photoacoustic signals.

Figure 5:
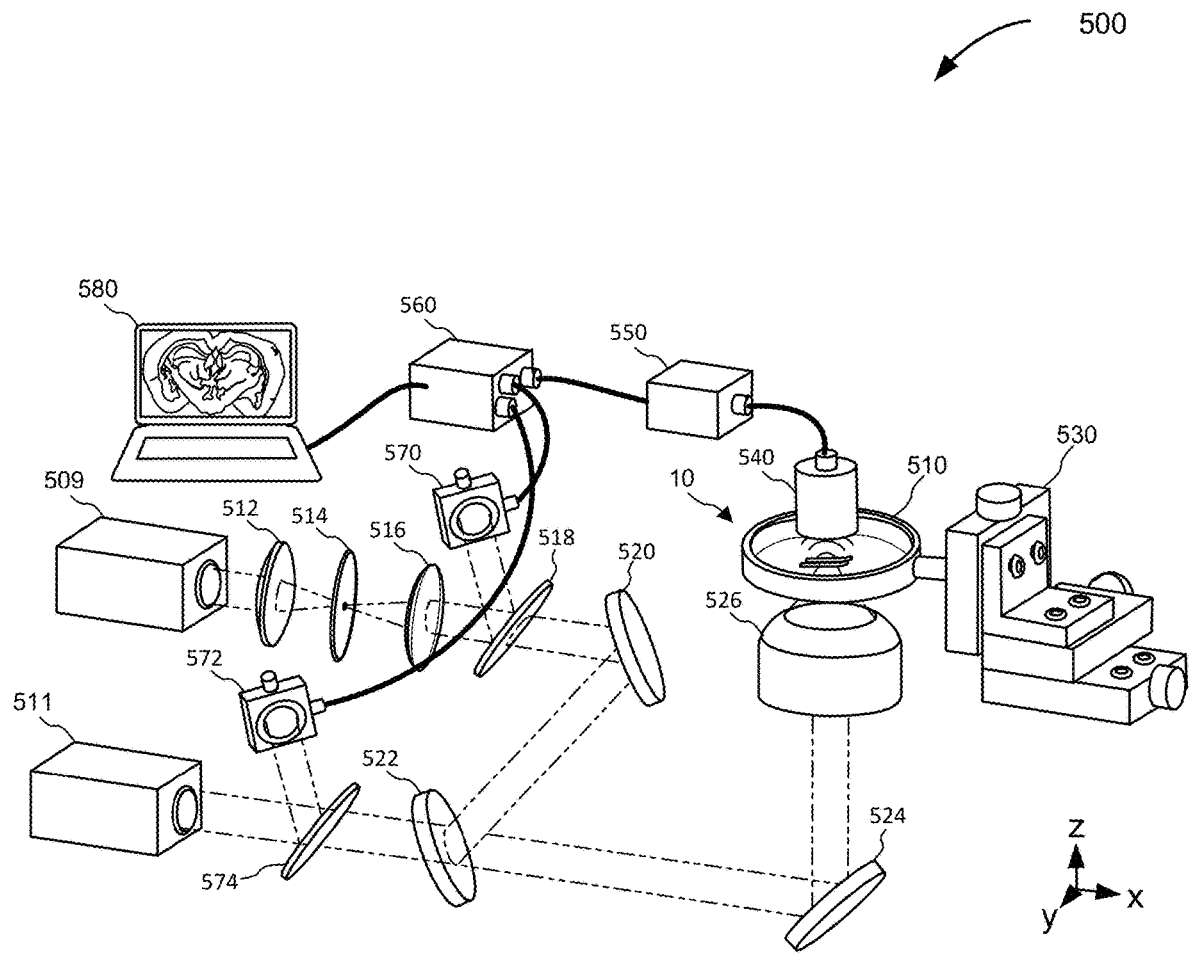
FIG. 5 is a schematic drawing of components of a ULM-PAM system, according to various aspects.

FIG. 5 is a schematic illustration of a ULM-PAM system 500, according to various implementations. The ULM-PAM system 500 includes a first radiation source 509 and a second radiation source 511. The second radiation source 511 is an infrared light source, generally a mid-IR source capable of emitting light over some range within the wavelength range 2.5-20 microns and first radiation source 509 is capable of producing radiation of a shorter wavelength than the IR wavelengths. The second radiation source (IR) may be a tunable narrow band laser source, such as a quantum cascade laser, interband cascade laser, an optical parametric oscillator, or any other source of infrared radiation that can tuned over a plurality of wavelengths. Second radiation source 511 could also be a broadband laser source that simultaneously emits a range of wavelengths, for example a super-continuum source, a femtosecond laser, a frequency comb, or a thermal source (e.g. a "globar"). In these implementations, the first and or second radiation sources 509/511 may be pulsed lasers source that emits pulses, for example, with pulse durations in the microsecond, nanosecond or picosecond range. They may also be a continuous wave (CW) laser source that is chopped, modulated and/or gated. Example IR radiation sources that can be suitable include OPOs manufactured by Ekspla and M Squared (and other companies), with available tuning ranges of 2.5-12 microns, 2.5-4 microns, 5.8-8.5 microns, for example. Suitable quantum cascade laser source are available for example from Block Engineering, Daylight Solutions and other vendors with QCL chips that are tunable within the range from about 3.5-12 microns (and the available ranges continue to grow).

The first radiation source 509 is capable of producing shorter wavelengths than the second (IR) radiation source. In one aspect the first radiation source 509 emits light in the ultraviolet range, but more broadly it can be of a broader range, for example within the wavelength range of 100-2000 nm (e.g. X-ray to near-IR).

One or both of the radiation sources 509 and 511 may be tunable to varying the wavelengths of the MIR or UV pulses. In such embodiments, computing device 580 may provide control signals to the radiation sources 509 and 511 to tune their wavelengths. Computing device 580 may be in one or more of the forms of computing device 480 as described associated with FIG. 4. Additionally the computing device may be used to one or more of the repetition rate, pulse duration, pulse energy, and other operating parameters of the radiation sources. The computing device 480 either alone or in combination with a pulser/delay generator (not shown) may generate trigger signals used to initiate/synchronize pulse emission from one of more of the radiation sources and optionally the data acquisition system 560. Alternately, one of the radiation sources can provide its own internal trigger and this trigger may be output to synchronize the other radiation source and optionally to data acquisition system 560.

In the example of FIG. 5, UV pulses from first radiation source 509 optionally pass through lens, 512, pinhole 514, and lens 516 (together a spatial filter) before reaching an optional beamsplitter 518. The beamsplitter 518 may optically split the UV pulses and send a first fraction of the UV light towards photodiode 570 or another measurement device and a second fraction of the UV light towards mirror 520 (or another suitable optical element). The beamsplitter 518 may be configured to send any desired fraction (e.g., 5%, 10%, 20%, etc.) of the UV light towards the photodiode 570. Beamsplitter 518 may also/alternately be used as an attenuator to decrease the fraction of UV light sent to the sample 10. Photodiode 570 may be configured to measure the amplitude of multiple UV pulses, where the measurements can be later used by computing equipment 580, or another component in system 500, in normalizing photoacoustic signals associated with the UV pulses (e.g., making compensatory scaling of measured photoacoustic signal strengths based on the measured strengths of the UV pulses that generated the photoacoustic signals). In other words, the output of the UV laser 509 is monitored by the photodiode 570 for pulse-to-pulse calibration of the UV pulse energy.

In the example of FIG. 5, mid-infrared pulses from second radiation source 511 pass an optional beamsplitter 574, which sends a fraction of the mid-infrared light towards photodiode 572 and the remainder towards beam combiner 522 (or other suitable optical component). The beamsplitter 574 may optically split the mid-infrared pulses and send a first fraction of the mid-infrared light towards photodiode 572 or another measurement device and a second fraction of the UV light towards beam combiner 522 (or another suitable optical element). The beamsplitter 574 may be configured to send any desired fraction (e.g., 5%, 10%, 20%, etc.) of the mid-infrared light towards the photodiode 572. Photodiode 572 may be configured to measure the amplitude of multiple mid-infrared pulses, where the measurements can be later used by computing equipment 580, or another component in system 500, in normalizing photoacoustic signals (e.g., making compensatory scaling of measured photoacoustic signal strengths based on the measured strengths of the mid-infrared pulses, which locally heat the sample prior to stimulation or excitation by a UV probing pulse). In other words, the output of the mid-infrared light source 511 is monitored by the photodiode 572 for pulse-to-pulse calibration of the mid-infrared pulse energy. In other aspects, the photodiode 572 may be configured to measure both UV pulse energy and mid-infrared pulse energy (e.g., photodiode 572 may be downstream of beam combiner 522 or photodiode 572 may be omitted).

The optical paths between sample 10 and the radiation sources 509 and 511 may be combined at a beam combiner 522, for example germanium dichroic mirror. Beam combiner 522 may be transmissive to IR and reflective to UV as in the configuration shown or the reverse (reflective to IR and transmissive to UV). The combined IR and UV beams are reflected by mirror 524 and then delivered to sample 10 through an objective 526. Objective 526 may for example be a reflective objective of a Schwarzschild (Cassegrain configuration). It may also be an off-axis parabolic mirror, and/or other mirror combination configured to focus the IR and UV pulses to focal spots on sample 10. Mirror arrangements can be optimal because they are generally wavelength independent, but it is possible to employ refractive approaches as well. It is also not necessary that the IR and UV beams be combined collinearly. It is possible to use two separate focusing elements to deliver the UV and IR beams separately, in which case the optics can be separately optimized for the respective wavelength ranges.

Pulses from both the UV and MIR lasers 509 and 511 are focused on the sample 10, which may be mounted on an IR transparent window (e.g. $CaF_2$, ZnSe, ZnS, $BaF_2$ or various other materials) attached to the bottom of a sample holder 510. Sample holder 510 optionally also serves as a reservoir (e.g., tank or liquid cell) to hold acoustic coupling fluid, for example water, buffer solution, acoustic gel or any other suitable coupling fluid. Configured in transmission mode, an ultrasonic transducer 540, which in one aspect has a 25 MHz center frequency, is configured to collect the photoacoustic signals generated by the UV and MIR lasers 509 and 511. Ultrasonic transducer 540 may optionally include a focusing element in which case it may be confocally aligned with the MIR and UV spots, i.e. the foci of the ultrasonic transducer 540 and the objective 526 are substantially aligned. Signals collected by transducer 540 may be optionally amplified by pre-amplifier 550 and then digitized by data acquisition system 560. Data acquisition system 560 may also include channels for collecting and digitizing signals from photodiodes 570 and 572 and may include trigger inputs and/or outputs to synchronize data acquisition with the radiation pulses from radiation sources 509 and/or 511.

In the example of FIG. 5, data acquisition, stage scanning, and laser wavelength adjustments may be controlled by computing equipment such as computer 580. Measurements at a plurality of locations on the sample may be accomplished by generating relative motion between the sample and the IR/UV focused spots. In the configuration shown this sample scanning may be implemented by a three-axis scanning mechanism 530 that moves the sample relative to fixed optical beams. This motion can be manual or preferentially computer controlled. The scanning mechanism can be a motorized stage, piezoelectric actuator system, a voice coil system, or any other actuation system that moves in a controlled way in response to a commanded input. It is also possible to leave the sample stationary and move the optical beams, for example by use of a galvo mirror system, a fast scanning mirror system or similar arrangement. It is also possible to move the objective to generate relative motion of the IR/UV beams. It is worth noting that it may not be necessary to move the ultrasonic transducer 540 as the ultrasound waves have relatively long wavelengths and thus relatively large focal spots. Note that the scanning system can also combine any of the above configurations, for example scanning of the sample 10 in the XY axes and scanning (focusing) of the objective 526 in the Z axis.

In some implementations, computer 580 may direct the components of system 500 to photoacoustically scan sample 10 along a x-axis line, translate the sample (or optics), and then scan sample 10 along a new x-axis line, repeating that process to form a two-dimensional (2D) image. If desired, the photoacoustic scanning may be repeated across a number of z-axis positions, to form a three-dimensional (3D) image. If desired, a 2D image may be formed that extends in the z-axis direction and one of the x-axis or y-axis directions.

A. ULM-PAM Imaging in Transmission Mode

Figure 6:
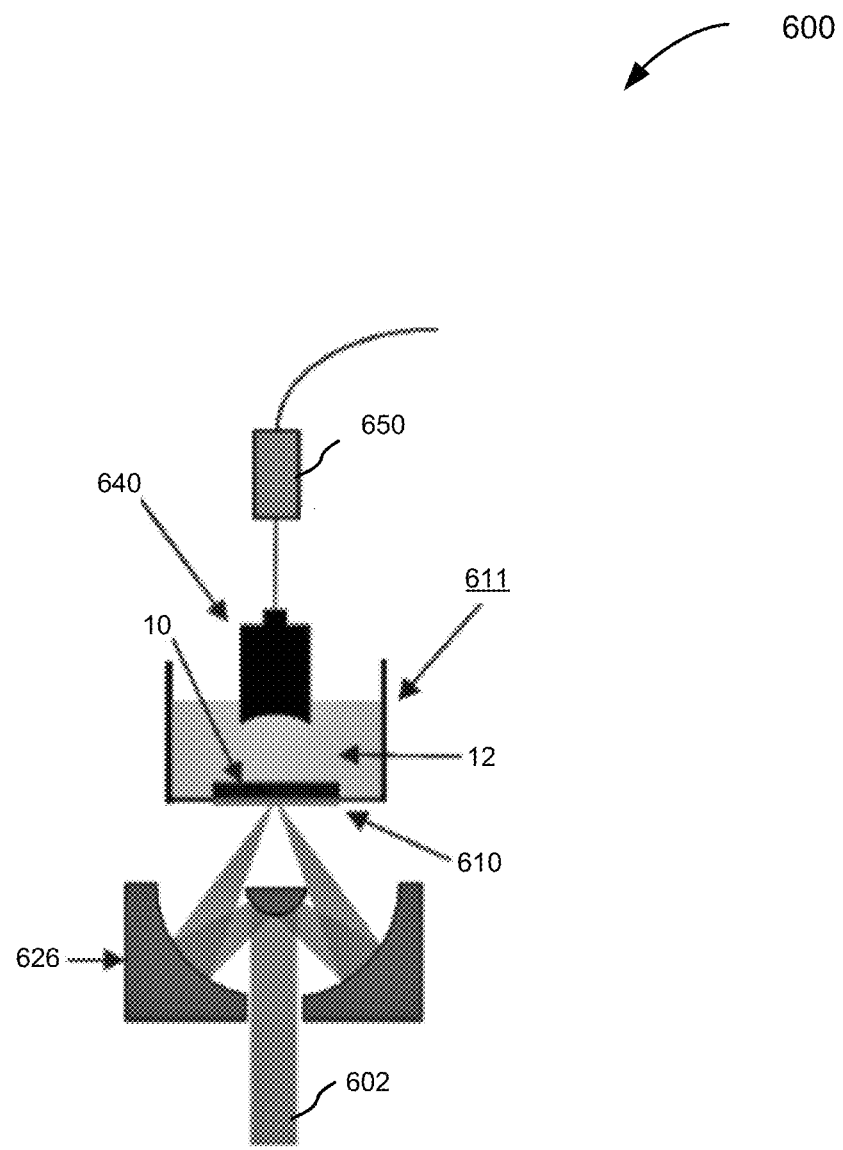
FIG. 6 is a schematic illustration of a side view of a ULM-PAM system configured in a transmission mode, according to various aspects.

In some embodiments, ULM-PAM imaging systems may be configured to operate in a transmission mode. An example of components of a ULM-PAM system 600 in a transmission mode configuration is shown in FIG. 6. As shown in FIG. 6, the ULM-PAM system 600 configured in transmission mode may use a reflective objective lens 626 to focus combined UV/IR laser pulses 602 onto sample 10. In general, the use of reflective optics may facilitate focusing of both MIR and UV pulses. The focused laser pulses may pass through an optical window 610, which may is sufficiently transparent to the MIR and UV wavelengths used in the ULM-PAM system. The optical window 610 may, as examples, be formed of calcium fluoride ($CaF_2$) or magnesium fluoride ($MgF_2$) or other materials with sufficient transmission of UV/IR light. Note that even materials with substantial absorption in the UV and or IR wavelength ranges can be used if (a) they are thin enough and/or (b) there is sufficient energy in the IR/UV pulses to overcome the window attenuation. As described herein, the focused MIR laser pulses serve to probe the IR absorption properties of regions of the sample by locally heating IR absorbing regions of the sample 10. The relative amount of IR absorption is photoacoustically measured with focused UV pulses that cause the sample 10 to emit ultrasonic pulses. The ultrasonic pulses emitted by sample 10 (which may be within sample holder 611) may be conveyed through acoustic coupling medium 12 to the ultrasonic transducer 640. Signals from the ultrasonic transducer 640 may be optionally amplified by amplifier 650 before being digitized by digitizer (e.g., digitizer 462 in FIG. 4 or data acquisition system 560 in FIG. 5). FIG. 6 may be referred to as a transmission mode configuration as the objective 626 and the ultrasonic transducer 640 are on opposite sides of sample 10, that is at least one of the IR/UV light pulses and/or ultrasound signals transmit through sample 10.

B. ULM-PAM Imaging in Reflection Mode

Figure 7:
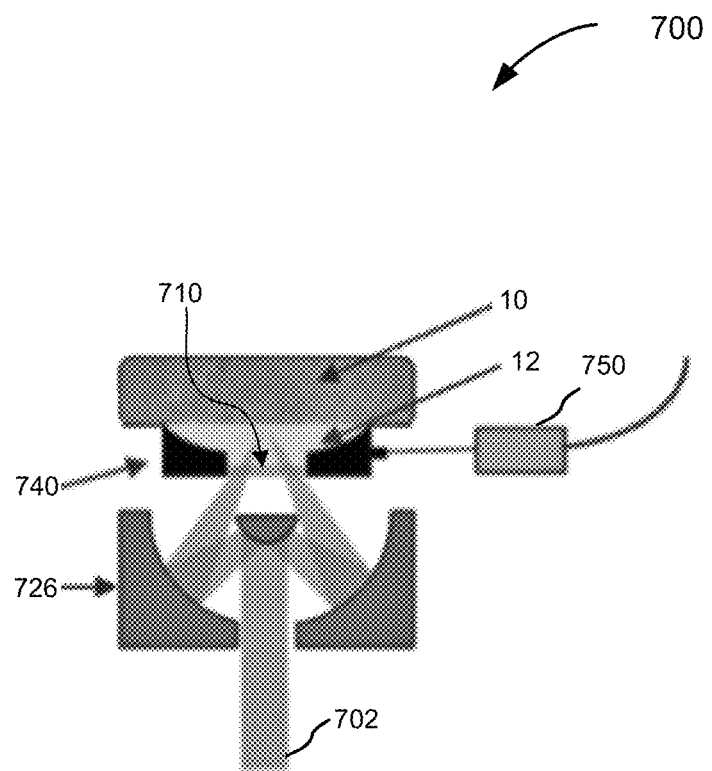
FIG. 7 is a schematic illustration of a side view of components of a ULM-PAM system configured to operate in a reflection mode, according to various aspects.
Figure 8:
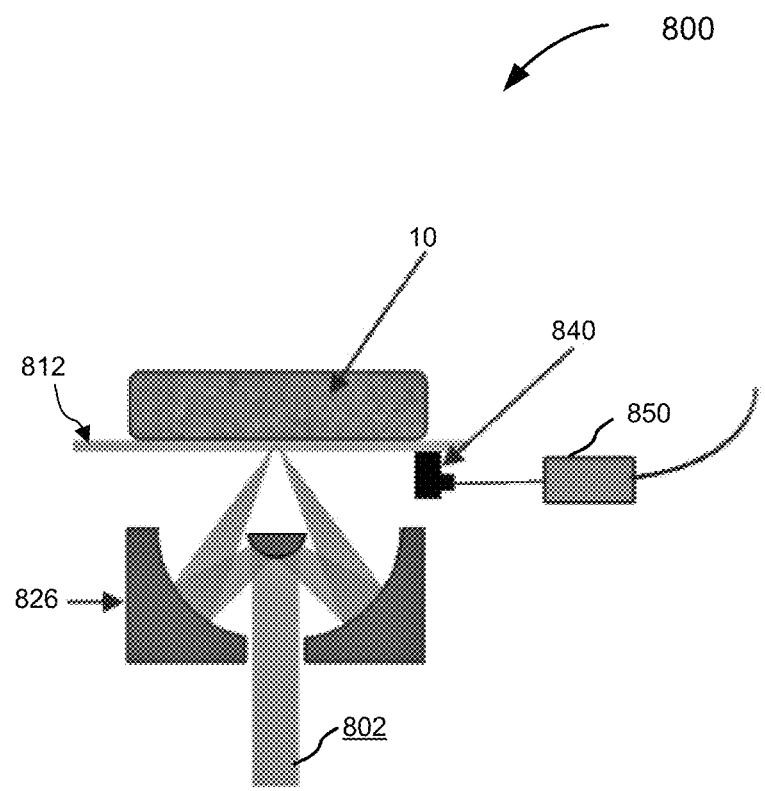
FIG. 8 is a schematic illustration of a side view of components of a ULM-PAM system without acoustic coupling fluid and that is configured to operate in a reflection mode, according to various aspects.

In some other embodiments, ULM-PAM imaging systems may be configured to operate in a reflection mode. Examples of reflection mode configurations are shown in FIGS. 7 and 8. Reflection mode configurations provide various benefits relative to transmission mode configurations, such as, but not limited to, the ability to image (or measure) thicker samples 10 (as the light pulses and ultrasound signals do not have to propagate through the sample), different options for coupling the samples 10 to the ultrasonic transducer (e.g., potentially facilitating the omission of components like sample holder 611 such as a tank), reduced requirements for sample preparation, etc. The reflection mode configurations may employ a surface-wave acoustic detection technique.

FIG. 7 depicts components of a ULM-PAM system 700 in a reflection mode. As shown, the ULM-PAM system 700 includes a reflective objective lens 726 to focus laser pulses 702 onto a sample 10. The ULM-PAM system 700 also includes an ultrasonic transducer 740 and a pre-amplifier 750 in electrical communication with the ultrasonic transducer 740. In the example of FIG. 7, sample 10 is acoustically coupled to the ultrasonic transducer 440 by acoustic coupling medium 12. In this manner, photoacoustic ultrasound signals emitted by the sample 10 can be conveyed to ultrasonic transducer 740. In FIG. 7, the focused laser pulses pass through an optical window 710, which may be substantially transparent to the MIR and UV wavelengths used in the ULM-PAM system. The optical window 710 may, as examples, be formed of calcium fluoride ($CaF_2$) or magnesium fluoride ($MgF_2$) or other suitable materials as described with FIGS. 5 and 6.

FIG. 8 depicts components of a ULM-PAM system 800 in a transmission mode. As shown, the ULM-PAM system 800 includes a reflective objective lens 826 to focus radiation pulses 802 onto a sample 10. The ULM-PAM system 800 also includes an ultrasonic transducer 840 and a pre-amplifier 850 in electrical communication with the ultrasonic transducer 840. In the example of FIG. 8, an acoustic coupling liquid/gel has been omitted. In place of the acoustic coupling fluid, an optical window 812 is provided that is capable of acoustically conveying photoacoustic signals from sample 10 to the ultrasonic transducer 840 (e.g., optical window 812 serves as an acoustic coupling medium). Optical window 812 should have sufficient transparency in the IR/UV to permit transmission of IR/UV pulse energy to the sample. Suitable materials have been described associated with FIGS. 5 and 6.

III. ULM-PAM Imaging Methods

Figure 9:
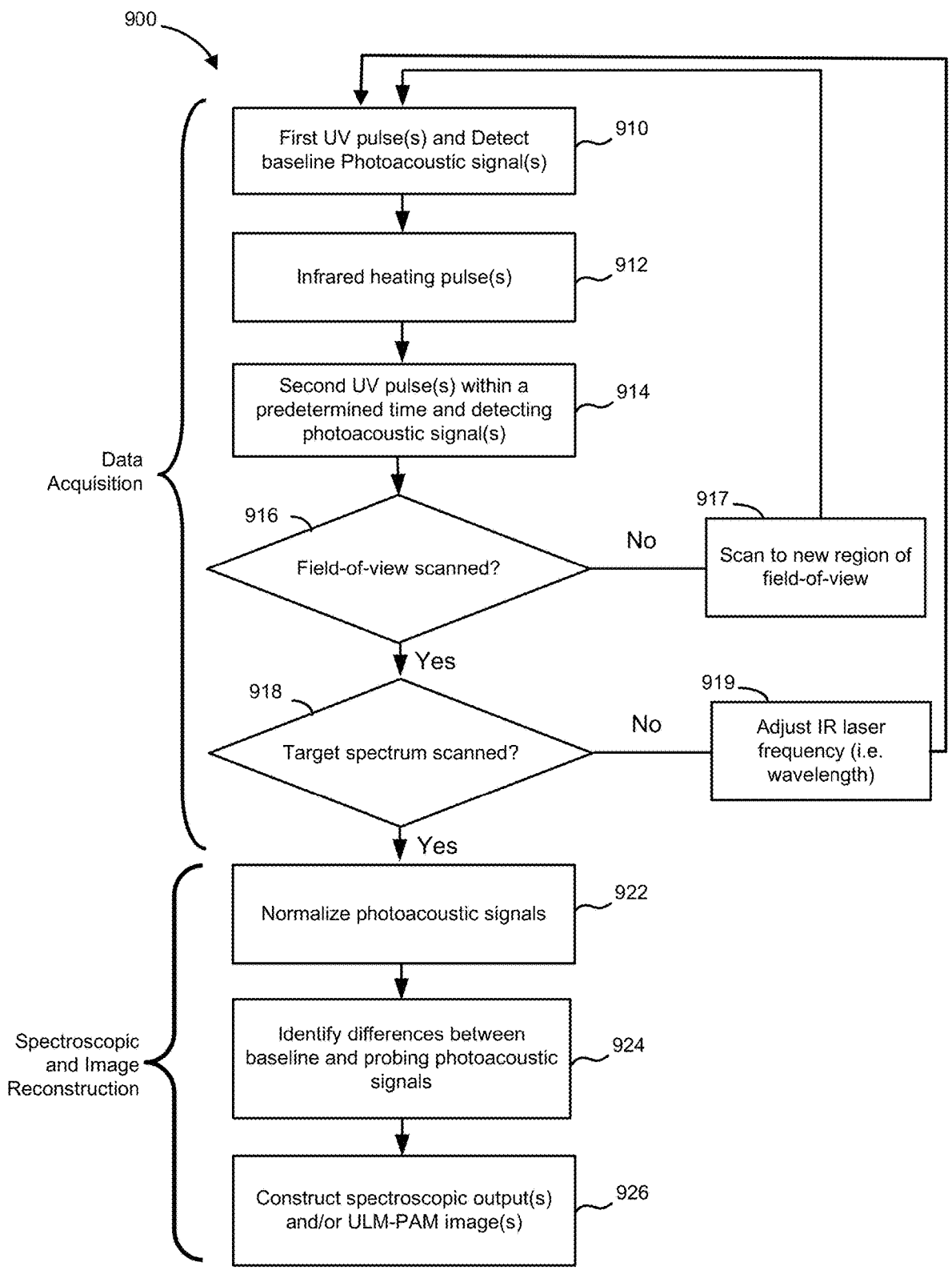
FIG. 9 is a flowchart depicting operations of a ULM-PAM method, according to various aspects.

FIG. 9 includes a flowchart 900 depicting operations of an ULM-PAM method, according to certain aspects. The operations are performed by an ULM-PAM system such as the system shown in FIG. 1, system 400 shown in FIG. 4, the system 500 shown in FIG. 5, the system 600 shown in FIG. 6, the system 700 shown in FIG. 7, or the system 800 shown in FIG. 8. One or more of the depicted operations may be caused by executing instructions retrieved from memory.

At operation 910, the ULM-PAM system focuses one or more first ultraviolet pulses to one or more regions of a sample respectively. In one aspect, the ULM-PAM system focuses one first ultraviolet pulse to a region of the sample to induce a baseline photoacoustic signal ($PA_{UV1}$) at operation 910. The ultrasonic transducer collects a baseline photoacoustic signal at a single position within the sample (e.g., a single UV focal spot). In another aspect, operation 910 involves delivering one or more first ultraviolet pulses to multiple regions respectively of the sample. In this aspect, the ultrasonic transducer detects one or more baseline photoacoustic signals ($PA_{UV1}$) from different locations within the sample (e.g., a microlens array and ultrasound array as discussed in connection with FIG. 16). In one aspect, the sample is maintained (via heating and/or cooling devices) at a predetermined and/or user-configured temperature. The strength of the UV pulse used to include the baseline photoacoustic signal may be measured using a photodiode (e.g., photodiode 472 or other device) to enable compensation for variations strength between different UV pulses. The infrared light source may be off at operation 910 so as to obtain a baseline measurement before heating the sample with one or more subsequent IR pulses.

At operation 910, the ultraviolet light source generating the ultraviolet pulse(s) is either (i) triggered at a first time before the infrared light source is triggered at operation 912 to generate the infrared pulse(s) or (ii) triggered at a second delay time after the infrared light source is triggered in operation 912.

At operation 912, according to one aspect, the ULM-PAM system focuses a mid-infrared heating pulse to a focal spot at a region on the sample, resulting in localized heating of the sample at the focal spot of the MIR pulse in regions of the sample that absorb IR light at the selected wavelength of the MIR pulses. In another aspect, operation 912 involves delivering multiple MIR pulses to multiple regions of the sample simultaneously resulting in localized heating at the plurality of focal spots and/or simultaneously illuminating a large area of the sample with MIR light, e.g. though a large focused IR spot size. The amount of heating in the sample will vary depending on the absorption coefficient of the sample at the MIR wavelength (which is tunable). Thus it is possible to probe the samples IR absorption properties by measuring the relative amount of local sample heating due to IR absorption. The amount of heating is also dependent on the strength of the MIR pulse. In one embodiment, the strength of the MIR pulse used to heat the sample may be measured using photodiode 472 (or other device), to enable compensation for variations strength between different MIR pulses and variation in MIR pulse energy as a function of the MIR wavelength.

At operation 914, the ULM-PAM system focuses one or more second ultraviolet pulses on the sample. In one aspect, the ULM-PAM system focuses an ultraviolet pulse to a sub-region within the region heated by the infrared heating pulse in operation 912. The ultraviolet pulse induces a probing photoacoustic signal ($PA_{UV2}$). The probing photoacoustic signal is from the sub-region of the sample heated in operation 912. In another aspect, the ULM-PAM system focuses multiple ultraviolet pulses to multiple sub-regions within the region heated by the infrared heating pulse in operation 912 and the ultraviolet pulses induce a plurality of probing photoacoustic signals ($PA_{UV2}$) from the sub-regions. In yet another aspect, the ULM-PAM system focuses a plurality of first ultraviolet pulses to a plurality of sub-regions, each sub-region in a region heated by an infrared heating pulse in operation 912 and the second ultraviolet pulses induce a plurality of probing photoacoustic signals ($PA_{UV2}$) from sub-regions in the plurality of regions.

The ULM-PAM system triggers an ultraviolet light source to generate the one or more second ultraviolet pulses in operation 914 within a predetermined period from the triggering of the infrared light source in operation 912. In most cases, the predetermined period is the thermal relaxation time (also referred to as thermal confinement time) of the sample (e.g., the duration before the heated region has substantially cooled or reached thermal equilibrium with the rest of the sample). In the case of hydrated biological samples, typical thermal confinement times may be between approximately 100 nanoseconds and 500 nanoseconds. Thus, when the sample is a hydrated biological sample, operation 914 may be performed within 100 nanoseconds, within 200 nanoseconds, within 250 nanoseconds, within 300 nanoseconds, within 400 nanoseconds, or within 500 nanoseconds of the triggering of the ultraviolet light source in operation 912.

Operation 914 also involves detecting a photoacoustic signal from a single position within the sample (e.g., a single UV focal spot) or collecting photoacoustic signals from a plurality of positions within the sample (e.g., a microlens array and ultrasound array as discussed in connection with FIG. 16). The strength of the UV pulse used to collect the probing photoacoustic signal may be measured using photodiode 470 (or other device), to enable compensation for variations strength between different UV pulses.

At operation 916, the ULM-PAM system determines if the desired field-of-view (of the sample) has been fully scanned. If the field-of-view is not fully scanned, the ULM-PAM system performs operation 917 by moving components of the system to move the focal spots of the light sources to a new region or new regions of the field-of-view. For example, operation 916 may involve processors(s) that send control commands to a scanning mechanism (e.g., scanning mechanism 430) to shift the UV and/or MIR focal spots to another region(s) of the field-of-view. Afterwards, the ULM-PAM method repeats operations 910, 912, and 914.

If the field-of-view is fully scanned, the ULM-PAM method performs operation 919 if spectroscopic measurements or images are desired. At operation 919, the ULM-PAM system tunes or adjusts the frequency (i.e. wavelength) of the infrared light source. As an example, operation 919 may involve processor(s) sending control commands to a tunable mid-infrared light source to re-tune to a new infrared frequency. Afterwards, the ULM-PAM system repeats operations 910, 912, and 914. With arrangements of this type, the ULM-PAM system can measure a signal indicative of the IR absorption coefficient at a plurality of infrared wavelengths to obtain spectroscopic information about the sample, e.g. an infrared absorption spectrum. Operation 919 may be performed repeatedly in combination with operations 910, 912, 914, and 916 as indicated by the arrows in which case a hyperspectral data cube will be created, i.e. a signal indicative of IR absorption is created at a multidimensional array of sample positions and IR wavelengths. It is also possible to perform these measurements at any subset of spatial or spectral dimensions. For example it is possible to obtain IR absorption measurements at a plurality of XY locations, but fixed MIR wavelength to produce a map of IR absorption for example at a single IR absorption band. It is also possible to remain at a single location on the sample and rapidly sweep the IR laser frequency (wavelength) to obtain an IR absorption spectrum at a single location. It is also possible to create IR absorption spectra at a pre-programmed array of points on the sample (e.g. a line array) and/or at discrete locations selected by a user.

After or concurrently with collecting the baseline and probing photoacoustic signals, the ULM-PAM system may perform normalization operation 922. At operation 922, the ULM-PAM system normalizes the collected photoacoustic signals. As an example, the ULM-PAM system may analyze the collected photodiode measurements indicative of the pulse energies of the IR and or UV pulses and scale the measured response by the strength of the IR/UV pulses. This may be performed in real-time, e.g., by simultaneously measuring the IR and/or UV pulse energy during the measurement of the ultrasonic responses, and/or it may be performed before or after. For example it is possible to separately measure the IR pulse energy as a function an IR frequency (wavelength) and use this as a normalization curve for the measured data. It is also possible to perform a reference measurement on a sample with either flat or known IR absorption properties and use the reference measurement to normalize the photoacoustic responses. This normalization step 922 can also follow rather than precede operation 924 below.

At operation 924, the ULM-PAM system analyzes the detected (and optionally normalized) amplitudes of the photoacoustic signals and identifies fractional changes resulting from the MIR pulse heating. As an example, the system may determine the change in amplitudes of the photoacoustic signals for each sub-region location (e.g., pixel) scanned within the sample and optionally for each MIR wavelength in the target spectrum, calculated as:

$$\Delta PA = PA_{UV2} - PA_{UV1} \quad \text{(Eqn. 1)}$$

wherein $PA_{UV1}$ is a baseline photoacoustic signal obtained before or after MIR heating and $PA_{UV2}$ is a probing photoacoustic signal obtained synchronous with or following MIR heating but preferably within the thermal relaxation time of the sample (i.e. before the IR induced temperature increase has dissipated and/or the spatial resolution has been adversely affected due to spreading of heat).

As previously noted, the generation of photoacoustic signals by a sample depends on both the optical absorption coefficient (of the sample at the wavelength being observed, e.g., at the UV wavelength) as well as the temperature of the sample prior to photo-stimulation (e.g., the pre-laser-pulse temperature). Since each pair of baseline and probing photoacoustic pulses are collected using UV pulses at the same wavelength focused on the same portion of the sample, any differences in $PA_{UV1}$ and $PA_{UV2}$ results from the localized heating from the MIR pulse. The ULM-PAM system is able to use the differences in photoacoustic signals (each pair being associated with a particular focal position at sub-region and a particular MIR wavelength) to measure the amount of heating resulting from the MIR pulse. The temperature change resulting from each MIR pulse depends upon the strength of the MIR pulse as well as the absorption coefficient of the sample at the scan location. Thus, by measuring the amount of heating resulting from the MIR pulse, the ULM-PAM system is able to measure the absorption coefficient of the sample. Operation 924 may involve using feedback from photodiode 472 to compensate for variations in the strength of the MIR pulse such as by dividing every differential photoacoustic signal ($\Delta PA$) by a signal representative of the strength of the MIR and/or UV pulses. In the description above the differencing operation 924 was described as operating between alternating pulse pairs. Note that it is also possible to obtain a plurality of baseline pulses (step 910) then a plurality of IR and second UV pulses (steps 912 and 914) and then perform the difference calculation (step 924) on the plurality of baseline and $2^{nd}$ UV pulses.

At operation 926, the ULM-PAM system may construct an output from the differential photoacoustic signal(s) ($\Delta PA$). As examples, the ULM-PAM system may construct a spectroscopic measurement (e.g., an absorption coefficient for a particular MIR wavelength at a single position in the sample) or a graph or image (e.g., a 1-D line graph, 2-D image, a 3-D image, or a 4-D image showing absorption coefficients of the sample as a function of at least one of MIR wavelength, x-position, y-position, and z-position within the sample).

III. Examples of ULM-PAM Images and Spectroscopic Measurements

To demonstrate the capabilities of ULM-PAM systems, a ULM-PAM system was used to obtain ULM-PAM measurements and imagery of various test samples. Various alternative systems were used to obtain alternative measurements of the test samples for the sake of comparison with the ULM-PAM results. As examples, a pure mid-infrared photoacoustic microscopy (MIR-PAM) system and an attenuated total reflection-Fourier transform infrared microscopy (ATR-FTIR) system were used to obtain comparison measurements.

Figure 10A:
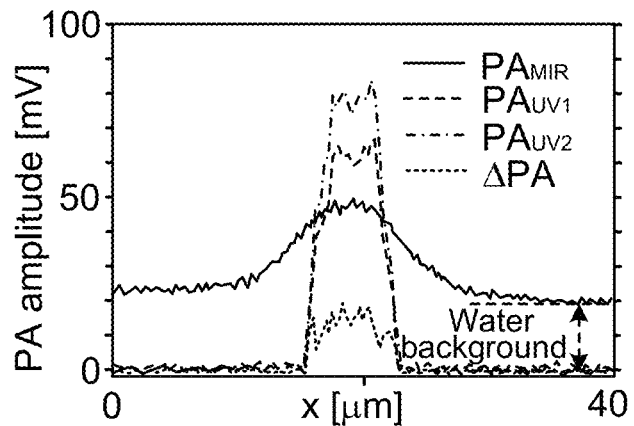
FIG. 10A is a graph of cross-sectional line images of a 6-µm-diameter carbon fiber obtained with a MIR-PAM system and a ULM-PAM system, according to an aspect.

FIG. 10A is a graph of cross-sectional line images of a 6-µm-diameter carbon fiber obtained with a MIR-PAM system and a ULM-PAM system, taking along a single axis. The MIR-PAM was obtained at a 3,500 nm wavelength and has a much lower resolution and higher water background than the MIR-PAM image. By contrast, the ULM-PAM differential image ($\Delta PA = PA_{UV2} - PA_{UV1}$) was acquired at a 266 nm UV wavelength and the ULM-PAM image has a much sharper edge and lower water background. The maximal fractional change of the UV photoacoustic signals ($\Delta PA/PA_{UV1}$) is ~25%, corresponding to a temperature rise of 7° C. due to the MIR laser pulse.

FIG. 10A illustrates the baseline ($PA_{UV1}$), probing ($PA_{UV2}$), and differential ($\Delta PA$) photoacoustic signals obtained with the ULM-PAM system as well as the photoacoustic signals ($PA_{MIR}$) obtained with the MIR-PAM system. As shown in FIG. 10A, the $PA_{MIR}$ signal has significant noise (water background) as compared to the ULM-PAM system (where any such noise may be removed in the calculation of the differential ($\Delta PA$) photoacoustic signals.

Figure 10B:
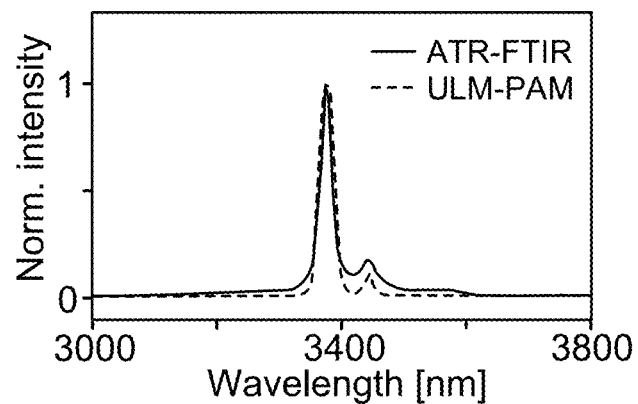
FIG. 10B is a graph of spectroscopic information obtained with an ATR-FTIR system and a ULM-PAM system, according to an aspect.

FIG. 10B is a graph of spectroscopic information obtained with an ATR-FTIR system and a ULM-PAM system. In particular, the ULM-PAM system was used to measure the ULM-PAM spectrum (absorption coefficient across a range of MIR wavelengths) of a thin layer of polydimethylsiloxane (PDMS), which has a sharp methyl group absorption line ($CH_3$) around 3,374 nm (2,964 $cm^{-1}$). The ULM-PAM IR absorption spectrum was obtained by averaging 100 measurements to reduce noise and was calibrated according to the pulse energy output of the MIR laser (e.g., using a device such as photodiode 472). As a reference, an ATR-FTIR spectrometer was used to measure the MIR spectrum of the PDMS. FIG. 10B shows good agreement between the ULM-PAM and ATR-FTIR spectra, validating that ULM-PAM can be used to accurately generate MIR-absorption spectra. In other words, ULM-PAM can reveal fingerprints of vibrational absorption of a variety of chemical bonds at MIR wavelengths but with higher resolution (e.g., UV diffraction limited instead of MIR diffraction limited). By contrast both conventional IR spectroscopy and MIR-PAM works at much coarser spatial resolution due to the relatively longer wavelengths. Also pure UV-PAM without MIR mediation reflects electronic absorption at UV wavelengths only. ULM-PAM on the other hand can provide MIR spectroscopic information with spatial resolution at least an order of magnitude better than conventional IR spectroscopy and MIR-PAM.

Figure 10C:
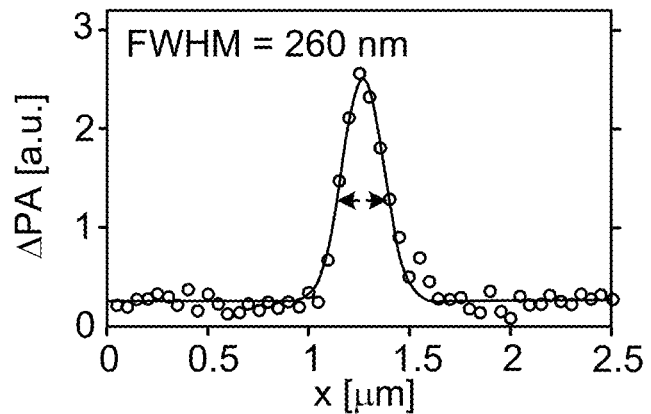
FIG. 10C is a graph of a line image of a 50-nm-diameter carbon nanobead in water obtained with a ULM-PAM system, according to an aspect

FIG. 10C is a graph of a line image of a 50-nm-diameter carbon nanobead in water obtained with a ULM-PAM system operating at an MIR wavelength of 3,500 nm and a UV wavelength of 224 nm. FIG. 10C demonstrates and quantifies the spatial resolution of the ULM-PAM system. In particular, the measured full width at half maximum (FWHM) of the 1D image profile was 260 nm (FIG. 10C), which is close to the theoretical diffraction-limited resolution (250 nm) achievable with the 0.45 NA objective lens. In comparison, the carbon nanobead could be distinguished in the pure-MIR photoacoustic image, because it is much smaller than the MIR focal spot and the photoacoustic signals are overwhelmed by the water background. The theoretical diffraction-limited resolution at the 3,500 nm MIR wavelength with the same 0.45 NA objective lens is 3,900 nm. At other MIR wavelengths, e.g., 6 μm and 8 μm, ULM-PAM gave the same image resolution of around 260 nm, which means that the resolution is determined primarily by the UV focus. Therefore, the ULM-PAM system achieves sub-MIR-diffraction-limited MIR imaging with invariant 260-nm—UV resolution. Commercial reflective objectives are also available with much higher NA, up to 0.8 or higher which could achieve even finer spatial resolution by producing even smaller UV focal spot sizes.

Figure 10D:
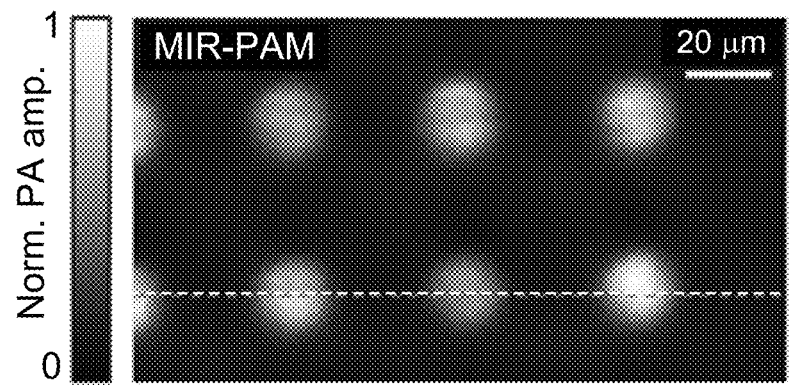
FIG. 10D is an image of carbon nanotubes obtained with a MIR-PAM system.
Figure 10E:
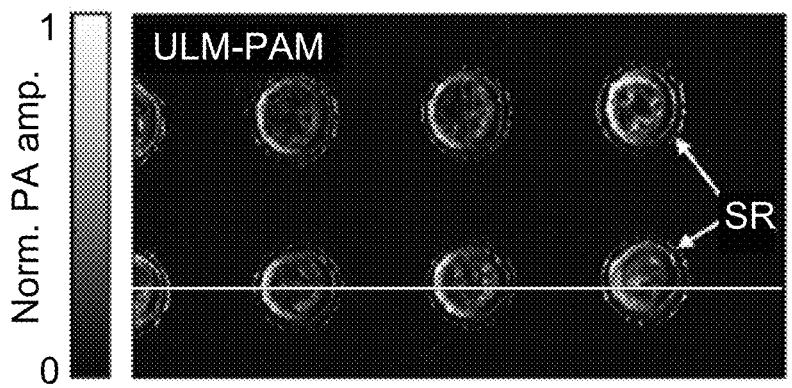
FIG. 10E is an image of carbon nanotubes obtained with a ULM-PAM system, according to an aspect.
Figure 10F:
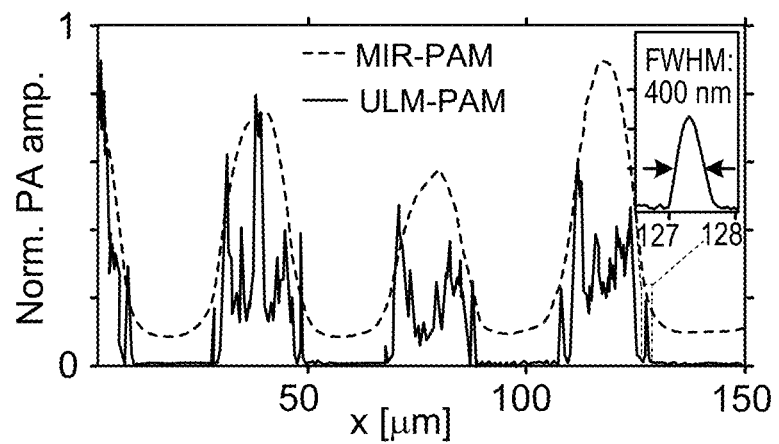
FIG. 10F is a graph of photoacoustic intensities across the dashed line of FIG. 10D and the solid line of FIG. 10E, according to an aspect.
Figure 14:
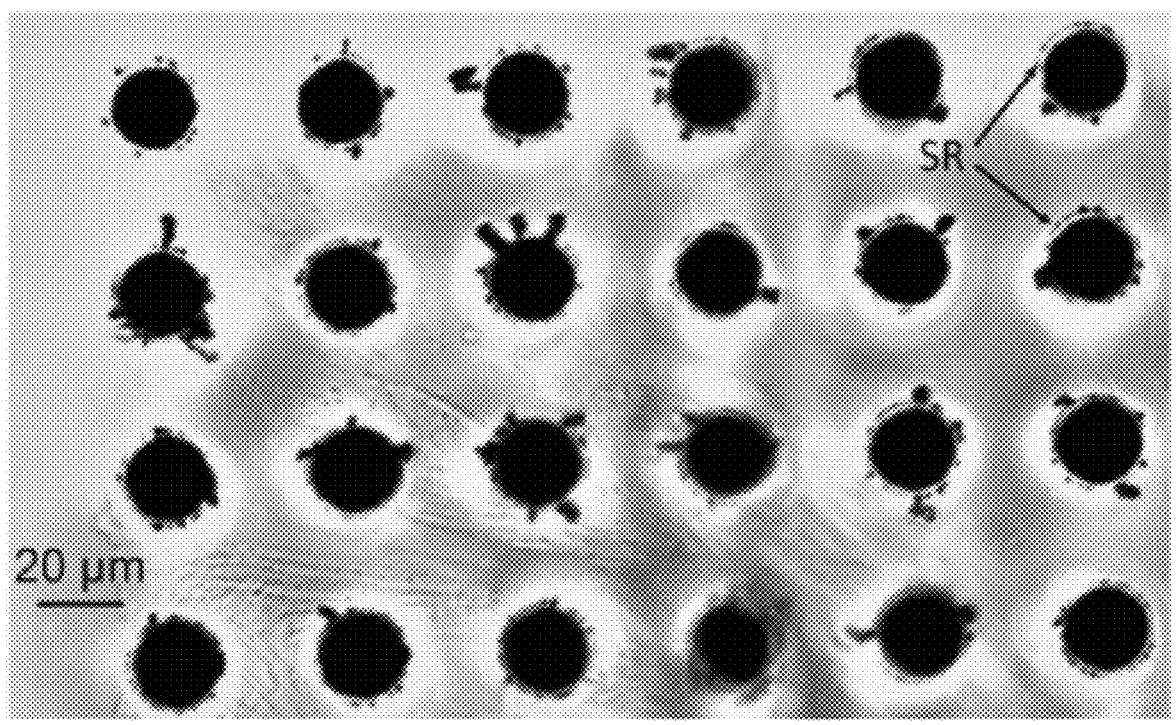
FIG. 14 is a confocal microscopic image of carbon nanotubes, according to an aspect.

The resolution of the ULM-PAM system was further demonstrated by imaging a carbon-nanotube (CNT) pattern deposited on an $MgF_2$ substrate, which was developed as a broad-spectral resolution target for photoacoustic imaging. FIG. 10D is an image of the carbon nanotubes obtained with a MIR-PAM system. FIG. 10E is an image of the carbon nanotubes obtained with a ULM-PAM system. FIG. 10F is a graph of photoacoustic intensities across the dashed line of FIG. 10D and the solid line of FIG. 10E. As expected, the pure MIR-PAM image of the CNT pattern (FIG. 10D) is blurry. In comparison, the ULM-PAM image (FIG. 10E) shows crisp structures of the CNT-formed disks, and even reveals some fine features, such as satellite rings around the disks, which originated from photolithography artifacts from using a $MgF_2$ substrate in fabrication (see FIG. 14 for a confocal microscopic image of the carbon-nanotube pattern showing the satellite rings (SR)). From the line profiles (seen in FIG. 10F) taken from FIG. 10D and FIG. 10E, one observes that the ULM-PAM image discloses a 400-nm feature of the satellite rings while the MIR-PAM image shows only a general envelope of the CNT disks coupled with water background.

Figure 11A:
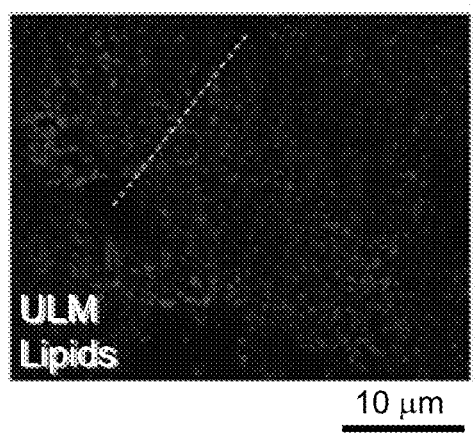
FIG. 11A is an image of lipids obtained with a ULM-PAM system, according to an aspect.
Figure 11B:
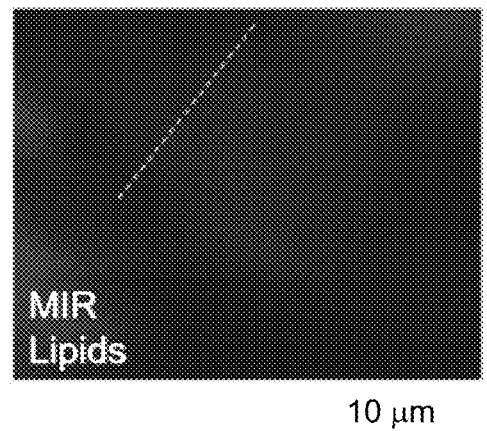
FIG. 11B is an image of lipids obtained with a MIR-PAM system, according to an aspect.
Figure 11C:
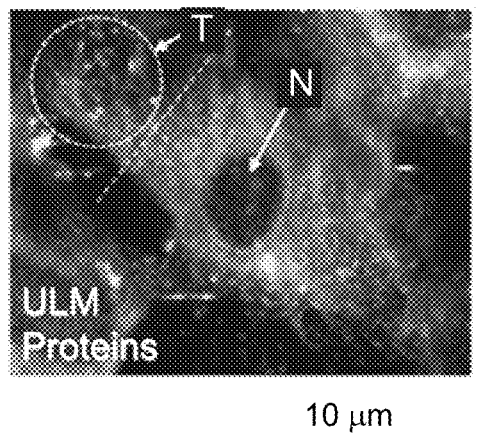
FIG. 11C is an image of proteins obtained with a ULM-PAM system, according to an aspect.

As further demonstration investigating subcellular imaging, a ULM-PAM system was used to image the lipid and protein composition in freshly fixed 3T3 mouse fibroblast cells. The ULM-PAM UV wavelength was tuned to 224 nm, where almost all proteins, lipids, and nucleic acids have strong absorption. For lipid imaging, the MIR wavelength was set to the absorption peak at 3,420 nm (2924 $cm^{-1}$), corresponding to the asymmetric stretching mode of the $CH_2$ group—the dominant constituent of lipids. The ULM-PAM image of lipids in FIG. 11A shows many small aggregated globules, attributed to the distribution of oleic acid droplets in cells. For protein imaging, a 6,050 nm (1653 $cm^{-1}$) wavelength was used to target the amide I band—the most absorptive band in proteins. As shown in FIG. 11C, while proteins are relatively scant in the nucleic region, they are abundant in the cytoplasm; in particular, they weave tubular structures near the cell edge. These structures possibly originate from actin filaments and bundles in the fibroblast cell, although they are not clearly depicted because of the lack of optical sectioning. Nevertheless, it is the first time that MIR microscopy has revealed the sub-cellular protein distribution in hydrated cells at such a fine resolution. For nucleic acid imaging, the DNA/RNA is partially invisible in MIR imaging, mainly owing to its band overlap with other chemical bonds and low absorption. Instead, a 250 nm UV wavelength was used to directly generate a UV-PAM image (FIG. 11F), based on the strong electronic absorption of nucleic acids. Therefore, all images of the fibroblast cell based on the contrasts of lipids, proteins, and nucleic acids have high resolution and near-zero water backgrounds.

Figure 11D:
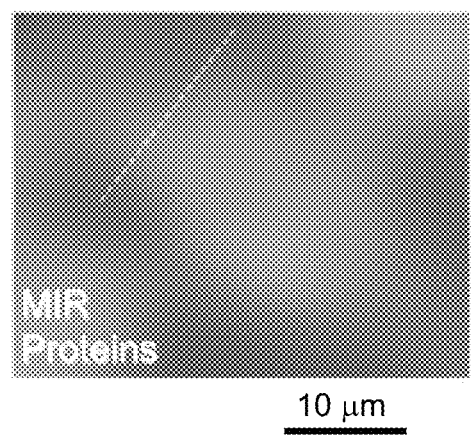
FIG. 11D is an image of proteins obtained with a MIR-PAM system, according to an aspect.

In contrast, the MIR-PAM images of lipids (FIG. 11B) and proteins (FIG. 11D)—obtained at 3,420 nm and 6,050 nm, respectively—have poor resolution and strong water backgrounds. The ULM-PAM images reveal many fine features, while the regular MIR-PAM images do not.

Figure 11E:
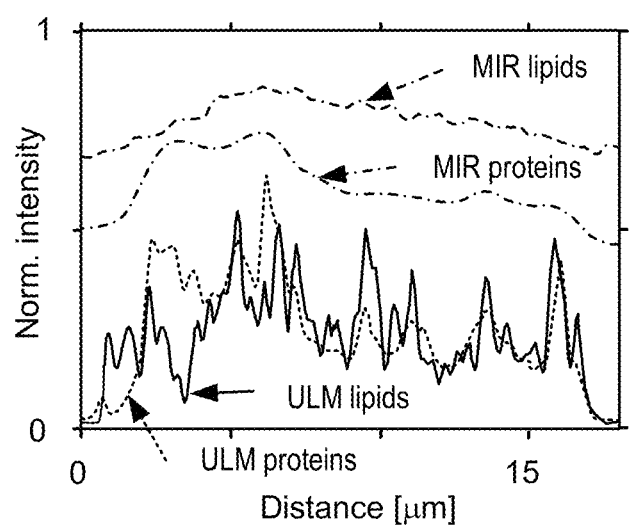
FIG. 11E is a graph of photoacoustic intensities across the dashed lines of FIGS. 11A, 11B, 11C, and 11D, according to an aspect.

Four line-profiles taken from FIGS. 11A, 11B, 11C, and 11D are shown in FIG. 11E. These line profiles again show the advantages of ULM-PAM over MIR-PAM in higher resolution and lower water backgrounds.

Figure 11F:
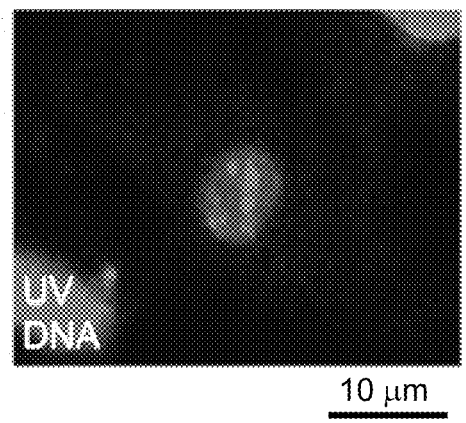
FIG. 11F is an image of nucleic acids obtained with a ULM-PAM system, according to an aspect.
Figure 11G:
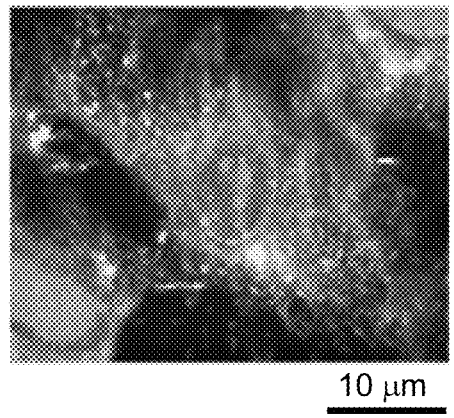
FIG. 11G is a composite image of FIGS. 11A, 11C, and 11F, according to an aspect.

FIG. 11G shows overlaid ULM-PAM images of lipids, proteins, and nucleic acids (shown in FIGS. 11A, 11C, and 11F). FIG. 11G vividly shows a fibroblast cell, revealing its chemical composition and structure.

Figure 11H:
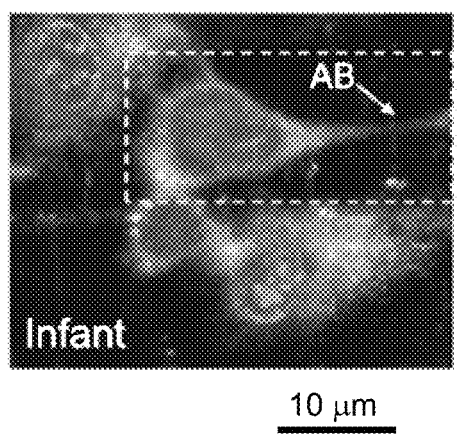
FIG. 11H is a composite image of ULM-PAM images of lipids, proteins, and nucleic acids of a cell in a neonatal stage, according to an aspect.
Figure 11I:
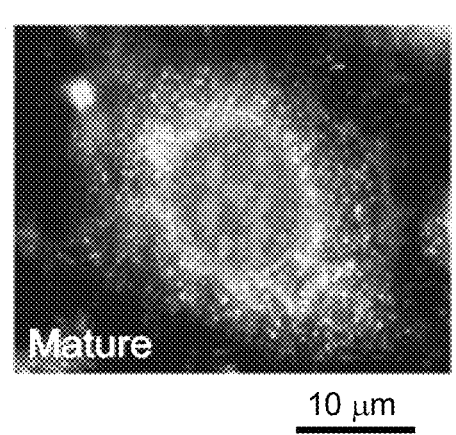
FIG. 11I is a composite image of ULM-PAM images of lipids, proteins, and nucleic acids of a cell in a mature stage, according to an aspect.

The ULM-PAM system was also used to image cells at different stages of their lifecycle. FIG. 11H is an image of an infant cell showing a long fiber, composed of actin bundles, that enables the cell to crawl on the substrate, while the image of a mature fibroblast cell (FIG. 11I) reveals more lipid droplets and a more confined actin network, leading to reduced mobility. These results show that ULM-PAM is capable of imaging sub-cellular organelles in cells, at fine resolution and high contrast, without obscuration from water.

Figure 12A:
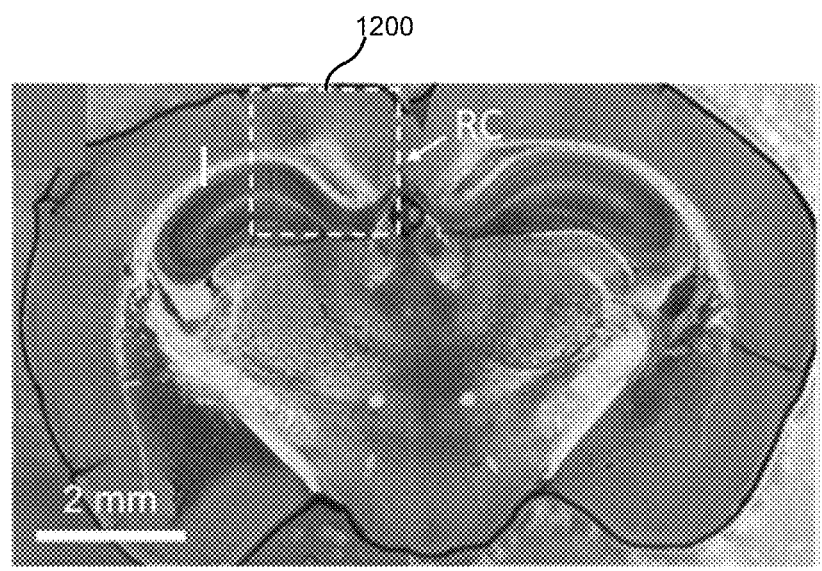
FIG. 12A is an image of a cerebrum section of the brain of a mouse obtained with a MIR-PAM system, according to an aspect.

Another major application of ULM-PAM systems is the label-free photoacoustic histology of thick tissue slices. Since the study of nerve fibers is important in brain science, and myelin is one of the main chemical components of nerves, a ULM-PAM system was used to study the structural distribution of myelin in the mouse brain ex vivo. A microtome sliced a coronal cerebrum section and a horizontal cerebellum section, both 300 μm thick, from a freshly fixed mouse brain. In the beginning, myelin images of these two sections (FIGS. 12A and 12B) were acquired by MIR-PAM at a 3,420 nm wavelength, which is in the peak absorption wavelength of myelin lipids. The MIR-PAM images of the cerebrum and cerebellum sections are both similar to histology or dyed-stained fluorescence images, exhibiting structural information of nerve fibers or fiber bundles. However, the resolution of the MIR-PAM images is poor, and the image contrast is obscured by water background, such that finer detail such as concentration gradient and structural details across the boundary between the retrosplenial cortex and grey cortical region are difficult or impossible to resolve. With respect to the water ground, it is noted that, in addition to the water inside the hydrated sample, there is generally a thin layer of water between the sample and the $CaF_2$ substrate.

To overcome the MIR-PAM limitations, a ULM-PAM system, configured with a UV wavelength of 224 nm and an MIR wavelength of 3,420 nm, was used to achieve higher-resolution and water-background—free MIR imaging of myelin. A MIR-PAM system was used to scan a small area of interest and the results are illustrated in the image of FIG. 12C. The area of interest corresponds to the retrosplenial cortex (RC) in the cerebrum (region 1200 in FIG. 12A). A ULM-PAM system, such as system 400 of FIG. 4, was used to image the same area of interest and the results are illustrated in the image of FIG. 12D. Compared with the blurry MIR-PAM image of FIG. 12C, the ULM-PAM image of FIG. 12D clearly shows the fine structures of nerve fibers or bundles in the retrosplenial cortical region.

Figure 15A:
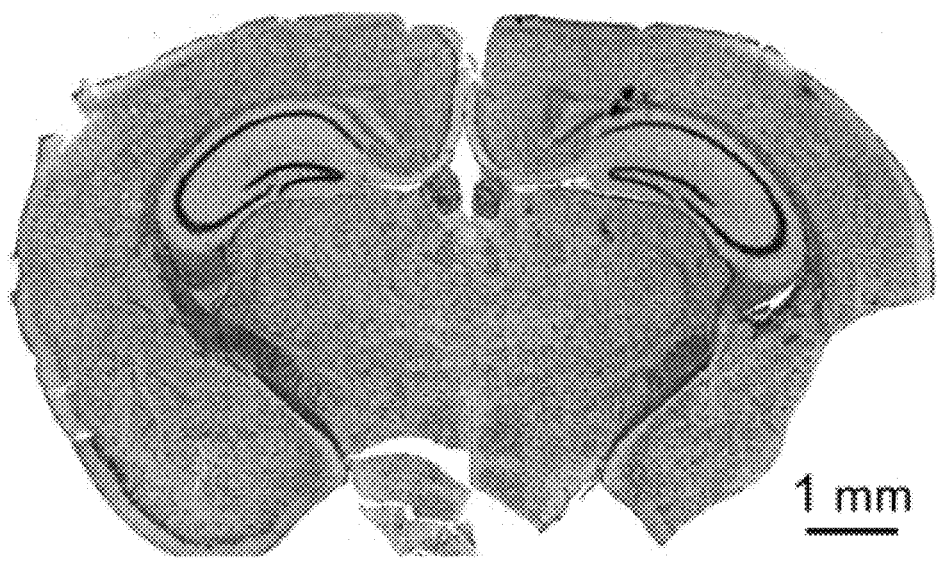
FIG. 15A is a histologic image of a cerebrum, according to an aspect.
Figure 15B:
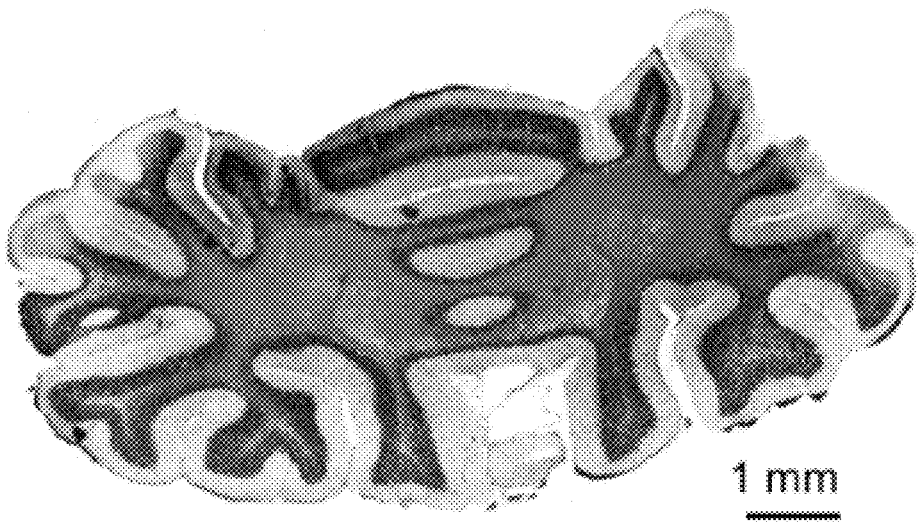
FIG. 15B is a histologic image of a cerebellum, according to an aspect.

The ULM-PAM image of myelin (FIG. 12D) can, if desired, be overlaid with a ULM-PAM image of nucleic acids (acquired at 250 nm), which results in a histology-like image (sometimes referred to as PA histology or a PA-histology image) showing both myelin and nucleic acid distributions. The PA-histology image was validated by further sectioning the same slice of brain into thinner slices, staining the slices (with Luxol fast blue (LFB), as an example), and imaging the slices by optical microscopy. The optical microscopy LFB-stained images are illustrated in FIGS. 15A and 15B, with FIG. 15A showing a 10-micrometer thick slice of cerebrum and FIG. 15B showing a 10-micrometer thick slice of cerebellum. The PA-histology image and the optical microscopy image showed similar structural and chemical composition information about the retrosplenial cortex.

Figure 12B:
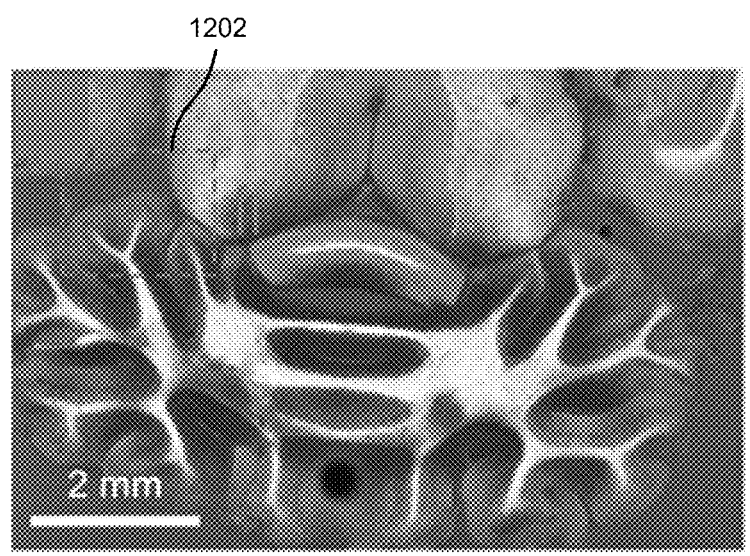
FIG. 12B is an image of a cerebellum section of the brain of the mouse obtained with the MIR-PAM system used to obtain the image in FIG. 12A, according to an aspect.
Figure 12C:
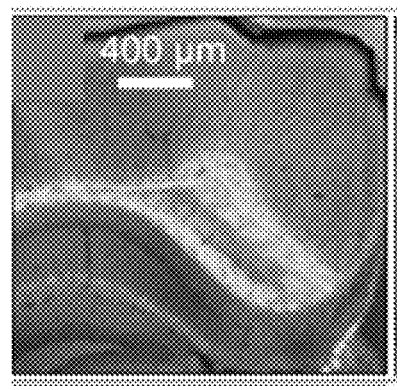
FIG. 12C is a MIR-PAM image of mouse myelin, according to an aspect.
Figure 12D:
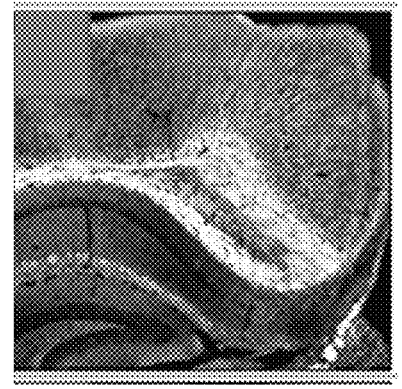
FIG. 12D is a ULM-PAM image of mouse myelin, according to an aspect.
Figure 12E:
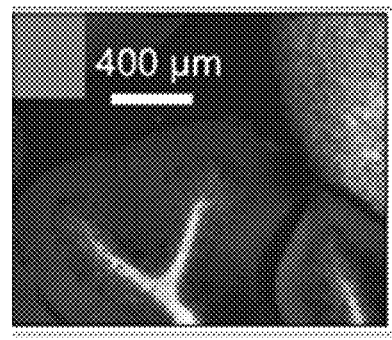
FIG. 12E is a close-up MIR-PAM image of mouse myelin, according to an aspect.
Figure 12F:
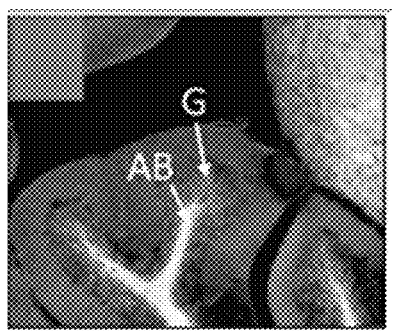
FIG. 12F is a close-up ULM-PAM image of mouse myelin, according to an aspect.
Figure 12G:
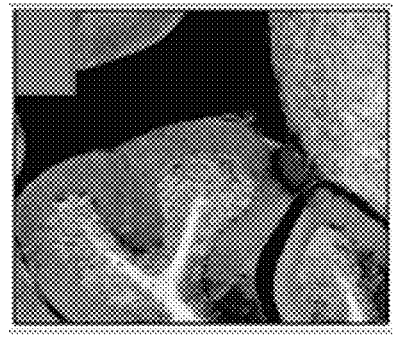
FIG. 12G is a photoacoustic histology image of mouse myelin, according to an aspect.

A similar set of images were obtained on another region of interest, this time within the cerebellum section of the brain (e.g., region 1202 in FIG. 12B). The resulting ULM-PAM image (FIG. 12F, where AB is an arbor vitae region and G is a granular region) shows dense nerve bundles in the arbor vitae region and sparse but clear nerve fibers in the granular region, whereas the PA-histologic image (FIG. 12G) reveals the densely distributed nucleic acids. The LFB-stained image also validated the PA-histologic image of region 1202 in the cerebellum section. These results demonstrate that ULM-PAM is capable of imaging myelin distribution and revealing nerve fibers or bundles in thick brain slices at high resolution and low water background. Further, aided with UV-PAM imaging of nucleic acids, it can generate PA-histologic images that are similar to standard histologic images. A MIR-PAM image of the same region is shown in FIG. 12E, for the sake of comparison.

A. System Configuration Details

Details of the systems used in obtaining the ULM-PAM, MIR-PAM, ATR-FTIR, and other sample images (of FIGS. 10A-15B) are described below.

The ULM-PAM system utilized an OPO mid-MIR laser (a NT242-SH, made by EKSPLA) and an OPO UV laser (a NT270, made by EKSPLA). The wavelength of the selected OPO mid-MIR laser was tunable from 2.5 to 12 µm (from 4,000 to 833 $cm^{-1}$), with a pulse duration of about 10 ns, and an output pulse energy that varied from 10 to 100 µJ depending on the selected wavelength. For imaging lipids and proteins using ULM-PAM, the UV laser was tuned to 224 nm; for imaging nucleic acids using UV-PAM, it was set to 250 nm. Both the MIR and UV beams, with diameters of about 4 mm, were reflected by several UV-enhanced aluminum coated mirrors (PF10-03-F01, made by Thorlabs), and focused to a sample mounted on a $CaF_2$ window through a 36× reflective objective (a 50102-02, made by Newport). Photoacoustic signals were detected in transmission mode by a focused ultrasonic transducer having a 25 MHz center frequency (a V324-SM, made by Olympus), which has an acoustic focal length of 12.7 mm and an element diameter of 6 mm. The acoustic coupling medium was de-ionized water. Photoacoustic signals were amplified by ~50 dB using two low-noise amplifiers (a ZFL-500LN+, made by Mini-circuits), and then acquired by a DAQ card (a Razor 14, made by Gage) at 14 bits and 200 MS/s.

ULM-PAM images of the sample at selected wavelengths were obtained by raster scanning using two motorized stages (a PLS-85, made by PI miCos) coupled to the sample holder. To drive the scanning stages at high precision (e.g., a 50 nm step size) with minimal low-frequency vibration, two five-phase stepper motors (PKP546MN18B, made by Oriental Motor) and the associated drivers (CVD518-K, made by Oriental Motor) were used. Line scans along the x-axis were averaged to compensate for UV laser inter-pulse fluctuations. The laser tuning, data acquisition, and scanning systems were synchronized by a central computer via microcontrollers, using LabVIEW.

Note that all of the above system configuration information is provided as an illustrative example only. The ULM-PAM system can also be operated with many other alternative components, for example alternative MIR and UV laser sources described elsewhere herein, alternative data acquisition and computation arrangements, alternative scanning mechanisms, etc.

The scan step size varied for different samples. The point spread function of a 50-nm—diameter carbon nanobead was measured using a 50 nm step size. Imaging cells was done with a 200 nm step size. For imaging brain slices, to compensate for the slow laser repetition rates of the lasers, the UV beam was shrunk to reduce the effective NA to 0.16, which worsened the resolution to some extent, but accelerated the scanning with a larger step size (500 nm) and effectively extended the focal depth to accommodate uneven sample surfaces.

All ATR-FTIR spectra were measured on an ATR-FTIR spectrometer (a Nicolet 6700, made by Thermo) in the Molecular Materials Research Center at California Institute of Technology. The baseline was calibrated by measuring a blank sample.

Mouse embryonic fibroblast cells (NIH/3T3) were obtained from American Type Culture Collection (ATCC, Manassas, Va.) and maintained at 37° C. and 5% $CO_2$ in Dulbecco's modified Eagle's medium (Invitrogen brand) supplemented with 10% fetal bovine serum (Invitrogen) and 1% penicillin-streptomycin (P/S, Invitrogen). The cells were seeded onto 1-mm—thick $CaF_2$ substrates, grown for about two days, and then fixed in 3.7% formalin solution and washed with phosphate buffered saline.

The brain was extracted from Swiss Webster mice (Hsd: ND4, Harlan Laboratories), and fixed in 3.7% formalin solution at room temperature. Afterwards, the fixed brain was embedded in 4% agarose and then sectioned by a microtome (VT1200 S, Leica) into slices 300 µm thick. All experimental animal procedures were carried out in conformity with a laboratory animal protocol approved by the Animal Studies Committee of California Institute of Technology. After they are imaged by ULM-PAM, the thick slices underwent standard procedures for histological staining (including paraffinization, slicing into 10 µm in thickness, and staining), and were finally imaged in a digital pathology system (VENTANA iScan HT, Roche). It should be noted that some samples were fragmented and slightly distorted during the thin-slicing procedure, which however did not affect the comparison.

IV. Further Discussion of ULM-PAM Systems

ULM-PAM provides a new high-resolution and water-background—free MIR microscopy modality capable of imaging fresh biological samples without staining. For cells, ULM-PAM provides sub-cellular MIR imaging of lipids and proteins with high contrast without a strong obscuring water background. For tissue slices, ULM-PAM produces label-free PA-histologic images without requiring thinly slicing and drying samples, unlike conventional MIR imaging. The ULM-PAM system can cover the full MIR spectral range, allowing exploration of a variety of molecules of interest. Among the existing far-field MIR imaging approaches, ULM-PAM is believed to have achieved the highest imaging resolution at 250 nm, which can be further improved by using a higher-NA objective lens and a shorter UV wavelength (as examples). In addition, ULM-PAM can potentially bridge the resolution gap from 100 nm to 400 nm in materials science studies between AFM-MIR and other MIR modalities, such as ATR-FTIR and photothermal MIR.

The ULM-PAM can be further improved in some aspects. As an example, although the signal-to-noise ratios of raw photoacoustic signals are high, their fractional changes can be noisy because they are derived from two successive but non-identical UV laser pulses. Thus, selection of stable UV and MIR lasers, with low pulse-to-pulse variations, is beneficial to a ULM-PAM system. Alternately, however, the ULM-PAM design disclosed herein can be modified such that a single UV pulse is replicated into first and second parts, the first part serving as a baseline UV pulse, and the second part passing through a long optical fiber delay line to delay the second part to just after a MIR pulse such that the second part serves as a probing UV pulse (thus reducing or avoiding inter-pulse fluctuations). As another example, the imaging speed can be limited when the selected UV and MIR lasers have low pulse repetition rates. For example, if the lasers both have a pulse repetition rate that maxes out at 1 kHz, it could take over two hours to scan a 1 mm by 1 mm area with a 500 nm step size. Thus it can be desirable to use IR and UV sources with higher repetition rates. For example commercially available OPO and QCL IR sources can have repetition rates as high as 1 MHz or higher, up to 100× faster than the Ekspla OPOs described above. Frequency quadrupled Nd-YAG lasers can also operate at rates of 100 kHz or higher. Femtosecond broadband sources can operate with pulse repletion rates as high as tens of MHz and can produce MIR or UV pulses or in some cases both. As another example, multiple scans may be need to be collected and averaged together, to compensate for inter-pulse fluctuations and other noise sources, further slowing imaging speed. However, multi-focal photoacoustic imaging using a linear array of ultrasonic transducers can improve the imaging speed significantly, even more than 100 times faster. Additional aspects of multi-focal embodiments are described and disclosed in connection with FIG. 16. With sufficiently fast and stable UV and MIR lasers, ULM-PAM can enable imaging of live cells and animals in vivo, as well as covering the fingerprint region (e.g., greater than 6,600 nm wavelengths) to yield rich vibration information about molecules.

Two conventional vibrational imaging microscopies provide far-field and label-free imaging at sub-cellular resolution: Raman scattering microscopy and photothermal MIR microscopy. Examples of Raman scattering microscopy are described by Evans, C. L. & Xie, X. S., "Coherent anti-Stokes Raman scattering microscopy: chemical imaging for biology and medicine," *Annu. Rev. Anal. Chem.* 1, 883-909 (2008) and Zhang, C., Zhang, D. & Cheng, J.-X., "Coherent Raman scattering microscopy in biology and medicine," *Annu. Rev. Biomed. Eng.* 17, 415-445 (2015), which are hereby incorporated by reference in their entireties. Examples of photothermal MIR microscopy are described by Furstenberg, R., Kendziora, C. A., Papantonakis, M. R., Nguyen, V. & McGill, "R. A. Chemical imaging using infrared photothermal microspectroscopy," *In Proceedings of SPIE Defense, Security, and Sensing* (eds Druy, M. A. & Crocombe, R. A.) 837411 (SPIE, 2012) and Zhang, D. et al., "Depth-resolved mid-infrared photothermal imaging of living cells and organisms with submicrometer spatial resolution," *Sci. Adv.* 2, e1600521 (2016), which are hereby incorporated by reference in their entireties.

Compared with Raman scattering microscopy, the detection sensitivity of the ULM-PAM system, determined by direct MIR photon absorption, is much higher, since the fundamental MIR cross-section is several orders of magnitude larger than that of the Raman scattering cross-section. In addition, this method not only exhibits the same features as Raman scattering microscopy, such as high resolution and low water background, but also enables the direct imaging of various vibrational bonds in the mid-MIR spectral range. Compared with photothermal MIR microscopy, this method is essentially a new way to exploit the MIR photothermal effect, but photoacoustic detection is used instead to retrieve the MIR-absorption induced local temperature rise, enabling MIR imaging in thick, highly optically absorbing and scattering biological samples. Perhaps more importantly, photoacoustic temperature sensing is based on the Grüneisen relaxation effect, which gives a photoacoustic signal change of about 3%/° C. in the physiological temperature range. This change is two orders of magnitude greater than the photothermally induced refractive index change ($\sim 10^{-4}$/° C.), making ULM-PAM more sensitive than photothermal MIR microscopy. Furthermore, since water is almost transparent at UV wavelengths from 200 nm to 300 nm (see FIG. 13 and related discussion), the water background of MIR imaging is suppressed in ULM-PAM. Finally, the shorter UV wavelength endows ULM-PAM with higher resolution than photothermal MIR imaging, which is based on visible or near-infrared light detection.

If desired, the ULM-PAM system can be modified to attain nanoscale far-field chemical imaging by shortening the wavelength of the probe beam (e.g., laser 410) to the X-ray wavelength regime. Current X-ray microscopy for biological samples operates either in the soft X-ray regime for water transparency (2.33-4.40 nm) or the hard X-ray regime, using imaging contrast arising from natural X-ray absorption, to provide nanometer scale resolution. Imaging specific chemicals or structures inside biological samples requires exogenous labeling, e.g., silver-enhanced immunogold labeling. X-ray acoustic imaging has also been demonstrated with a pulsed X-ray source as described, for example, by Lasch, P., Boese, M., Pacifico, A. & Diem, M., "FT-IR spectroscopic investigations of single cells on the subcellular level," *Vibr. Spectrosc.* 28, 147-157 (2002), which is hereby incorporated by reference in its entirety. By combining the MIR-absorption induced Grüneisen relaxation effect and X-ray-acoustic imaging, the ULM-PAM system can achieve X-ray-acoustic imaging with MIR-absorption contrast, utilizing acoustic signals generated by pulsed X-rays to report MIR absorption contrast in materials, thereby achieving far- field and label-free imaging at nanometer scale resolution.

In some embodiments, the ULM-PAM system 400 can scan and collect photoacoustic measurements from multiple locations within a sample 10 simultaneously, e.g., in order to speed up imaging and spectroscopic operations. As an example, the ULM-PAM system 400 can include one or more optical components that spread the pulses from ultraviolet light source 410 and mid-infrared light source 412 into sheet-like beams and a microlens array, where each microlens focuses a portion of the laser light onto a corresponding portion of the (such as along a scan axis, which is aligned with the x-axis in the example of FIG. 16).

Figure 16:
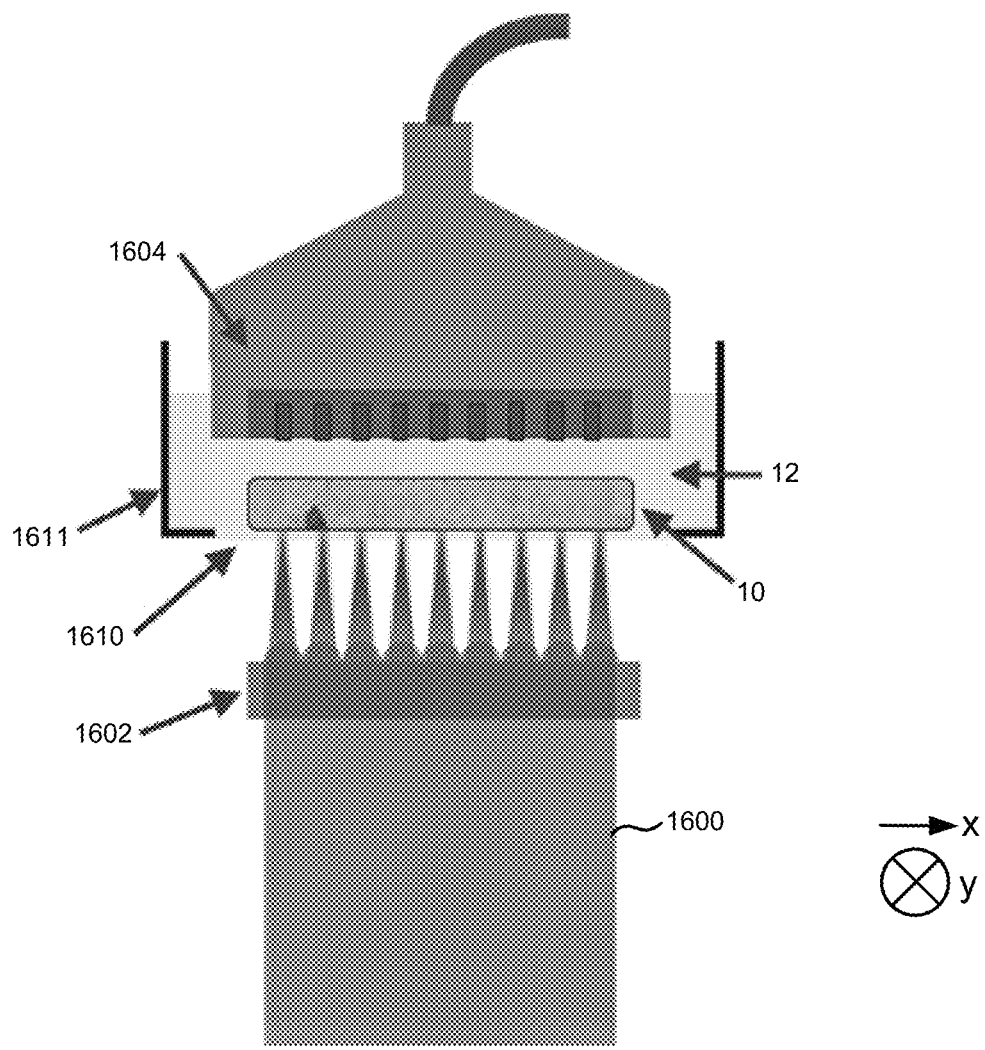
FIG. 16 is a schematic view of ULM-PAM components including an optional micro-lens array and ultrasonic transducer array to speed up imaging and spectroscopy, according to an aspect.

FIG. 16 is a schematic view of ULM-PAM components including an optional micro-lens array and ultrasonic transducer array, according to an aspect. In this illustrated example, the ULM-PAM system includes one or more optical components that spread the pulses from the ultraviolet light source and mid-infrared light source into sheet-like beams 1600. The ULM-PAM system also includes a microlens array 1602, where each microlens focuses a portion of the laser light onto a corresponding portion of the sample 10 such as along a scan axis, which is aligned with the x-axis. The laser light may pass through a window 1610, which may be formed from any suitable materials sufficiently transparent to the UV and MIR wavelengths of ultraviolet light source 410 and mid-infrared light source 412. As examples, window 1610 may be formed of calcium fluoride or magnesium fluoride. After passing through window 1610, the MIR laser pulses may heat the sample 10 at each focal spot of the microlens array 1602 and UV laser pulses may excite the sample 10 at each focal spot of the microlens array 1602, such that the sample 10 (which may be within sample holder 1611) emits corresponding photoacoustic signals. The ultrasonic transducer array 1604 may then receive the photoacoustic signals. The system can distinguish the origin locations (along the scan line, which is the x-axis in the FIG. 16 example) of the different photoacoustic pulses using a high-frequency transducer array 1604 and using photoacoustic tomography. In some embodiments, the pitch of the microlens array 1602 may be adjusted to be greater than the acoustic resolution of the high-frequency transducer array 1604, to facilitate determining the individual locations of the foci spots from which the photoacoustic signals originated. While FIG. 16 illustrates an embodiment operating in transmission mode, the principles of FIG. 16 can also be applied to reflection mode configurations. An example of a technique for resolving the individual locations of foci spots is described in Imai, T. et al., "High-throughput ultraviolet photoacoustic microscopy with multifocal excitation," *Journal of Biomedical Optics* 23(3), 036007 (15 Mar. 2018).

Although some examples of ULM-PAM systems and methods describe a two-step measuring scheme with a first step of initiating (e.g., triggering by a pulser) delivery of a first ultraviolet laser pulse to a sub-region within a region to generate a first (baseline) photoacoustic signal and a second step of initiating delivery of a UV probing pulse to the region, followed by initiating delivery of a second ultraviolet laser pulse to the sub-region to generate a second photoacoustic signal, it would be understood that the order of these steps can be reversed according to another aspect. For example, according to one aspect, the technique initiates delivery of the first ultraviolet laser pulse to a sub-region within a region to generate a first (baseline) photoacoustic signal where the initiation (e.g., triggering) occurs after (e.g., a predetermined time period after the initiation of the delivery of the first ultraviolet laser pulse) the step of initiating delivery of a UV probing pulse to the region, followed by initiating delivery of a second ultraviolet laser pulse to the sub-region.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code using any suitable computer language and/or computational software such as, for example, Java, C, C#, C++ or Python, LabVIEW, Mathematica, or other suitable language/computational software, including low level code, including code written for field programmable gate arrays, for example in VHDL. The code may include software libraries for functions like data acquisition and control, motion control, image acquisition and display, etc. Some or all of the code may also run on a personal computer, single board computer, embedded controller, microcontroller, digital signal processor, field programmable gate array and/or any combination thereof or any similar computation device and/or logic device(s). The software code may be stored as a series of instructions, or commands on a CRM such as a random access memory (RAM), a read only memory (ROM), a magnetic medium such as a hard-drive or a floppy disk, or an optical medium such as a CD-ROM, or solid stage storage such as a solid state hard drive or removable flash memory device or any suitable storage device. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An apparatus for measuring infrared absorption of a sample being analyzed during operation, the apparatus comprising:
   a first radiation source configured to emit at least one infrared radiation pulse;
   a second radiation source configured to emit pulses of shorter wavelength than wavelengths of infrared radiation, the pulses comprising (i) at least one first radiation pulse and (ii) at least one second radiation pulse emitted at a first delay time after triggering the first radiation source to emit the at least one infrared radiation pulse;
   one or more optical elements configured to deliver the at least one infrared radiation pulse to a region of the sample, deliver the at least one first radiation pulse and the at least one second radiation pulse to one or more sub-regions within the region;
   an ultrasonic transducer acoustically coupled to the sample to detect photoacoustic signals induced by the at least one first radiation pulse and the at least one second radiation pulse; and
   one or more processors and memory configured to analyze the photoacoustic signals to determine an indication of infrared absorption of the one or more sub-regions of the region of the sample.

2. The apparatus of claim 1, wherein the one or more processors and memory are further configured to generate an infrared image of the sample at least in part using the photoacoustic signals.

3. The apparatus of claim 1, wherein the at least one first radiation pulse and/or the at least one second radiation pulse have a wavelength between about 100 nm and about 2000 nm.

4. The apparatus of claim 1, wherein the at least one first radiation pulse and the at least one second radiation pulse comprise ultraviolet radiation pulses.

5. The apparatus of claim 1, wherein the least one infrared radiation pulse comprises a mid-infrared radiation pulse.

6. The apparatus of claim 1, wherein:
(i) the second radiation source is configured to emit a first ultraviolet radiation pulse that is delivered to the one or more sub-regions of the region of the sample, the first ultraviolet radiation pulse configured to induce a first photoacoustic signal;
(ii) the first radiation source is configured to emit a mid-infrared radiation pulse that is delivered to the region of the sample; and
(iii) the second radiation source is also configured to emit a second ultraviolet radiation pulse that is delivered to the one or more sub-regions of the region of the sample, the second ultraviolet radiation pulse configured to induce a second photoacoustic signal.

7. The apparatus of claim 6, wherein the one or more processors and memory are further configured to calculate a difference between the first and second photoacoustic signals, said difference being indicative of the infrared absorption of the one or more sub-regions of the region of the sample.

8. The apparatus of claim 6, further comprising a scanning mechanism configured to move at least one of the sample and the one or more of the optical elements such that the at least one infrared radiation pulse is scanned to a plurality of regions in a field-of-view of the sample and the first and second ultraviolet radiation pulses are scanned to one or more sub-regions within each region of the plurality of regions.

9. The apparatus of claim 8, wherein the one or more processors and the memory are further configured to use the indication of infrared absorption of one or more sub-regions in each of the plurality of regions to determine an infrared image of the sample.

10. The apparatus of claim 9, wherein the infrared image is a photoacoustic image.

11. The apparatus of claim 1, wherein the first radiation source comprises a tunable infrared radiation source.

12. The apparatus of claim 11, wherein the tunable infrared radiation source comprises at least one of an optical parametric oscillator and a quantum cascade laser.

13. The apparatus of claim 1, wherein the first radiation source comprises a broadband infrared radiation source or a fixed wavelength radiation source optically coupled to the one or more optical elements and configured to emit the at least one infrared radiation pulse.

14. The apparatus of claim 1, further comprising a pulser configured to generate trigger pulses, at least one of which is configured to trigger the second radiation source to emit a first ultraviolet radiation pulse at a first time before or after the first radiation source is triggered to emit a first infrared radiation pulse, and wherein at least one of the trigger pulses is configured to trigger the second radiation source to emit a second ultraviolet radiation pulse at a second time after the first radiation source is triggered to emit the first infrared radiation pulse.

15. The apparatus of claim 14, wherein the one or more processors and memory are configured to determine the infrared absorption of the one or more sub-regions of the region of the sample by calculating a difference in amplitude between a first photoacoustic signal induced by the first ultraviolet radiation pulse and a second photoacoustic signal induced by the second ultraviolet radiation pulse.

16. The apparatus of claim 1, wherein the one or more processors and memory are configured to determine the infrared absorption of the one or more sub-regions of the region of the sample at least in part by calculating a difference in amplitude between a first photoacoustic signal induced by a radiation pulse from the second radiation source and a second photoacoustic signal induced by another radiation pulse from the second radiation source.

17. The apparatus of claim 1, wherein the one or more processors and memory are configured to determine the indication of infrared absorption of the one or more sub-regions with a spatial resolution of less than 1,000 nm.

18. The apparatus of claim 1, wherein the one or more processors and memory are configured to determine the indication of infrared absorption of the one or more sub-regions with a spatial resolution of less than 500 nm.

19. The apparatus of claim 1, wherein the one or more processors and memory are configured to determine the indication of infrared absorption of the one or more sub-regions based at least in part on a difference in amplitude between photoacoustic signals induced by the pulses from the second radiation source in response to absorption of infrared radiation by the one or more sub-regions from the first radiation source.

20. The apparatus of claim 1, further comprising a photodiode configured to take one or more intensity measurements of the pulses emitted from the second radiation source.

21. The apparatus of claim 20, wherein the one or more processors and memory are configured to normalize the photoacoustic signals by compensating for variations in pulse energy from the pulses emitted from the second radiation source using the one or more intensity measurements taken by the photodiode.

22. The apparatus of claim 1, wherein the first radiation source is configured to emit the at least one infrared radiation pulse at a plurality of infrared wavelengths, wherein the indication of infrared absorption is determined for the plurality of infrared wavelengths to construct a spectrum of infrared absorption of the one or more sub-regions of the region.

23. The apparatus of claim 1,
further comprising a microlens array to generate an array of infrared radiation pulses and an array of additional radiation pulses,
wherein the one or more optical elements further are configured to deliver the array of infrared radiation pulses and the array of additional radiation pulses to a plurality of regions of the sample.

24. The apparatus of claim 1, wherein the first radiation source is configured to emit the at least one infrared pulse of wavelengths between about 3,000 and about 8,000 nanometers or between about 5,800 and about 6,200 nanometers, and the second radiation source is configured to emit the pulses of wavelengths between about 200 and about 300 nanometers.

25. A method for measuring infrared absorption of a sample, the method comprising:
- (i) initiating delivery of at least one first radiation pulse of shorter wavelength than wavelengths of infrared radiation to one or more sub-regions of a region of the sample;
- (ii) initiating delivery of at least one infrared radiation pulse to the region of the sample;
- (iii) initiating delivery of at least one second radiation pulse of shorter wavelength than wavelengths of infrared radiation to the one or more sub-regions of the region of the sample, wherein the at least one second radiation pulse is initiated at a first delay time after (ii);
- (iv) receiving, from an ultrasonic transducer acoustically coupled to the sample, photoacoustic signals induced by the at least one first radiation pulse and the at least one second radiation pulse; and
- (v) analyzing the photoacoustic signals to determine an indication of infrared absorption of the one or more sub-regions of the region of the sample.

26. The method of claim 25, wherein the at least one first radiation pulse is initiated before (ii) or at a second delay time after (iii).

27. The method of claim 25, wherein in (v) the indication of infrared absorption of the one or more sub-regions of the region of the sample is determined at least in part by calculating a difference in amplitude between a first photoacoustic signal induced by the at least one first radiation pulse and a second photoacoustic signal induced by the at least one second radiation pulse.

28. The method of claim 25, further comprising scanning the at least one infrared radiation pulse to a plurality of regions of the sample, and scanning the at least one first radiation pulse and the at least one second radiation pulse to one or more sub-regions within each region of the plurality of regions of the sample.

29. The method of claim 25, wherein the at least one first radiation pulse and the at least one second radiation pulse are of a wavelength between about 100 nm and about 2000 nm.

30. The method of claim 25, wherein the at least one first radiation pulse and the at least one second radiation pulse are ultraviolet radiation pulses and the at least one infrared radiation pulse is a mid-infrared radiation pulse.

31. The method of claim 25, wherein the first delay time is less than about 1,000 nanoseconds.

32. The method of claim 25, wherein the first delay time is between about 100 nanoseconds and about 500 nanoseconds.

33. The method of claim 25, further comprising initiating delivery of one or more additional radiation pulses of shorter wavelength than wavelengths of infrared radiation to additional sub-regions of the region, wherein the one or more additional radiation pulses are initiated within the first delay time after (ii).

34. The method of claim 33, wherein the first delay time is less than or equal to, a thermal confinement time of the sample.

35. The method of claim 33, wherein the first delay time is between about 100 nanoseconds and about 500 nanoseconds.

36. The method of claim 25, wherein (ii) further comprises tuning a tunable infrared radiation source to generate the at least one infrared radiation of a plurality of infrared wavelengths.

37. The method of claim 25,
- wherein (i) comprises initiating delivery of a first ultraviolet radiation pulse to the one or more sub-regions, the first ultraviolet radiation pulse inducing a first photoacoustic signal;
- wherein (iii) comprises initiating delivery of a second ultraviolet radiation pulse to the one or more sub-regions at the first delay time after (ii), the second ultraviolet radiation pulse inducing a second photoacoustic signal.

38. The method of claim 37, further comprising:
- measuring, using a photosensor, an amplitude of the first ultraviolet radiation pulse;
- measuring, using the photosensor, an amplitude of the second ultraviolet radiation pulse; and
- normalizing amplitudes of the first and second photoacoustic signals based at least in part on the measured amplitudes of the first and second ultraviolet radiation pulses.

39. The method of claim 25, further comprising generating an infrared image of the sample at least in part using the photoacoustic signals.

40. The method of claim 39, wherein the infrared image has a spatial resolution of less than 1,000 nm.

41. The method of claim 39, wherein the infrared image has a spatial resolution of less than 500 nm.

42. The method of claim 39, wherein the infrared image has a spatial resolution finer than one-tenth of a wavelength of the at least one infrared radiation pulse.

43. The method of claim 25, further comprising, before (v), normalizing the photoacoustic signals by compensating for variations in the at least one first radiation pulse and the at least one second radiation pulse using measured amplitudes of the at least one first radiation pulse and the at least one second radiation pulse.

44. The method of claim 25, wherein (ii) comprises generating the at least one infrared radiation pulse at a plurality of infrared wavelengths, wherein (v) comprises determining the indication of infrared absorption at the plurality of infrared wavelengths and constructing a spectrum of infrared absorption of the one or more sub-regions of the region based at least in part on the indication of infrared absorption.

45. The method of claim 25, wherein the first delay time is less than about 500 nanoseconds.

46. A method for measuring infrared absorption of a sample, the method comprising:
- (i) emitting at least one first radiation pulse of shorter wavelength than wavelengths of infrared radiation, wherein the at least one first radiation pulse is delivered to one or more sub-regions of a region of the sample;
- (ii) emitting at least one infrared radiation pulse, wherein the at least one infrared radiation pulse is delivered to the region of the sample;
- (iii) emitting at least one second radiation pulse of shorter wavelength than wavelengths of infrared radiation, wherein the at least one second radiation pulse is delivered to the one or more sub-regions of the region of the sample, and wherein the at least one second radiation pulse is initiated at a first delay time after (ii);
- (iv) detecting, by an ultrasonic transducer acoustically coupled to the sample, photoacoustic signals induced by the at least one first radiation pulse and the at least one second radiation pulse; and
- (v) analyzing the photoacoustic signals to determine an indication of infrared absorption of the one or more sub-regions of the region of the sample.

* * * * *